(12) United States Patent
DePoy

(10) Patent No.: US 9,727,903 B2
(45) Date of Patent: *Aug. 8, 2017

(54) ONLINE MARKETPLACE FOR PRE-INSTALLED SOFTWARE AND ONLINE SERVICES

(71) Applicant: SweetLabs, Inc., San Diego, CA (US)

(72) Inventor: James DePoy, Kirkland, WA (US)

(73) Assignee: SWEETLABS, INC., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/709,992

(22) Filed: May 12, 2015

(65) Prior Publication Data

US 2015/0242912 A1    Aug. 27, 2015

Related U.S. Application Data

(63) Continuation of application No. 14/146,267, filed on Jan. 2, 2014, now Pat. No. 9,053,505, which is a continuation of application No. 13/116,817, filed on May 26, 2011, now Pat. No. 8,650,558.

(60) Provisional application No. 61/349,068, filed on May 27, 2010.

(51) Int. Cl.
*G06F 9/445* (2006.01)
*G06F 21/00* (2013.01)
*G06Q 30/06* (2012.01)

(52) U.S. Cl.
CPC ........... *G06Q 30/0609* (2013.01); *G06F 8/60* (2013.01); *G06Q 30/06* (2013.01)

(58) Field of Classification Search
CPC ........... G06F 8/60; G06F 21/10; G06Q 30/06; G06Q 30/0609
USPC ............................. 717/174–178; 705/54, 59
See application file for complete search history.

(56) References Cited

U.S. PATENT DOCUMENTS

| | | |
|---|---|---|
| 5,138,712 A | 8/1992 | Corbin |
| 6,023,766 A | 2/2000 | Yamamura |
| 6,092,189 A | 7/2000 | Fisher et al. |
| 6,189,146 B1 | 2/2001 | Misra et al. |
| 2002/0091645 A1 | 7/2002 | Tohyama |
| 2002/0138441 A1 | 9/2002 | Lopatic |

(Continued)

OTHER PUBLICATIONS

ISR and Written Opinion for PCT Application Serial No. PCT/US11/38384, mailed Sep. 14, 2011, 13 pages.

(Continued)

*Primary Examiner* — Qing Chen
(74) *Attorney, Agent, or Firm* — Amin, Turocy & Watson, LLP

(57) ABSTRACT

The subject disclosure relates to pre-installed software and services, such as online services, and markets for pre-installed software and online services. In one aspect, the disclosed subject matter facilitates contracting between software vendors and device manufacturers or redistributors for placement and/or conversion of software applications or services in devices. As further advantages, embodiments of the disclosed subject matter can provide transparency into markets for device placement and can facilitate detailed contract performance tracking. Further non-limiting embodiments are provided that illustrate the advantages and flexibility of the disclosed subject matter.

20 Claims, 30 Drawing Sheets

(56) References Cited

U.S. PATENT DOCUMENTS

| | | |
|---|---|---|
| 2002/0169625 A1 | 11/2002 | Yang et al. |
| 2003/0126456 A1 | 7/2003 | Birzer et al. |
| 2004/0167859 A1 | 8/2004 | Mirabella |
| 2005/0027846 A1 | 2/2005 | Wolfe et al. |
| 2005/0076334 A1 | 4/2005 | Demeyer |
| 2005/0144139 A1 | 6/2005 | Zhuge et al. |
| 2005/0216420 A1 | 9/2005 | Padole et al. |
| 2008/0222732 A1* | 9/2008 | Caldwell ............... G06F 21/125 726/26 |
| 2009/0031123 A1 | 1/2009 | Kruys |
| 2009/0089778 A1* | 4/2009 | Craft ..................... G06F 8/61 717/174 |
| 2009/0119779 A1 | 5/2009 | Dean et al. |
| 2009/0165144 A1 | 6/2009 | Fujita |

OTHER PUBLICATIONS

Office Action dated Apr. 1, 2013 for U.S. Appl. No. 13/116,817, 76 pages.

Notice of Allowance dated Oct. 2, 2013 for U.S. Appl. No. 13/116,817, 59 pages.

Notice of Allowance dated Feb. 4, 2015 for U.S. Appl. No. 14/146,267, 60 pages.

\* cited by examiner

ONLINE MARKETPLACE FOR PRE-INSTALLED SOFTWARE AND ONLINE SERVICES

CROSS-REFERENCE TO RELATED APPLICATIONS

This application is a continuation of, and claims priority to each of, U.S. patent application Ser. No. 14/146,267, filed on Jan. 2, 2014, and entitled ONLINE MARKETPLACE FOR PRE-INSTALLED SOFTWARE AND ONLINE SERVICES, which is a continuation of U.S. patent application Ser. No. 13/116,817, filed on May 26, 2011, and entitled ONLINE MARKETPLACE FOR PRE-INSTALLED SOFTWARE AND ONLINE SERVICES, which is a non-provisional application of U.S. Provisional Patent Application No. 61/349,068, filed on May 27, 2010, and entitled ONLINE MARKETPLACE FOR PRE-INSTALLED SOFTWARE AND ONLINE SERVICES, the entireties of each of which patent applications are hereby incorporated by reference.

TECHNICAL FIELD

The subject disclosure is directed to software and services and, more specifically, relates to pre-installed software and services, such as online services, and tracking transactions for pre-installed software and online services and markets for pre-installed software and online services.

BACKGROUND

In the market for devices and software, pre-installation of software and services, such as online services, has become key to profitability for electronic device manufacturers such as original equipment manufacturers (OEMs), etc. For example, for OEMs, pre-installations or preloads account for a growing portion of device profitability. For instance, over the time frame of 2007 to 2012, the average selling price of a personal computer (PC) is expected to decrease over 7% year over year, while OEMs are expected to make about a 5-10% margin on the hardware. Thus, it is clear that payments by independent software vendors (ISVs) for pre-installation of software or services can have the ability to drastically impact the dwindling hardware margin.

However, whether it is for a large PC and laptop manufacturer bundling an antivirus application with a PC or laptop, or whether it is a small mobile phone manufacturer preloading internet search functionality on a new mobile device, conventionally, there is no efficient way for buyers and sellers of the multitude of software or services available from ISVs to see what placement opportunities are available for the myriad of OEM devices, which are ever diversifying with shorter and shorter obsolescence cycles, and to transact business therefor. As a result, such transactions are typically limited to extremely high volumes of business where the excessive transaction costs are more easily offset by the extremely high volumes.

For example, for ISVs, pre-installation of software and services, or preloads, can result in discovery of the availability of the software or services, and can present an easily accessed opportunity to a user to convert from the pre-installed version of the software or services (e.g., trial versions, limited functionality versions, inactive versions, etc.) to an enhanced access version of the software or services, based on a purchase, subscription, and so on, of the enhanced access. For instance, typical conversion rates for pre-installation of software and services can range from 25% for applications or services such as antivirus applications or services to 5-7% for productivity software or entertainment services. However, an ISV that desires placement on an OEM device would typically have to craft a unique or custom image of the software or service for the particular OEM device, which may have limited applicability to another disparate OEM device. Accordingly, each particular placement on a particular OEM device can have transaction costs for the ISV associated with the particular placement.

In addition, as described, due to high transaction costs transactions for the pre-installation of software and services on OEM devices, transactions are typically limited to situations involving extremely high volumes of business where the excessive transaction costs are more easily offset by the extremely high volumes. Thus, deals for preloaded software or online service are conventionally made in one-off, large-scale, and manpower intensive negotiations, where the ability to recapture or reuse information gained in the negotiations is highly limited. For instance, preloaded software or online service deals are typically made between the largest software or service providers and the largest OEMs or device redistributors (e.g., so-called Tier 1 OEMs such as Hewlett Packard®, Lenovo®, Apple®, Dell®, Samsung™, etc.), based on extremely deal-specific terms and conditions that typically do not easily transfer and apply to another deal with one or more different parties to the deal.

Moreover, these deals are typically only two-party deals made between one specific software or service provider and one specific OEM or device redistributor for the pre-installation of the provider's software and/or services on the OEM's or the redistributor's devices, to the exclusion of all other potential market participants (e.g., other OEMs, device redistributors, software providers, service providers). That is, when the deals are struck between the largest ISVs and the largest OEMs, smaller ISVs and OEMs are typically excluded from participation (e.g., as a result of proprietary concerns, as a practical matter, etc.).

Accordingly, it can be understood that such closed markets and negotiations result in inefficient pricing for the pre-installation of software and services resulting from high information costs, imperfect information, lack of available substitutes, etc. As a further result, these excessive transaction costs can practically prevent certain participants from gaining access to the markets for preloaded software or online services. For instance, in the conventional deal, unless an OEM or an ISV can support sufficient shipments of devices or result in sufficient conversions of preinstalled software or services, then the likelihood that such a deal would provide revenue in excess of the transaction costs to strike the bargain (and/or perform to its conditions) can be slim. Thus, as described, these transaction costs and entry barriers can practically preclude small or mid-size OEMs and ISVs from engaging deals.

In addition, conventional deals as described typically lack the ability to track deal level information. For instance, while conventional deals may be able to track gross conversion information based on hardware or software specific information (e.g., what hardware is the source of the conversion based on a hardware identification (ID) number, what browser, operating system and so on is used to convert the preinstalled software or service, etc.), how the conversion is related back to the terms of the numerous conventional deals can typically remain a mystery. For example, while an ISV may be able to tell based on a hardware ID that a particular device is responsible for the placement or conversion (e.g., a particular processor, etc.), the ISV may not be able to tell that the hardware was configured with the placement by a particular deal counterparty (e.g., Dell®, Nvidia®, Adobe®, Best Buy®, etc.). In addition, the ISV may be further ignorant of one or more of the deal terms for which a conversion or other event has been contracted. As a result of this inability to accurately track the performance of the contracts for placement or conversion to the terms of the conventional deals, the market participants (e.g., ISVs and OEMs) are further prevented from accurately determining the pricing and profitability of such contracts, thereby providing further barriers to entry in the market for the pre-installation of software and services.

Moreover, the deficiencies associated with the inability to track the performance of contracts on a deal level illustrates further how the lack of sufficient information regarding contract performance precludes efficient pricing of the placement opportunities on devices. For instance, optimized placement and pricing, such as placement and pricing based on regional demands, historical performance metrics, market analysis, or other important information, is simply not available as a result of the closed, proprietary, or one-off nature of conventional negotiations for placement opportunities as described above.

The above-described deficiencies of today's pre-installed software and services markets are merely intended to provide an overview of some of the problems of conventional systems, and are not intended to be exhaustive. Other problems with conventional systems and corresponding benefits of the various non-limiting embodiments described herein may become further apparent upon review of the following description.

SUMMARY

The following presents a simplified summary of the specification to provide a basic understanding of some aspects of the specification. This summary is not an extensive overview of the specification. It is intended to neither identify key or critical elements of the specification nor delineate any scope particular to any embodiments of the specification, or any scope of the claims. Its sole purpose is to present some concepts of the specification in a simplified form as a prelude to the more detailed description that is presented later.

As used herein, the terms "original equipment manufacturers," "OEMs," "equipment vendors (EVs)," "device redistributors," and the like are intended to refer interchangeably, depending on the context, to entities (or one or more automated device or systems, intermediaries, or agents acting for or on behalf of the entities) that can employ aspects of the disclosed subject matter to facilitate contracting for and/or filling placement opportunities on one or more devices within an entity's responsibility with applications, such as software applications (or links or references thereto, etc.), or services, such as online services (or links or references thereto, etc.) as further described herein. In addition, the terms "software vendor," "independent software vendor," "ISV," and so on are intended to refer interchangeably, depending on the context, to entities (or one or more automated devices or systems, intermediaries, or agents acting for or on behalf of the entities) that can employ aspects of the disclosed subject matter to facilitate contracting for and/or providing compensation as an incentive to place applications, such as software applications (or links or references thereto, etc.), or services, such as online services (or links or references thereto, etc.) on one or more devices as further described herein.

Thus, as further used herein the term "placement opportunity" is intended to refer to an opportunity available from an OEM (or like entities) to place applications, such as software applications (or links or references thereto, etc.), or service, such as online services (or links or references thereto, etc.) on one or more devices within the OEM's responsibility. Accordingly, depending on the context, a "placement opportunity" can be any opportunity that an ISV, for example, can take advantage of by contracting, according to aspects of the disclosed subject matter, for example, to get the ISV's one or more application(s), such as software applications (or links or references thereto, etc.), or one or more service(s), such as online services (or links or references thereto, etc.) placed on one or more devices, the object of which is to gain revenue by enticing a user of the one or more devices to convert the one or more application(s), the one or more service(s), or one or more link(s) or reference(s) thereto to, for example, a purchased version, an upgraded version, a paid subscription, a renewed subscription, more applications in a related application bundle, etc.

Accordingly, the term "conversion," depending on the context, is intended to refer broadly to any event, for which, by employing aspects of the disclosed subject matter, compensation and/or payment can be contracted for relating to behavior of a user (or one or more automated devices or systems, intermediaries, or agents acting for or on behalf of the user) of the one or more devices regarding the one or more application(s), the one or more service(s), or one or more link(s) or reference(s) thereto placed on the one or more devices. For instance, as non-limiting examples, a "conversion" can include selling to the user a device with the placed application, service, or link or reference thereto (the "placement"), the user viewing the placement activating the device, the user clicking, accessing, invoking, executing, and so on, etc. the placement, visiting a website or other resource associated with the placement, downloading the application, activating the service, purchasing an application, upgrading a version of the application, purchasing a subscription, renewing a subscription, purchasing more applications in a related application bundle, etc. Further examples of a "conversion" will become apparent on review of the disclosed subject matter.

Thus, a "conversion opportunity," is intended to refer to any opportunity available to a user of the one or more devices for a "conversion." As non-limiting examples, depending on a number of factors related to contract formation, such as, for example, device location specific placement or entry point preferences (e.g., whether an application, service, or reference thereto is placed on the device taskbar, desktop, start menu, browser favorite, general pop-up, context-specific pop-up, etc.), number of placements desired by an ISV, conversion terms such as what constitutes a conversion, other contract terms, device type, category of software or service, and so on, etc., the user of the device can be presented with one or more "conversion opportunities" to convert the application, the service, or a link, or a reference thereto, etc. into an upgraded, an activated, or otherwise converted software application, or an activated, a renewed, a subscribed or otherwise converted online service.

As further used herein, the terms "unique" and/or "trackable," depending on the context, are to be understood and appreciated with respect to the abilities of aspects of the disclosed subject matter to enable or facilitate tracking contracts for placement of software and/or services on one or more devices, terms and/or devices associated with the contracts, and/or behavior of devices and associated users to track performance under such contracts. Accordingly, the terms "unique" and "trackable," can be used interchangeable, depending on the context. For instance, so long as a contract, an attribute, etc. is "trackable" relative to other contracts, attributes, etc. in a given scope or context a "unique" contract identification number or a "unique" entry point identification number need not be globally unique, so long as it is trackable amongst its peers. Thus, the term "unique" is to be understood and appreciated with respect to a relevant scope of application. For instance, in a global scope of application for a contract or entry point identification number to be unique in the conventional sense (and thus trackable and distinguishable from all others), it would imply that there are no others like it. However, recognizing practical limitations, it is more likely that in a reduced scope of application having a "unique" or locally "unique" identification number would imply that, although the contract, attribute, etc. is trackable by various implementations of the disclosed subject matter, the identification number used in tracking may not be globally "unique."

In addition, use of the term "number," such as in the terms "identification number," and so on, is intended to refer broadly to any combination of numbers, letters, symbols, or other characters that can be combined and employed for the purpose of identification and/or tracking as described herein.

In various embodiments, the disclosed subject matter relates to software and services and, more specifically, relates to pre-installation of software and services, such as online services, and markets for pre-installation of software and online services, or references thereto. In one non-limiting aspect, the disclosed subject matter facilitates contracting between software vendors and device manufacturers or redistributors for placement and/or conversion of software applications or services in devices. As further advantages, exemplary embodiments of the disclosed subject matter can provide transparency into markets for device placement and can facilitate detailed contract performance tracking.

For instance, to the foregoing and related ends, systems, devices, and methods are disclosed that can facilitate contracting between one or more ISV(s) and one or more OEM(s) for placement or conversion of a software application or a service (or a link, or a reference thereto, etc.) on a device (e.g., an OEM device etc.), distributing software or promoting online services, device customization, and/or pre-installing software applications or services (or links, or references thereto, etc.) on the OEM device according to various aspects of the disclosed subject matter, among other related functions. According to various non-limiting embodiments, the disclosed subject matter can facilitate creating contract information (such as a unique contract identification number) in response to a contract formed between an ISV and an OEM for placement or conversion of a software application or a service on the OEM device. According to further non-limiting implementations, the disclosed subject matter facilitates tracking conversion information related to the contract information (such as the unique contract identification number), the software application or the service reference, or the OEM device.

Accordingly, exemplary embodiments of the disclosed subject matter can provide exemplary methods that facilitate contracting for placement or conversion of software applications or services on an OEM device. In further non-limiting implementations, exemplary systems can facilitate pre-installing software applications or services (or links, or references thereto, etc.) on a device (e.g., an OEM device etc.).

In addition, further exemplary methods are directed to distributing software or promoting online services and device customization as further detailed herein.

These and other features of the disclosed subject matter are described in more detail below.

BRIEF DESCRIPTION OF THE DRAWINGS

The devices, components, systems, and methods of the disclosed subject matter are further described with reference to the accompanying drawings in which.

DETAILED DESCRIPTION

As described above, markets for the pre-installation of software and services on devices are fraught with inefficiencies and barriers to entry. For instance, as described above, each party to a transaction for the pre-installed software or services (e.g., an ISV, an OEM, or device redistributor, etc.) bears substantial transaction costs in the transacting and performance of placement or conversion of software or services references on devices, which precludes entry to certain market participants, and results in inefficient pricing. Accordingly, in non-limiting embodiments, the disclosed subject matter can provide the ability for OEMs to partner with ISVs online to place software and/or services (or links, or references thereto, etc.) on the OEMs' devices in exchange for commissions. In addition, the disclosed subject matter can facilitate managing these partnerships with a graphical user interface (GUI) (e.g., a user interface accessible over a network via a web browser, etc.).

Thus, in various aspects, the disclosed subject matter can facilitate easily and efficiently finding placement and/or conversion opportunities, transacting therefore, and tracking and managing deals for preloaded software and/or services (or links, or references thereto, etc.) with substantially lower transaction costs than heretofore possible by conventional deal making processes. Accordingly, in various non-limiting implementations, the disclosed subject matter can provide marketplace systems and methods for transacting for the pre-installation of software and services, such as online services. In addition, in further non-limiting embodiments the disclosed subject matter can provide market research such as analytics (e.g., regarding global software and online service usage, etc.), metrics (e.g., data regarding specific placements, performance measurements, traffic quality regarding visitor, usage, and conversion information, and so on, etc.) and other valuable insights as described below to marketplace participants (e.g., ISVs, OEMs, device redistributors, etc.).

Figure 1:
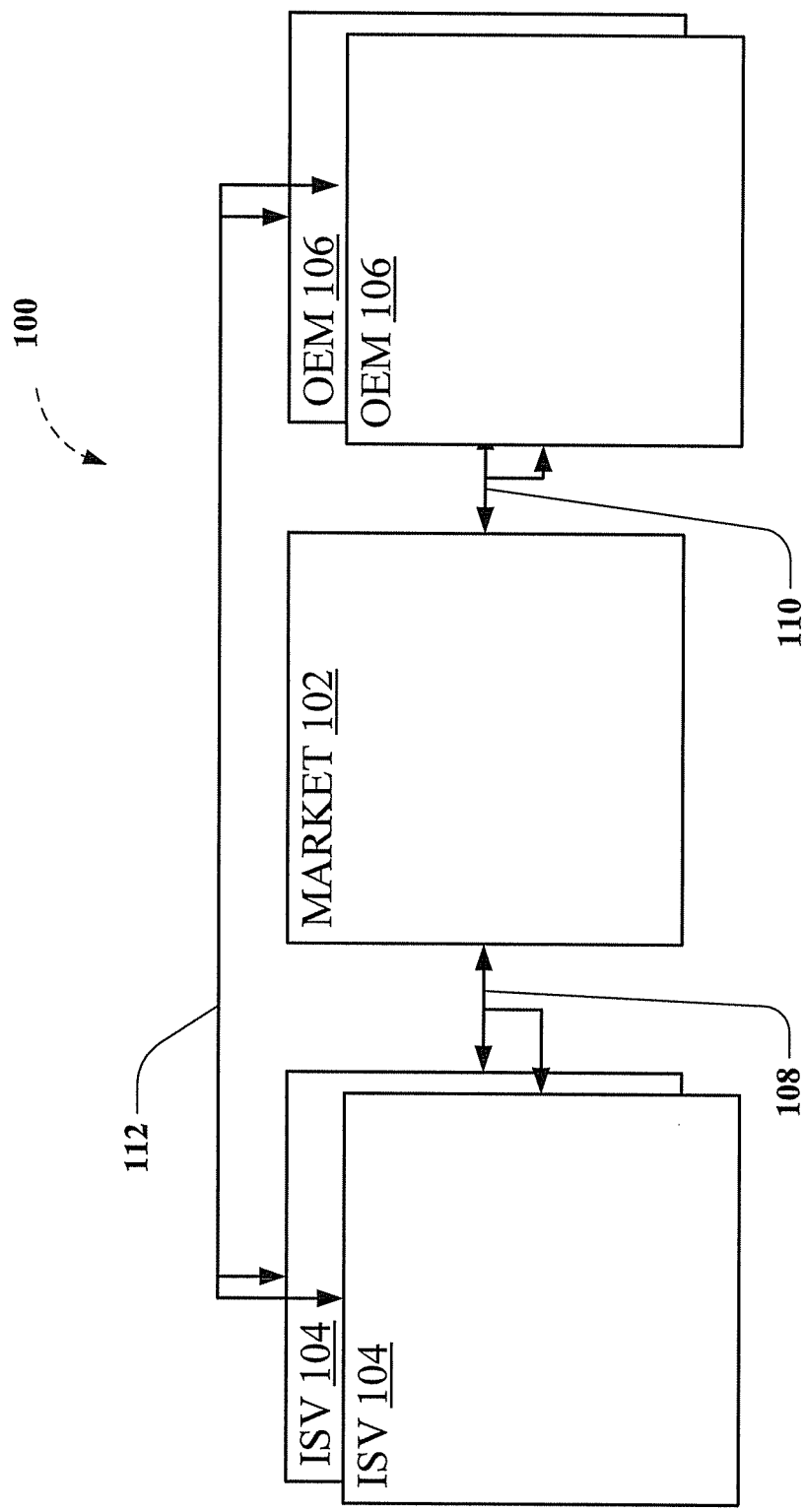
FIG. 1 depicts a functional block diagram illustrating an exemplary environment suitable for use with aspects of the disclosed subject matter.

FIG. 1 depicts a functional block diagram 100 illustrating an exemplary environment suitable for use with aspects of the disclosed subject matter. Accordingly, a marketplace, such as market 102, can be generated according to various embodiments along with a set of value-added tools and/or services that can greatly reduce the transaction costs associated with finding, negotiating, and monetizing pre-installed software and online service transactions. Advantageously, simpler and cheaper transactions will allow large OEMs to cut smaller, more targeted deals, while allowing smaller OEMs (e.g., OEMs, device redistributors, etc.) to capture an income source that would be otherwise unavailable. In addition, as further described below, revenues associated with these transactions can be generated for an owner and/or operator of the marketplace from transaction fees (e.g., commissions paid on transactions for placement or conversion) associated with transactions completed through the marketplace.

For example, the disclosed subject matter can, in various embodiments, provide a marketplace, such as market 102, that can facilitate transactions in categories of software and online services (e.g., such as major categories, sub-categories, etc.), including but not limited to privacy, security, productivity, browser, search, multimedia, entertainment and gaming, for any number and variety of devices ranging from desktop computers, laptops, and tablets to mobile phones and other devices (e.g., network capable or otherwise), such as televisions, gaming consoles, appliances, etc. To these and related ends, various embodiments of the disclosed subject matter include a marketplace, such as market 102, that can provide a neutral, secure interactive trading exchange where marketplace participants (e.g., ISVs 104, OEMs 106, device redistributors 106, etc.) can bid on or list opportunities (e.g., via auction-based listings, fixed-price listings, etc.) for the purchase or sale of pre-installed software and online services (or links, or references thereto, etc.) on listed devices. In an aspect, marketplace participants (e.g., ISVs 104, OEMs 106, device redistributors 106, etc.) can be provided with the ability (e.g., via generalized communication channels 108 and 110, etc.) to negotiate and agree on essential contract terms (e.g., pricing, quantity, delivery, quality and other terms, etc.) online. It is further noted that generalized communication channel 112 is further depicted in FIG. 1 to illustrate that, while some discussions herein refer to marketplace participants (e.g., ISVs 104, OEMs 106, device redistributors 106, etc.) accomplishing aspects of the disclosed subject matter via a marketplace, such as market 102, the disclosed subject matter is not so limited. That is, other communications channels between two marketplace participants (e.g., ISVs 104, OEMs 106, device redistributors 106, etc.) besides generalized communication channels 108 and 110 are presumed to exist and can be employed for particular aspects of the disclosed subject matter, depending on the context.

As a further example, the disclosed subject matter can, in various embodiments, provide analytics (e.g., via generalized communication paths 108 and 110, etc.) that can provide market participants such as OEMs, for example, with up-to-date information regarding global software and/or online service usage to facilitate optimizing pre-installs to the needs of an intended audience. Thus, as a further advantage, increased conversion rates made possible by aspects of the various embodiments have multiple positive impacts on market participants such as OEMs, for example. For instance, not only does the disclosed subject matter enable OEMs to generate more revenue at the point of conversions than may be otherwise possible, for example, but based on performance demonstrated by analytics, ISVs 104 can be more willing to pay increased amounts upfront to participate in models that have high conversion rates as shown in analytics.

In yet another example, the disclosed subject matter can, in various embodiments, provide metrics (e.g., data regarding specific placements, performance measurements, traffic quality regarding visitor, usage, and conversion information, and so on, etc.) to marketplace participants (e.g., ISVs 104, OEMs 106, device redistributors 106, etc.) that can give the marketplace participants the ability to track specific placements and measure performance and quality of traffic by analyzing visitor, usage, conversion information, and so on, etc.

In still another example, the disclosed subject matter can, in further embodiments, generate insights from analysis of customer usage trends (e.g., market share, visits, page views, demographics, etc.) and aggregated transaction data (e.g., price, conversions, placement location or entry point, device type, etc.) to help marketplace participants (e.g., ISVs 104, OEMs 106, device redistributors 106, etc.) better target placements, optimize revenue, and create more productive user experiences.

Thus, not only does the disclosed subject matter enable the negotiation of deals between participants who otherwise may not have access to the market, the disclosed subject matter also allows marketplace participants (e.g., ISVs 104, OEMs 106, device redistributors 106, etc.) to make more informed decisions regarding the purchase or sale of placement opportunities, as well as enabling market research into global placement activity and managing and tracking of deals made through the marketplace, such as market 102.

Accordingly, in various embodiments, an online marketplace, such as market 102, is provided for device redistributors or OEMs and software vendors such as ISVs to conduct pre-installed software and online service deals (e.g., via generalized communication paths 108 and 110, etc.). The disclosed subject matter further provides various systems, devices and methods suitable for incorporation of aspects of the disclosed subject matter. For instance, in particular non-limiting embodiments, the disclosed marketplace, such as market 102, can comprise a web-based, business to business (B2B) e-commerce licensing and distribution platform, such as an exchange or marketplace, that can leverage a network (e.g., wireless network, cellular network, the internet, etc.) to unify the currently fragmented pre-installed software and on-line services market. For example, an exemplary exchange, such as market 102, can provide a single web destination (or further web destinations targeted for specific categories or applications, devices, etc.) where buyers and sellers of software and online services can interact and transact. Advantageously, such a leveraged model can enable diverse, unconstrained match-making, fully-automated or semi-autonomous negotiation, and can provide the ability to rapidly scale to a wider network of marketplace participants. As a further example, the exemplary exchange can enable small and/or mid-size OEMs (e.g., so-called non-Tier 1 OEMs) and ISVs to strike pre-installed software or service distribution deals. As yet another advantage, the exemplary exchange can further enable large manufacturers (e.g., OEMs, device redistributors, etc.) to strike smaller, more targeted deals that have the potential to maximize per device revenue and enhance a device end user's out-of-box-experience.

While a brief overview has been described above in order to provide a basic understanding of some aspects of the specification, various non-limiting implementation scenarios are now described as a further aid in understanding the advantages and benefits of various embodiments of the disclosed subject matter. To that end, it can be understood that such scenarios are merely provided as an illustration and not limitation.

For instance, the disclosed subject matter can enable various operations for the marketplace participants (e.g., ISVs 104, OEMs 106, device redistributors 106, etc.) either in direct support of contracting for placement opportunities for software or services or ancillary thereto. In one non-limiting example, one or more ISV(s) 104 can desire to list a software application or an online service (or a link, or a reference thereto, etc.) for placement as a fixed price listing. Accordingly, in an exemplary embodiment, the one or more ISV(s) 104 can list a software or online service for placement by, for example, inputting desired terms (e.g., product description, price, device location specific placement or entry point preference (e.g., taskbar, desktop, start menu, etc.), number of placements desired, conversion terms, other contract terms, etc.), which terms can then be reviewed and the listing submitted to the marketplace, such as market 102. One or more prospective OEM(s) 106 can review listings by the one or more ISV(s) 104 and can accept the submitted offer of the one or more ISV(s) 104, for example, by indicating agreement with the terms of the submitted offer, such as, for example, clicking an "Agree to Distribute" button next to the one or more ISV(s) 104 submitted offer. The market place, such as market 102 can then transmit a confirmation to the one or more OEM(s) 106 that agree to the submitted offer and/or one or more ISV(s) 104 that submitted the offer. The above can be further understood by reference to FIGS. 2-3, 6, 11, and 15-30, etc., and the associated descriptions herein.

As described below, it can be understood that one or more of the manual operations described above can also be accomplished on behalf of the one or more OEM(s) 106 and/or the one or more ISV(s) 104 by an appropriately configured computing device. In other words, depending on a desired level of abstraction or automation, the marketplace can enable automation of any number of suitable operations which are described herein as being performed by one or more OEM(s) 106 and/or the one or more ISV(s) 104.

In a further non-limiting example, one or more OEM(s) 106 can desire to list a software or online service placement opportunity as an auction-based listing. Accordingly, in a further non-limiting embodiment the one or more OEM(s) 106 can list a software or online service placement opportunity by, for example, inputting desired terms (e.g., product specification, auction date and time, any reserve price, device location specific placement opportunities or entry points available (e.g., taskbar, desktop, start menu, etc.), number of placement opportunities available, conversion terms, other contract terms, etc.), which terms can then be reviewed and the listing submitted to the marketplace, such as market 102. One or more prospective ISV(s) 104 can review open auction listings or they can be alerted of and invited to restricted auction listings, for example, based on matching product specifications or other desired terms inputted by the one or more OEM(s) 106 to information about the one or more prospective ISV(s) 104 (e.g., profile information, product description, placement pricing information, preference information, etc.). In the event of restricted auction listings, the one or more prospective ISV(s) 104 can then review or decline the invitation to review the listing, for example, and by clicking "Accept" or "Decline," for the auction invite respectively.

In any event, the one or more prospective ISV(s) 104 can review the submitted listings by the one or more OEM(s) 106 and can bid on the submitted listing, during an auction conducted by the marketplace, such as market 102, for example, by indicating agreement a certain compensation level or other terms in accordance with the terms of the submitted listing. Upon conclusion of the auction, the marketplace, such as market 102, can alert the winner of the auction of and the one or more OEM(s) 106 with the submitted listing of agreement between the one or more prospective ISV(s) 104 and the one or more OEM(s) 106 with the submitted listing, such as, for example, sending an email to the winner of the auction and the one or more OEM(s) 106 with the submitted listing.

It should be noted that upon contract formation (e.g., a contract formed between an ISV and an OEM) for the placement of a software application or service (or a link, or a reference thereto, etc.) in the marketplace, such as market 102, contract information associated with the contract formed can be generated or created by the marketplace and stored (e.g., in market 102) to facilitate subsequent contract tracking. For instance, contract information associated with the contract formed can include one or more of a unique contract identification number, a reference to a contract tracking component (e.g., as further described below regarding FIG. 2, etc.), a trackable attribute of the contract formed (e.g., as further described below, etc.), a specific contract term for the contract formed (e.g., payment method, payment amount, etc.), or an ISV reference (e.g., a uniform resource locator (URL) to an ISV webpage or other online resource operated by or on behalf of the ISV that allows a conversion (e.g. software application to be purchased, upgraded, activated, or a service to be subscribed, renewed, etc.) as further described below regarding FIG. 2, etc.) that facilitates providing enhanced access (e.g., greater functionality after conversion) to the software application or the service (or a link, or a reference thereto, etc.), and other contract related information.

It can be understood that, while various non-limiting examples of listing types and/or payment methods are described herein for the purpose of illustration, the disclosed subject matter is not so limited. For instance, any of a number of payment methods can be supported by the marketplace, such as market 102. For example, payments between an ISV and an OEM for placement of software and/or services (or links, or references thereto, etc.) or conversion (e.g., conversion, upgrade, click-through, site visit, software or service purchase, subscription completion, renewal, etc.) thereof, can be made in a form agreeable to the ISV and an OEM. That is, methods of payment are limited only by the willingness of the ISV and the OEM to agree to the terms, subject to any commission that can be required to be paid to the owner or operator of the marketplace, such as market 102, for facilitating the transaction.

It can be further understood that, while the willingness of the owner or operator of the marketplace, such as market 102, to facilitate economically irrational activity on the market 102 can pose some practical limit in a particular implementation for particular proposed payment methods, there is not functional limit. Accordingly, some non-limiting examples of acceptable payment methods, can include a royalty (e.g., fixed, percentage-based, scaled with performance, or otherwise, etc.) based on a price paid by a user of an OEM device as part of a conversion that resulted from the contracted placement on the OEM device. Acceptable payment methods can further include an upfront bounty paid upfront (e.g., based on placement only, based on placement and expected conversion, etc.) or a bounty paid on the basis of some performance metric, (e.g., such as a click-through, a product or service activation, registration, upgrade or renewal, an activation based on first search (e.g., a fixed price for a Google™ Chrome™ browser or Desktop Search™ first search on an OEM device), a purchase and sale flat fee similar to a royalty, etc.). Further acceptable payment methods can include payments made according to a revenue-sharing agreement between the ISV and the OEM. For instance, for a software product that retails for a certain retail price, a revenue sharing agreement between the ISV and the OEM can include paying a certain percentage of the ISV's proceeds from the placement or conversion, as described above, to the OEM.

Note that for the calculation of a payment in the form of a royalty or an upfront bounty, an OEM can provide a number of devices shipped for calculation of payment under the payment method. Further note that, for the calculation of a payment in the form of a bounty paid on the basis of some performance metric, market 102, or portions thereof, can track the performance metric (e.g., network traffic, conversion, impression, click-through, a product or service activation, registration, upgrade or renewal, an activation based on first search, a purchase and sale flat fee similar to a royalty, etc.) associated with determining calculation of a payment under the payment method. In addition, for the calculation of a payment in the form of a revenue-share, conversion information (as described below) can be supplied to market 102, for example, (e.g., by an ISV in response to a query or otherwise, etc.), and the market 102, portions thereof, or associated systems, can facilitate calculation of a payment under the payment method, as further described herein.

It can be understood that any number of other payment methods can be accommodated by the marketplace, such as market 102. That is, methods of payment are limited only by the willingness of the ISV and the OEM to agree to the terms, subject to any commission that can be required to be paid to the owner or operator of the marketplace, such as market 102, for facilitating the transaction. It should be further noted that many of the aforementioned payment methods may have been heretofore unavailable in the context of contracting for placement of software or services on an OEM device as a direct implication of the inability to track performance of the contract (e.g., tracking after placement, or otherwise, etc.).

In addition, it can be further understood that any number of marketplace compensation models can be implemented as well. As a result, while particular non-limiting embodiments can be described herein as supporting particular payment or compensation methods, it should be appreciated that the disclosed subject matter is not so limited. For instance, as described below, in various embodiments, an owner or operator of the marketplace, such as market 102, or portions thereof, can accept compensation directly from one or more ISV(s) 104, one or more OEM(s) 106, or combinations thereof, and based on any payment terms (e.g., payment methods, percentages, amounts, prices, contingencies, etc.) acceptable to the parties to the transaction. As a further non-limiting example, an owner or operator of the marketplace, such as market 102, can also act as a payment agent for payments from the one or more ISV(s) 104 to the one or more OEM(s) 106. In such an exemplary embodiment, the payment agent (and/or owner or operator of the marketplace, such as market 102) can invoice one or more of the ISV and OEM on a periodic basis (e.g., a quarterly basis, or other periodic basis, etc.) based on conversion information, accept payment from the one or more ISV(s) 104 for distribution between and among the one or more OEM(s) 106 (e.g., the share of the payment from the one or more ISV(s) 104 that inures to the benefit of the one or more OEM(s) 106 under their respective contracts, etc.) and the owner or operator of the marketplace, such as market 102, (e.g., the share of the payment from the one or more ISV(s) 104 that inures to the benefit of the owner or operator of the marketplace, such as market 102, under its respective compensation contracts, etc.).

Figure 2:
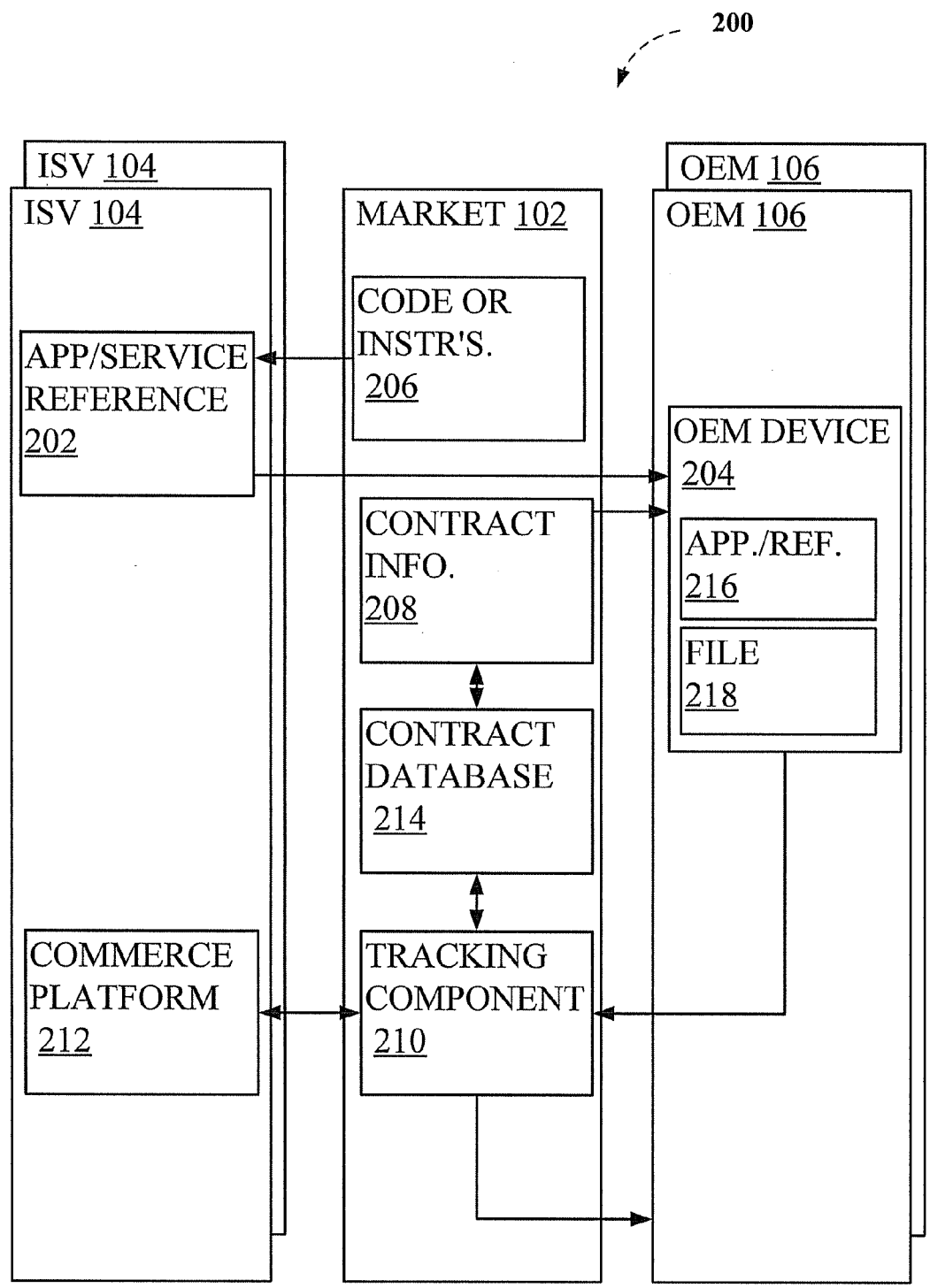
FIG. 2 depicts a functional block diagram illustrating an exemplary environment and demonstrating non-limiting aspects of the disclosed subject matter.

FIG. 2 depicts a functional block diagram 200 illustrating an exemplary environment and demonstrating non-limiting aspects of the disclosed subject matter. For example, as described above regarding FIG. 1, a marketplace, such as market 102, can be generated to facilitate finding, negotiating, and monetizing pre-installed software and online service transactions between one or more ISV(s) 104 and one or more OEM(s) 106. FIG. 2 provides a brief overview of exemplary non-limiting interactions that enable placement of a preinstalled software application (or online service, or links, or references thereto, etc.) and subsequent tracking of the placement that can transpire, for example, after a contract has been specified and agreed to, as described above, between an OEM 106 and an ISV 104. While FIG. 2 may be discussed herein with respect to placement and conversion of an application or software, it is understood that similar discussions apply to the placement of an online service (or links, or references thereto, etc.).

It is noted that, while FIG. 2 depicts market 102, OEM(s) 106, and an ISV(s) 104 as functional blocks and can be discussed below in the context of market 102, OEM(s) 106, and an ISV(s) 104 performing certain actions or functions, it can be understood that as described herein, any of such functions or action can be performed by one or more appropriately configured computing device(s) associated with, operated by, or operated on behalf of market 102, OEM(s) 106, and ISV(s) 104. Accordingly, for the purposes of illustration and not limitation, market 102, OEM 106, and/or ISV 104 can be thought of as one or more appropriately configured computing device(s) associated with, operated by, or operated on behalf of market 102, OEM 106, and ISV 104, respectively, as described herein regarding FIGS. 6, 11-14, etc., for example. In addition, while particular blocks or paths (represented by arrows) are depicted in FIG. 2, for illustrative purposes and not limitation, as existing within the realm of market 102, ISV 104, or OEM 106, the disclosed subject matter is not so limited. For instance, as further described below, one or more of the blocks (or data, functions, actions, or other thing represented by the blocks as the context indicates) can be located elsewhere in FIG. 2, depending on for example, particular configuration of an exemplary marketplace, such as market 102, etc. In various non-limiting implementations, the ability to track contract performance is provided as part of the marketplace, such as market 102, that enables marketplace participants (e.g., ISVs 104, OEMs 106, device redistributors 106, etc.) to accurately track the contract performance and profitability (e.g., results from preloads for OEMs and ISVs, determine payments, optimize conversion performance and profitability, etc.).

Accordingly, in various non-limiting implementations, the disclosed subject matter facilitates placement of and the subsequent tracking of the placement of software or services (or links, or references thereto, etc.). FIG. 2 depicts an exemplary non-limiting embodiment of a marketplace, such as market 102, facilitating the placement of and the subsequent tracking of the placement of a software application (e.g., such as a trial version, a reduced functionality version, an inactive version, or other version requiring conversion, upgrade, purchase, and so on, etc.), or online service, from ISV 104 on an OEM device 204. For instance, market 102 can make code or instructions (e.g., Code or Instr's 206) available for inclusion in App./Service Reference 202. In further non-limiting implementations, market 102 can facilitate aggregating a plurality of code or instructions (e.g., Code or Instr's 206) available for inclusion in App./Service Reference 202 (e.g., from one or more ISVs 104), aggregating a plurality of Apps./Services References 202 (e.g., from one or more ISVs 104), and/or aggregating a plurality of code or instructions (e.g., Code or Instr's 206) associated with a plurality of Apps./Services References 202 (e.g., from one or more ISVs 104) available from disparate ISVs 104 for inclusion in a device, device image, and/or software installation subroutine intended for OEM device 204. As a non-limiting example, an OEM 106 can employ market 102 to select a plurality of software applications or services (or links, or references thereto, etc.) from one or more disparate ISVs 104 for placement on OEM device 204, or market 102 can receive such selections, and in response to receiving such selections, market 102 can aggregate a plurality of code or instructions (e.g., Code or Instr's 206) associated with a plurality of Apps./Services References 202 (e.g., from one or more ISVs 104), aggregate a plurality of Apps./Services References 202 (e.g., from one or more ISVs 104), and so on, and make such code or instructions and/or Apps./Services References 202 available to OEM 106 (e.g., in the form of a pre-packaged installer, a linked list, or other data structure suitable for creating a device image for OEM device 204, or otherwise installing such code or instructions on OEM device 204, etc.). As a further non-limiting example, OEM 106 can employ market 102 to select a trial version of an anti-virus application from a first ISV 104 predetermined to be shown on a desktop of OEM device 204 and to select a link to an online movie service by a second disparate ISV 104 to be shown in the start menu on OEM device 204. Market 102 can receive such selections, and in response to receiving such selections, market 102 can, on behalf of OEM 106, aggregate a plurality of code or instructions (e.g., Code or Instr's 206) associated with a plurality of the Apps./Services References 202 (e.g., from one or more ISVs 104), aggregate a plurality of the Apps./Services References 202 (e.g., from one or more ISVs 104) associated with the trial version of the anti-virus application and the online movie service, and so on and can make such code or instructions available to OEM 106.

In addition, as described above, upon contract formation (e.g., a contract formed between ISV 104 and OEM 106) for the placement of a software application or service (or a link, or a reference thereto, etc.) (e.g., App./Service Reference 202 as modified by including or incorporating Code or Instr's 206) in the marketplace, such as market 102, contract information (e.g., Contract Info. 208) associated with the contract formed can be generated or created and stored in market 102 to facilitate subsequent contract tracking. For instance, contract information (e.g., Contract Info. 208) associated with the contract formed can include one or more of a unique contract identification number, a reference to a contract tracking component (e.g., Tracking Component 210), a trackable attribute of the contract formed (e.g., as further described below, etc.), a specific contract term for the contract formed (e.g., payment method, payment amount, etc.), or an ISV 104 reference (e.g., a URL to an ISV webpage or other online resource operated by or on behalf of the ISV that allows a conversion (e.g. software application to be purchased, upgraded, activated, or a service to be subscribed, renewed, etc.) etc.), such as a reference to ISV 104 Commerce Platform 212, that facilitates providing enhanced access (e.g., greater functionality after conversion) to the software application or the service (or a link, or a reference thereto, etc.), and other contract related information. Thus, in addition to making code or instructions (e.g., Code or Instr's 206) available for inclusion in App./Service Reference 202, facilitating aggregation of a plurality of code or instructions (e.g., Code or Instr's 206), facilitating aggregation of a plurality of Apps./Services References 202 (e.g., from one or more ISVs 104), and so on, market 102 can facilitate providing contract information (e.g., Contract Info. 208) to OEM 106 to facilitate subsequent contract tracking (e.g., associating Contract Info. 208 with Code or Instr's 206, aggregated Code or Instr's 206, and so on, etc. on OEM device 204) to facilitate subsequent contract tracking. For instance, contract information (e.g., Contract Info. 208) can be associated with code or instructions (e.g., Code or Instr's 206), an aggregated plurality of code or instructions (e.g., Code or Instr's 206), an aggregated plurality of Apps./Services References 202 (e.g., from one or more ISVs 104), and so on for and/or by OEM 106 (e.g., included in a pre-packaged installer, a linked list, or other data structure created by market 102, or otherwise, suitable for creating a device image for OEM device 204, or otherwise installing such code or instructions on OEM device 204, such as OEM device 204 image creation, etc.).

It should be noted that, for various non-limiting embodiments, any of the contract information can be stored in the Contract Database 214 associated with market 102, for example, according to the unique contract identification number, along with other contract information (e.g., any trackable attribute(s) of the contract formed, any ISV 104 references, such as to Commerce Platform 212, any contract term(s), specific or otherwise, for the contract formed, OEM device 204 information, OEM 106 and ISV 104 information, payment methods and terms, metrics to be determined, etc.) and other related information (e.g., additional tracking information as further described below, etc.) to facilitate various aspects of the disclosed subject matter.

It is further noted that, as can be understood by review of the disclosed subject matter, a trackable attribute of the contract formed can include any of a number of attributes of interest to an ISV 104 or an OEM 106 as part of tracking the performance of the contract formed in the marketplace, such as market 102. For instance, as non-limiting examples, trackable attributes of the contract formed can include a specific contract term for the contract formed (e.g., payment method, payment amount, etc.), desired terms (e.g., product description, price, device location specific placement or entry point preferences, references thereto, and unique trackable location or entry point identification numbers associated therewith (e.g., for taskbar, desktop, start menu, browser favorite, general pop-up, context-specific pop-up, and the like, etc. location preferences, references thereto, and unique trackable location or entry point identification numbers associated therewith) or, number of placements desired, conversion terms, other contract terms, etc.), device type, category of software or service, and so on, etc. Thus, if an attribute concerning the contract formed would be of interest in tracking the performance thereof, then the attribute can be a trackable attribute of the contract formed.

According to various non-limiting embodiments, Code or Instr's 206 can, for example, be adapted to provide a reference to a contract tracking component (e.g., a URL to a market 102 webpage or other online resource operated by or on behalf of market 102 that comprises a Tracking Component 210 as further described herein, etc.). The Code or Instr's 206 can be further adapted to direct the OEM device 204 to employ a subset of the contract information (e.g., such as the unique contract identification number, etc.) upon invoking, starting, accessing, or otherwise executing the software application (e.g., for a first instance, or any subsequent instance for which it is desired to present a conversion opportunity, etc.), or accessing the service (or a link, or a reference thereto, etc.) (e.g., following a URL to an ISV 104 webpage or other online resource operated by or on behalf of ISV 104 that that presents a service conversion opportunity as further described herein, etc.).

Thus, in various exemplary implementations of a marketplace, such as market 102, of FIG. 2, code or instructions (e.g., Code or Instr's 206) can be made available for incorporation or inclusion in App./Service Reference 202. For example, code or instructions (e.g., Code or Instr's 206) can comprise a Code Snippet that can be added by ISV 104 to its client-side application or reference to an online service (e.g., App./Service Reference 202). In the alternative, ISV 104 can provide the application to the market 102 and market 102 can facilitate including code or instructions (e.g., Code or Instr's 206) into the application or reference to an online service (e.g., App./Service Reference 202). In either event, the resulting App./Ref. 216 can be stored on OEM device 204, either with or without participation of the marketplace, such market 102. In addition, as further described above, the code or instructions (e.g., Code or Instr's 206), such as the Code Snippet, can be adapted to direct the OEM device 204 to employ a subset of the contract information (e.g., such as by locating the unique contract identification number and/or other contract information stored on the OEM device 204 in a file 218 in the application's or service's working folder, etc.) upon invoking, starting, accessing, or otherwise executing the software application or accessing the reference to the online service.

As a further example, ISV 104 can add a method for its application (e.g., App./Service Reference 202) in the form of a C# (C Sharp) application, where the method can take the form "<For tracking code snippet, see file "CodeSnippet.cs">," and where the "CodeSnippet.cs," can be adapted to direct the OEM device 204 to employ a subset of the contract information stored on the OEM device 204 in an exemplary file 218 as described. It is noted that the file extension .cs is intended to relate that the file is a source code file used, for example, by Microsoft® Visual C#® (C Sharp) and C#® .NET development software.

As a further described above, Code or Instr's 206 can be further adapted to direct the OEM device 204 to employ a subset of the contract information (e.g., such as by locating the unique contract identification number and/or other contract information stored on the OEM device 204 in an exemplary file 218 in the application's or service's working folder, etc.) upon invoking, starting, accessing, or otherwise executing the software application or accessing the reference to the online service. For instance, as can be seen in FIG. 2, contract information (e.g., Contract Info. 208) can be created or generated in response to a contract formed between ISV 104 and OEM 106. In addition, contract information (e.g., Contract Info. 208) can be stored in an exemplary file 218, such as in a memory, in OEM device 204, as further described below. As further described above, a subset of the contract information (e.g., the unique contract identification number and/or other contract information stored on the OEM device 204, such as a reference to a contract tracking component (e.g., Tracking Component 210, etc.) can be stored in the file 218 in the application's or service's working folder, for example.

As a further non-limiting example, file 218 can comprise a string of the form, $$\langle a\rangle \text{ref=http://www.market.com/XXXX-XXXX-XXXX-XXXX}\langle /a\rangle, \quad (1)$$

where the string, "XXXX-XXXX-XXXX-XXXX," can represent the unique contract identification number for the contract of interest involving OEM device 204, and the remainder string, "<a>ref=http://www.market.com/ . . . </a>," comprises a URL stub that can represent a reference to a contract tracking component (e.g., Tracking Component 210) associated with market 102. It can be understood that, while the above strings are depicted in plain text, the disclosed subject matter is not so limited. For instance, cypher text, coded text, or otherwise secured information could be used similarly with appropriate complementary functionality or calls added (e.g., added in Code or Instr's 206, calling existing functionality etc.) to decipher or otherwise decode the strings. Accordingly, in various non-limiting implementations, upon invoking, starting, accessing, or otherwise executing the software application or accessing the reference to the online service, such as App./ Ref. 216 (e.g., App./Service Reference 202 as modified by including or incorporating Code or Instr's 206, etc.), OEM device 204 can be directed to employ a subset of the contract information (e.g., such as by locating the unique contract identification number and/or other contract information stored on the OEM device 204 in file 218, for example, in the application's or service's working folder, etc.). As a result, the OEM device 204 employing a subset of the contract information in exemplary file 218 can facilitate redirecting the request on the OEM device 204 (e.g., the invoking, starting, accessing, or otherwise executing the software application or accessing the reference to the online service, etc.) to a contract tracking component (e.g., Tracking Component 210, etc.).

In a further aspect of exemplary non-limiting implementations, the contract tracking component (e.g., Tracking Component 210, etc.) can forward the request based on an ISV reference (e.g., a URL to an ISV webpage or other online resource operated by or on behalf of the ISV that allows a conversion (e.g. software application to be purchased, upgraded, activated, or a service to be subscribed, renewed, etc.) that facilitates providing enhanced access (e.g., greater functionality after conversion) to the software application or the service (or a link, or a reference thereto, etc.) (e.g., ISV reference to ISV 104 Commerce Platform 212, etc.). For instance, when URL request is received from OEM device 204 (e.g., having the requisite form such as in file 218, etc.) a contract tracking component (e.g., Tracking Component 210, etc.) can employ a subset of the contract information (e.g., such as the unique contract identification number appended in the URL request, etc.) to determine deal-specific information (e.g., OEM 106, ISV 104, ISV reference to ISV 104 Commerce Platform 212, etc.).

As a result of the determination, contract tracking component (e.g., Tracking Component 210, etc.) can automatically forward the URL request (e.g., with or without any additional tracking information determined by, for example, reference to Contract Database 214 for the unique contract identification number, etc.) to the ISV reference (e.g., ISV reference to ISV 104 Commerce Platform 212, an ISV 104 "Buy/Upgrade" Web Page as defined in an associated marketplace listing, as stored in Contract Database 214, etc.). For instance, it can be understood that various ISV(s) 104 can employ one or more of a multitude of possible e-commerce solutions, each of which can have particular requirements (e.g., query syntax, allowed methods, authentication, access, and authorization protocols, communications protocols, etc.). Furthermore, for small and mid-level ISV(s) 104, it can be further understood that such e-commerce solutions can be contracted out to one or more of a myriad of e-commerce providers. In any event, it can be expected that for a particular ISV 104, requests or queries made to ISV 104 Commerce Platform 212 would be required to meet the particular requirements as described above as well as comprise information associated proper authentication, access, and authorization if required.

As a result, contract tracking component (e.g., Tracking Component 210, etc.) can further determine any additional tracking information by, for example, reference to Contract Database 214 for the unique contract identification number, to be transmitted to the ISV 104 to facilitate automatically forwarding the URL request. Accordingly, various non-limiting embodiments can be adapted to append any additional tracking information to the forwarded request to facilitate configuring the request per the web page or e-commerce platform tracking requirements (e.g., web page or tracking requirements of ISV 104 Commerce Platform 212, etc.). In other non-limiting implementations, the request to be forwarded can further account for additional tracking information as determined by the contract tracking component (e.g., Tracking Component 210, etc.) by, for example, reference to Contract Database 214. For instance, additional tracking information can include information (e.g., account numbers, contract information, settings, preferences, amplifying information, etc.) retrieved from the Contract Database 214 relevant to the request to be forwarded. As a further example, an exemplary request to be forwarded can comprise a string of the form, http://www.example.com/offer?Mpc=AF-APA-FMTG-EN-USD-CTL-00000-00000,     (2)

where the string, "offer?Mpc=AF-APA-FMTG-EN-USD-CTL-00000-00000," can represent additional tracking information to be used for the contract of interest involving OEM device 204 and ISV 104 and comprising information adapted to configure the request per ISV 104 web page or e-commerce platform tracking requirements, and the remainder string, "http://www.example.com/," comprises a URL stub that can represent an ISV reference to ISV 104 Commerce Platform 212.

Accordingly, in the event that a conversion (e.g., conversion, upgrade, click-through, site visit, software or service purchase, subscription completion, renewal, etc.) takes place as a result of the request automatically forwarded by the contract tracking component (e.g., Tracking Component 210, etc.), various embodiments of the marketplace, such as market 102, can track the conversion (e.g., either in real-time or periodically for batch processing, etc.), such as by querying the ISV 104 Commerce Platform 212 or otherwise. As a result, and as a result of tracking the placement and conversion on the basis of a subset of contract information (e.g., the unique contract identification number, etc.), deal level performance metrics can be easily determined as described above for one or more of the ISV 104 or the OEM 106. In addition, the marketplace, such as market 102, can further combine individual contract information for a particular ISV 104 or a particular OEM 106 to report the aggregate private data, respectively (e.g., metrics such as data regarding specific placements, performance measurements, traffic quality regarding visitor, usage, and other conversion information, and so on, etc.), or on a more global basis as described above, after removing identifying information for example to facilitate conducting market research (e.g., regarding global software and online service usage, etc.). Thus, in various non-limiting embodiments, the disclosed subject matter can provide the ability to optimize revenues from an analysis of customer usage and transaction data. For instance, as described above the platform can generate insights from the analysis of customer usage trends (market share, visits, page views, demographics, etc.) and aggregated transaction data (e.g., price, conversions, placement location or entry point, device type, etc.) to help OEMs 106 and ISVs 104 more effectively target placements and optimize revenues.

Example Methods

Figure 3:
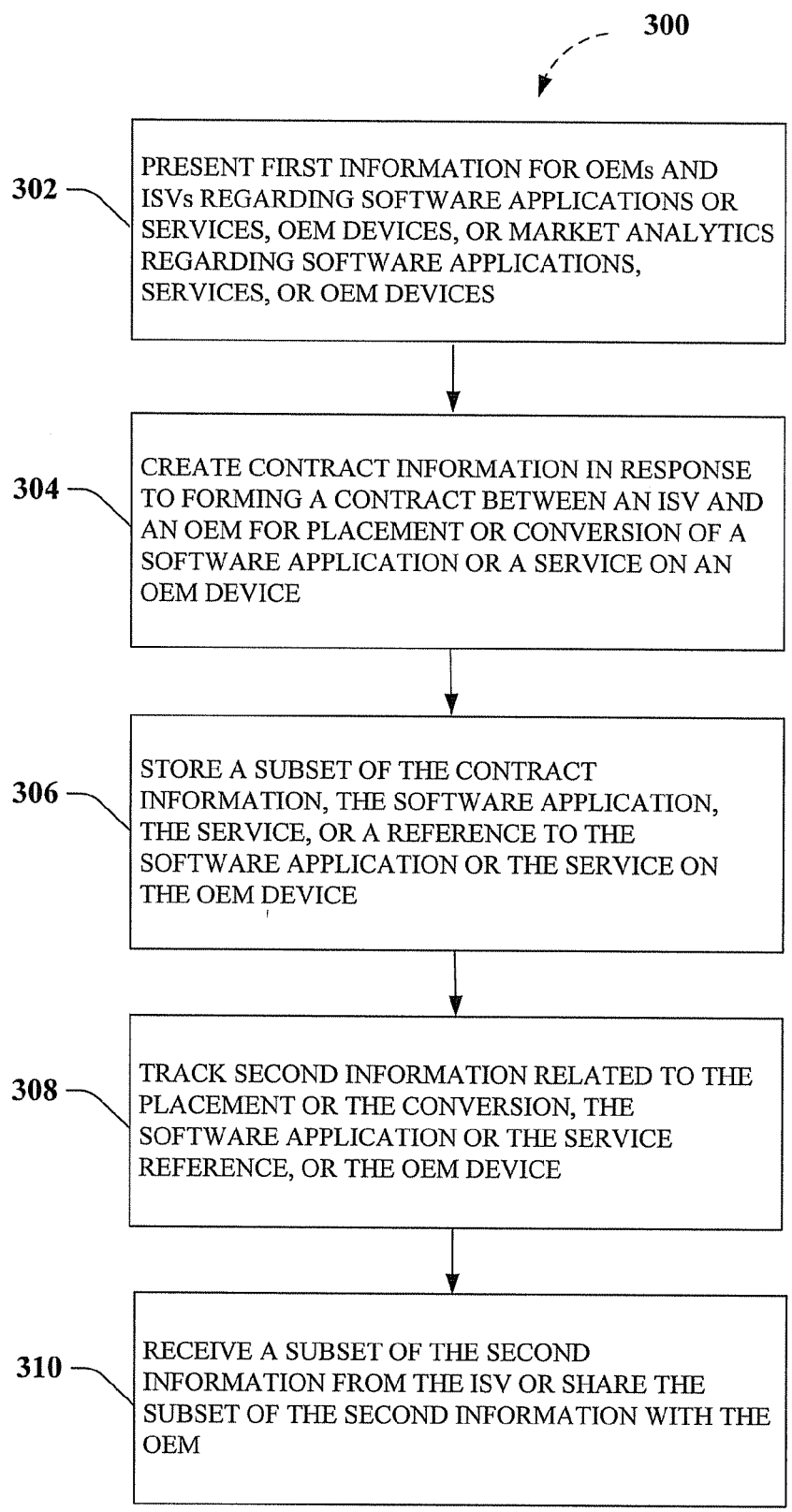
FIG. 3 illustrates an exemplary non-limiting flow diagram of methods for performing aspects of embodiments of the disclosed subject matter.
Figure 4:
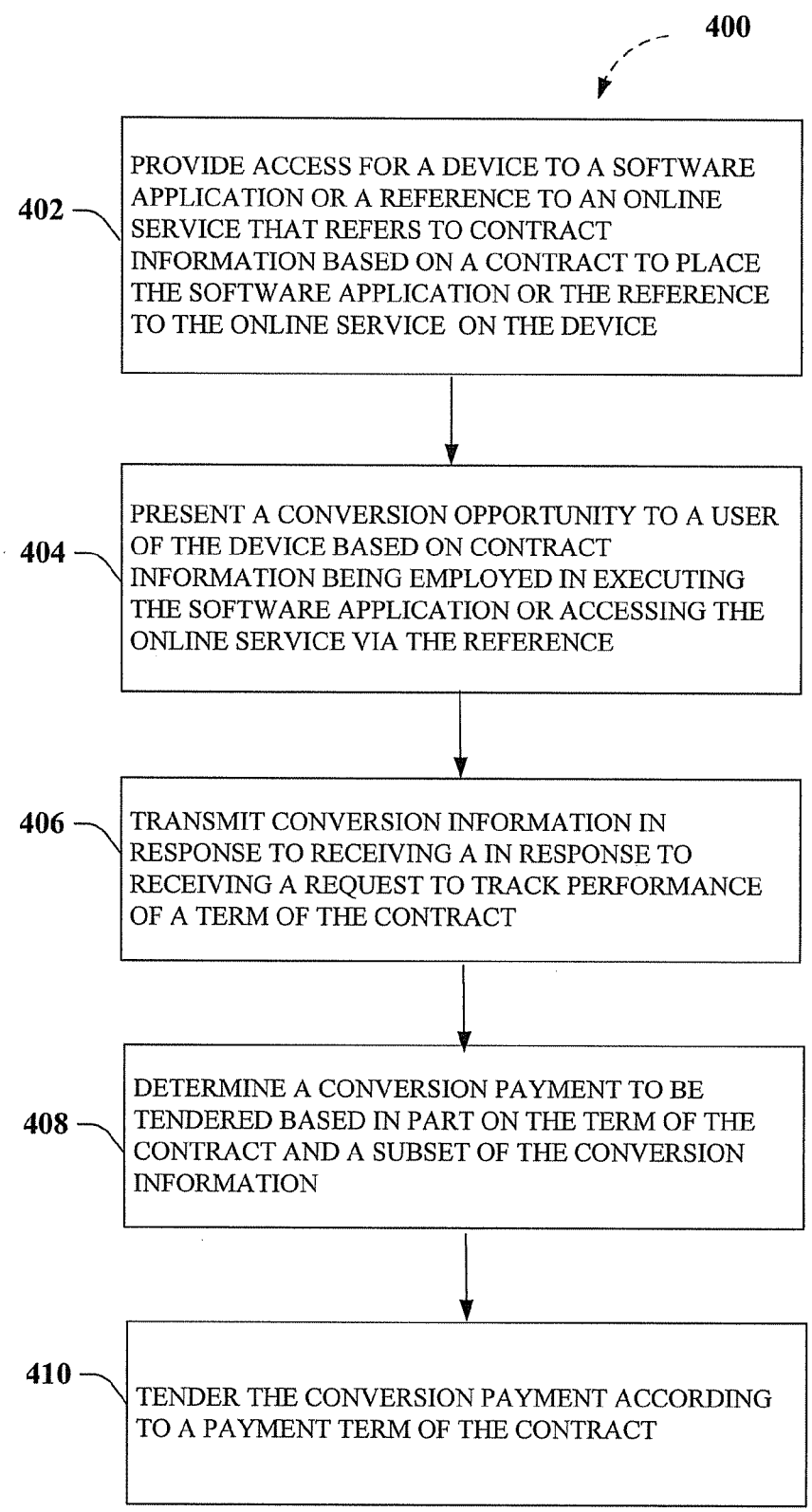
FIG. 4 illustrates a further non-limiting flow diagram of methods for performing aspects of embodiments of the disclosed subject matter.
Figure 5:
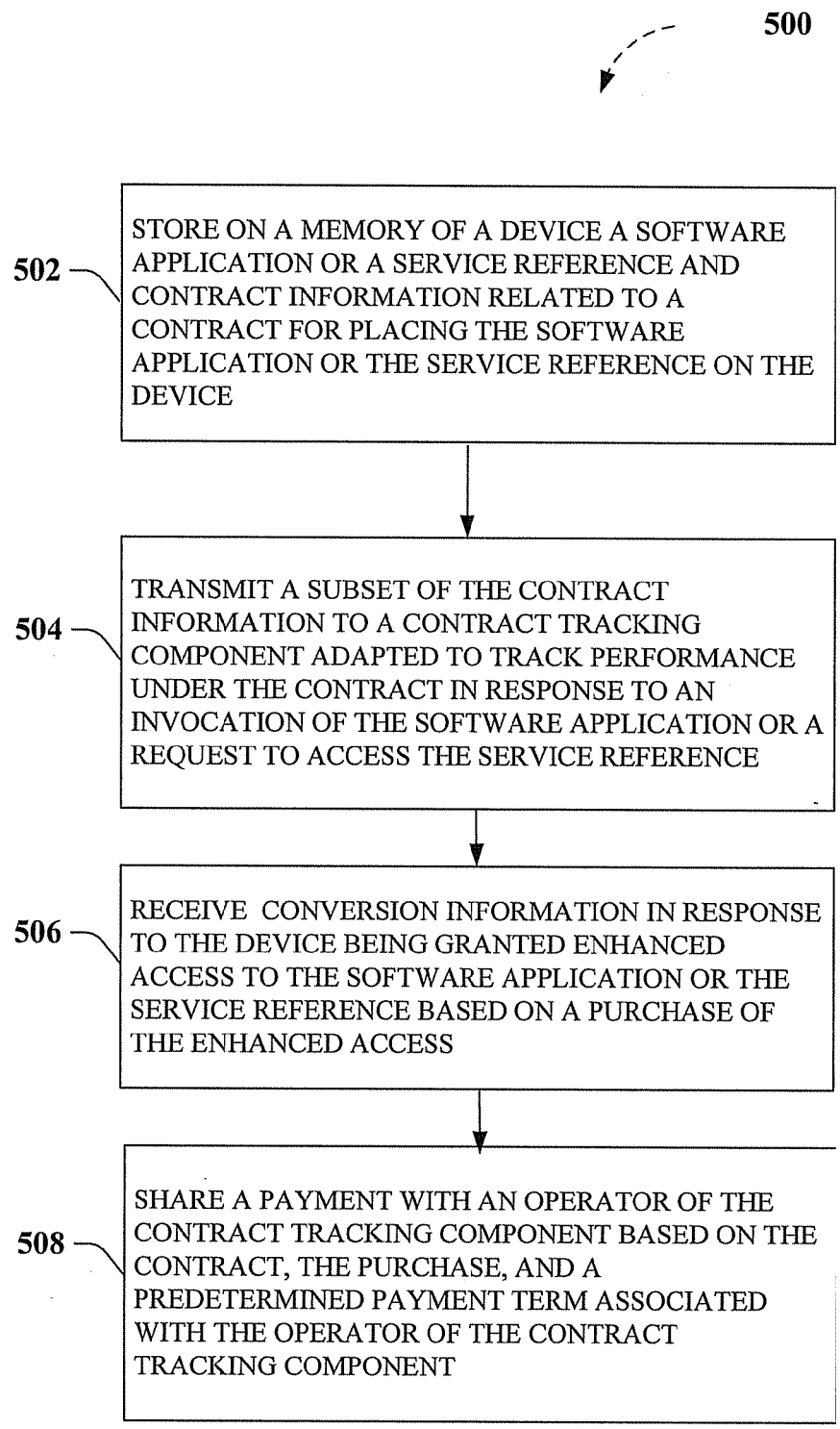
FIG. 5 depicts an exemplary non-limiting flow diagram illustrating various aspects of exemplary methods of the disclosed subject matter.

Accordingly, in view of the exemplary embodiments described supra, methods that can be implemented in accordance with the disclosed subject matter will be better appreciated with reference to the flowcharts of FIGS. 3-5. While for purposes of simplicity of explanation, the methods are shown and described as a series of blocks, it is to be understood and appreciated that the claimed subject matter is not limited by the order of the blocks, as some blocks may occur in different orders and/or concurrently with other blocks from what is depicted and described herein. Where non-sequential, or branched, flow is illustrated via flowchart, it can be understood that various other branches, flow paths, and orders of the blocks, can be implemented which achieve the same or a similar result. Moreover, not all illustrated blocks may be required to implement the methods described hereinafter.

FIG. 3 illustrates an exemplary non-limiting flow diagram of methods 300 for performing aspects of embodiments of the disclosed subject matter. For instance, referring to FIG. 3, methods 300 can facilitate contracting for placement or conversion of a software application or a service (or a link, or a reference thereto, etc.) (e.g., App./Ref. 216, etc.) on an OEM device (e.g., OEM device 204, etc.). As a non-limiting example, at 302, information (e.g., first information) can be presented (e.g., via a user interface, such as a graphical user interface or otherwise, a database exposed to manual or automated queries, or combinations thereof, of one or more computing device(s), and so on, etc.) regarding one or more ISV software application(s) or service(s) (e.g., a plurality of App./Ref. 216, for disparate ISVs 104, etc.), one or more OEM device(s) (e.g., OEM devices 204 of disparate OEMs 106, etc.), or one or more market analytic(s) as described herein for the one or more ISV software application(s) or service(s), or the one or more OEM devices. For instance, as further described below, regarding FIGS. 11, 15, 30, etc., for example, first information can be presented regarding one or more market analytic(s) to facilitate contracting for placement or conversion of a software application or a service (or a link, or a reference thereto, etc.) (e.g., App./Ref. 216, etc.) on an OEM device (e.g., OEM device 204, etc.). In an example, one or more market analytic(s) can be employed (e.g., directly by revealing the one or more market analytic(s) to OEMs 106, ISVs 104, and so on, derivatively, for example, by making recommendations for contracting for placement or conversion, and/or any combination of these or other suitable uses of one or more market analytic(s), etc.) to facilitate decision making (e.g., decision making via a manual, semi-automated, or fully automated process, according to a decision tree, a decision matrix, heuristic, inference, artificial intelligence or other decision tool, or any combination, etc.). As a further non-limiting example, at 302, information (e.g., first information) can be presented, for instance, to one or more OEM(s) 106 and/or one or more ISV(s) 104 regarding the one or more ISV software application(s) or service(s) or the one or more OEM device(s) (e.g., OEM devices 204 of disparate OEMs 106, etc).

In a further non-limiting example, in response to forming a contract between an ISV 104 and an OEM 106 for one or more of the placement or conversion of a software application or a service (or a link, or a reference thereto, etc.) on the OEM device 204, contract information can be created or generated at 304. For instance, creating or generating contract information can include creating or generating Contract Info. 208 associated with forming the contract, which can be stored in market 102 (e.g., in Contract Database 214) to facilitate subsequent contract tracking. In a further example, as described above, contract information created or generated in response to or associated with forming the contract can include one or more of a unique or trackable contract identification number, a reference to a contract tracking component (e.g., Tracking Component 210), a trackable attribute of the contract (e.g., as further described above, etc.), a specific contract term for the contract, or an ISV reference (e.g., such as an ISV reference to ISV 104 Commerce Platform 212, etc.) that facilitates providing enhanced access to the software application or the service (or a link, or a reference thereto, etc.).

As further described above in reference to FIG. 2, methods 300 can further include storing, at 306, a subset of the contract information (e.g., up to and including the contract information, or more, etc.), the software application, or the service (or a link, or a reference thereto, etc.) on the OEM device 204. For instance, OEM device 204 can comprise a memory or storage component, as further described herein, that can store information (e.g., data, instruction(s), etc.). As a further example, as described above, in addition to making code or instructions (e.g., Code or Instr's 206) available for inclusion in App./Service Reference 202, facilitating aggregation of a plurality of code or instructions (e.g., Code or Instr's 206), facilitating aggregation of a plurality of Apps./Services References 202 (e.g., from one or more ISVs 104), and so on, market 102 can facilitate providing contract information (e.g., Contract Info. 208) to OEM 106 to facilitate subsequent contract tracking (e.g., associating Contract Info. 208 with Code or Instr's 206, aggregated Code or Instr's 206, and so on, etc. on OEM device 204) to facilitate subsequent contract tracking. In addition, based on the contract information or a subset thereof, for example, methods 300 can further comprise tracking second information (e.g., conversion information, etc.), at 308, related to one or more of the placement or the conversion (e.g., placement or the conversion of the software application or the service (or a link, or a reference thereto, etc.)), the software application or the service (or a link, or a reference thereto, etc.), or the OEM device 204. For example, tracking second information (e.g., conversion information, etc.) can include tracking whether a conversion occurs for a specific placement, whether an event at an OEM device 204 (e.g., the invoking, starting, accessing, or otherwise executing the software application or accessing the reference to the online service, etc.) caused a request to a contract tracking component (e.g., Tracking Component 210, etc.) of market 102, such as a click-through, other metrics (e.g., such as data regarding specific placements, performance measurements, traffic quality regarding visitor, usage, and other conversion information, and so on, etc.). As further described above, various embodiments of the marketplace, such as market 102, can track conversions (e.g., either in real-time or otherwise, such as periodically for batch processing, etc.), and associated conversion information, such as by querying the ISV 104 Commerce Platform 212 or otherwise. Thus, in yet other non-limiting examples, methods 300 can include receiving a subset of the second information (e.g., up to and including the second information, such as the conversion information, or more, etc.), as described above, from ISV 104 (e.g., in market 102, etc.) or sharing, at 310, the subset of the second information with the OEM 106, for example, such as by combining individual contract information for a particular ISV 104 or a particular OEM 106 to report the aggregate private data, respectively (e.g., reported as metrics such as data regarding specific placements, performance measurements, traffic quality regarding visitor, usage, and other conversion information, and the like, or otherwise, etc.).

In further non-limiting methods 300, the methods can include incorporating instructions (e.g., Code or Instr's 206) into the software application or the service (or a link, or a reference thereto, etc.) (e.g., modifying App./Service Reference 202 by including or incorporating Code or Instr's 206, etc.). For example, the instructions can be adapted to direct the OEM device 204 to employ the subset of the contract information (e.g., up to and including the contract information, or more, such as the trackable unique contract identification number, etc.) upon invoking the software application or accessing the service (or a link, or a reference thereto, etc.). For instance, upon invoking, starting, accessing, or otherwise executing the software application (e.g., for a first instance, or any subsequent instance for which it is desired to present a conversion opportunity, etc.) (or a link, or a reference thereto, etc.), or accessing the service (or a link, or a reference thereto, etc.), such as, for example following a URL to an ISV 104 webpage or other online resource operated by or on behalf of ISV 104 that that presents a conversion opportunity, such as ISV reference to ISV 104 Commerce Platform 212, etc.), the OEM device 204 can be directed to employ the subset of the contract information (e.g., up to and including the contract information, or more, etc.), for instance, in directing a URL request to the contract tracking component (e.g., Tracking Component 210, etc.) of market 102. Thus, methods 300 can further include receiving the subset of the contract information (e.g., up to and including the contract information, or more, etc.) from the OEM device 204 in response to the invoking the software application or accessing the service (or a link, or a reference thereto, etc.).

In a further example, methods 300 can include incorporating instructions (e.g., Code or Instr's 206) into the software application or the service (or a link, or a reference thereto, etc.) (e.g., modifying App./Service Reference 202 by including or incorporating Code or Instr's 206, etc., etc.) by sending instructions (e.g., Code or Instr's 206) to the ISV 104 to incorporate the instructions into the software application or the service (or a link, or reference thereto, etc.). In other exemplary implementations, the software application or the service (or a link, or reference thereto, etc.) can be sent to the market 102 for incorporating instructions (e.g., Code or Instr's 206) into the software application or the service (or a link, or a reference thereto, etc.) (e.g., modifying App./Service Reference 202 by including or incorporating Code or Instr's 206, etc., etc.).

In yet another non-limiting implementation of methods 300, additional tracking information can be determined that is to be transmitted to the ISV 104. For instance, as described above in reference to FIG. 2, contract tracking component (e.g., Tracking Component 210, etc.) can further determine any additional tracking information by, for example, reference to Contract Database 214 for the trackable or unique contract identification number, to be transmitted to the ISV 104, such as for example, to facilitate automatically forwarding the URL request. As a further example, additional tracking information can comprising information adapted to configure a request per ISV 104 web page or e-commerce platform tracking requirements (e.g., web page or tracking requirements of ISV 104 Commerce Platform 212, etc.).

In still other non-limiting implementations of methods 300, a payment can be determined (e.g., determined by one or more of market 102, ISV 104, OEM 106, or automated systems acting on behalf of ISV 104 of OEM 106, or portions thereof, etc.) based on the placement, the conversion, the invoking, or the accessing, as described herein. For instance, as further described above, the payment can be determined as a first payment payable to the OEM 106, a second payment payable for use the contract tracking component (e.g., Tracking Component 210, etc.) of market 102 and/or the user interface, and/or a third payment payable from the ISV 104, or any combination thereof. Thus, exemplary methods can include receiving the payment including receiving the first, second, or third payment or any combination thereof. For example, as described above, an owner or operator of the marketplace, such as market 102, can also act as a payment agent for payments from the one or more ISV(s) 104 to the one or more OEM(s) 106. In such an exemplary embodiment, the payment agent (and/or owner or operator of the marketplace, such as market 102) can accept or receive payment from the one or more ISV(s) 104 for distribution between and among the one or more OEM(s) 106 (e.g., the share of the payment from the one or more ISV(s) 104 that inures to the benefit of the one or more OEM(s) 106 under their respective contracts, etc.) and the owner or operator of the marketplace, such as market 102 (e.g., the share of the payment from the one or more ISV(s) 104 that inures to the benefit of the owner or operator of the marketplace, such as market 102, under its respective compensation contracts, etc.). As further described above, any number and combination of payment methods can be employed subject to the approval of the owner or operator of the marketplace, such as market 102.

In further non-limiting implementations of methods 300, at 302, information (e.g., first information) can be presented (e.g., via a user interface, such as a graphical user interface or otherwise, a database exposed to manual or automated queries, or combinations thereof, of one or more computing device(s), and so on, etc.) regarding one or more ISV software application(s) or service(s) (e.g., a plurality of App./Ref. 216, for disparate ISVs 104, etc.), one or more OEM/EV device(s) (e.g., OEM devices 204 of disparate OEMs 106, etc.), or one or more market analytic(s) as described herein for the one or more ISV software application(s) or service(s), or the one or more OEM devices. In addition, in response to forming a contract between one or more ISVs 104 and an EV (e.g., OEM 106) for one or more of the placement or conversion of software applications or services (or links, or a references thereto, etc.) on the OEM device 204, contract information can be created or generated at 304. As a non-limiting example, an EV (e.g., OEM 106) can, via market 102, indicate the intention to contract with multiple disparate ISVs 104 regarding multiple ISV software application(s) or service(s). In that regard, contract information can be generated having portions of information related to one or more of the disparate ISVs 104, the one or more ISV software application(s) or service(s), and so on, or any combination sufficient to facilitate contract tracking.

In addition, instructions can be incorporated into or associated with a subset of the one or more software applications or services (or links, or a references thereto, etc.). For example, such instructions can be adapted to direct the OEM device 204 to employ a subset of the contract information upon invoking or accessing one or more of the ISV software application(s) or service(s). Thus, as further described above, in addition to making code or instructions (e.g., Code or Instr's 206) available for inclusion in App./Service Reference 202, facilitating aggregation of a plurality of code or instructions (e.g., Code or Instr's 206), facilitating aggregation of a plurality of Apps./Services References 202 (e.g., from one or more ISVs 104), and so on, market 102 can facilitate providing contract information (e.g., Contract Info. 208) to OEM 106 to facilitate subsequent contract tracking (e.g., associating Contract Info. 208 with Code or Instr's 206, aggregated Code or Instr's 206, and so on, etc. on OEM device 204) to facilitate subsequent contract tracking. Accordingly, an EV/OEM can employ market 102 to select any number of ISV software application(s) or service(s), and market 102 can aggregate the selected ISV software application(s) or service(s), can incorporate or associate appropriate instructions or aggregated instructions, and can make such software application(s), service(s), and/or instructions available to the EV/OEM (e.g., OEM 106) for placement on OEM device 204.

FIG. 4 illustrates a further non-limiting flow diagram of methods 400 for performing aspects of embodiments of the disclosed subject matter. For example, methods 400 can facilitate distributing software or promoting online services as further described herein. For instance, referring to FIG. 4, at 402 of methods 400, access for a device (e.g., OEM device 204, etc.) to a software application or an online service (or a link, or a reference thereto, etc.) (e.g., App./Ref. 216, etc.) can be provided, wherein the software application or the online service (or a link, or a reference thereto, etc.) refers to contract information stored in a memory of the device (e.g., OEM device 204), and wherein the contract information is based on information associated with a contract to place the software application or the online service (or a link, or a reference thereto, etc.) (e.g., App./Ref. 216) on the device (e.g., OEM device 204). As further described above, in addition to making code or instructions (e.g., Code or Instr's 206) available for inclusion in App./Service Reference 202, facilitating aggregation of a plurality of code or instructions (e.g., Code or Instr's 206), facilitating aggregation of a plurality of Apps./Services References 202 (e.g., from one or more ISVs 104), and so on, market 102 can facilitate providing contract information (e.g., Contract Info. 208) to OEM 106 to facilitate subsequent contract tracking (e.g., associating Contract Info. 208 with Code or Instr's 206, aggregated Code or Instr's 206, and so on, etc. on OEM device 204) to facilitate subsequent contract tracking. Thus, contract information (e.g., Contract Info. 208) can be associated with code or instructions (e.g., Code or Instr's 206), an aggregated plurality of code or instructions (e.g., Code or Instr's 206), an aggregated plurality of Apps./Services References 202 (e.g., from one or more ISVs 104), and so on for and/or by OEM 106 (e.g., included in a pre-packaged installer, a linked list, or other data structure created by market 102, or otherwise, suitable for creating a device image for OEM device 204, or otherwise installing such code or instructions on OEM device 204, such as OEM device 204 image creation, etc.).

In further exemplary implementations of methods 400, a conversion opportunity can be presented at 404 to a user of device (e.g., OEM device 204, etc.) based in part on contract information being employed in executing or downloading the software application or accessing the online service (e.g., either directly on the device or via a link, or a reference thereto, etc.) (e.g., App./Ref. 216, etc.). For instance, depending on a number of factors related to the contract formation, such as, for example, device location specific placement or entry point preferences (e.g., taskbar, desktop, start menu, browser favorite, general pop-up, context-specific pop-up, etc.), number of placements desired, conversion terms, other contract terms, device type, category of software or service, and so on, etc., the user of the device can be presented with one or more opportunities to convert the software application (or a link, or a reference thereto, etc.) or the online service (or a link, or a reference thereto, etc.) (e.g., App./Ref. 216, etc.) into an upgraded, an activated, or otherwise converted software application, or an activated, a renewed, a subscribed or otherwise converted online service. As a further non-limiting example, presenting a conversion opportunity can include providing access to a trial version of a software application (e.g., App./Ref. 216, etc.) (or a link, or a reference thereto, etc.), where the placement of the trial version is on a desktop of the device, or other device location, for example. The conversion opportunity exists by, for example, the ability of the device (e.g., OEM device 204) so equipped to, upon invoking, starting, accessing, or otherwise executing the software application (or a link, or a reference thereto, etc.) (e.g., for a first instance, or any subsequent instance for which it is desired to present a conversion opportunity, etc.), or upon accessing the online service (or a link, or a reference thereto, etc.), as the case may be, to direct a request to the market 102, (e.g., to the contract tracking component such as Tracking Component 210, etc.) for conversion of the placement of the trial version, based on contract information located on the device (e.g., OEM device 204) as described above.

In still other exemplary methods 400, conversion information related to the software application or the online service (or a link, or a reference thereto, etc.) on the device (e.g., OEM device 204) can be transmitted at 406 in response to receiving a request to track performance of one or more term(s) of the contract (e.g., a request or query to track, such as from a contract tracking component adapted to track the contract and one or more term(s) thereof (e.g., Tracking Component 210, etc.)) as describe above regarding FIGS. 2-3, for example. In other exemplary implementations, methods 400, at 408, can include determining (e.g., such as determining with a processor associated with ISV 104 or an associated computing system as described below, for example regarding FIGS. 13-14, etc.) a conversion payment (e.g., a payment according to an agreed payment method, for example, as a result of a conversion that was an object of the contract to place the software application or the online service (or a link, or a reference thereto, etc.) on the device) to be tendered based on the one or more term(s) of the contract and a subset of the conversion information (e.g., up to and including the conversion information, or more, such as a retail price paid for a revenue sharing payment method, a number of units for a flat fee or performance based bounty payment method, etc.). The methods 400 can further include tendering the conversion payment according to a payment term (e.g., payment methods, percentages, amounts, prices, contingencies, etc.) of the contract at 410, such as tendering the conversion payment to an operator of the contract tracking component (e.g., Tracking Component 210) based on an agreement for use of the contract tracking component, for example.

FIG. 5 depicts an exemplary non-limiting flow diagram illustrating various aspects of exemplary methods 500 of the disclosed subject matter. For instance, as further described herein, methods 500, portions, and/or variants thereof can facilitate device customization. As a non-limiting example, methods 500 can comprise storing (e.g., storing on a memory or storage component of a device such as OEM device 204, etc.) a software application or a service (or a link, or a reference thereto, etc.) (e.g., App./Ref. 216, etc.) and contract information related to a contract for placing the software application or the service (or a link, or a reference thereto, etc.) (e.g., App./Ref. 216, etc.) on the device (e.g., OEM device 204) at 502. As a further example, in addition to making code or instructions (e.g., Code or Instr's 206) available for inclusion in App./Service Reference 202, facilitating aggregation of a plurality of code or instructions (e.g., Code or Instr's 206), facilitating aggregation of a plurality of Apps./Services References 202 (e.g., from one or more ISVs 104), and so on, market 102 can facilitate providing contract information (e.g., Contract Info. 208) to OEM 106 to facilitate subsequent contract tracking (e.g., associating Contract Info. 208 with Code or Instr's 206, aggregated Code or Instr's 206, and so on, etc. on OEM device 204) to facilitate subsequent contract tracking Accordingly, contract information (e.g., Contract Info. 208) can be associated with code or instructions (e.g., Code or Instr's 206), an aggregated plurality of code or instructions (e.g., Code or Instr's 206), an aggregated plurality of Apps./Services References 202 (e.g., from one or more ISVs 104), and so on for and/or by OEM 106 (e.g., included in a pre-packaged installer, a linked list, or other data structure created by market 102, or otherwise, suitable for creating a device image for OEM device 204, or otherwise installing such code or instructions on OEM device 204, such as OEM device 204 image creation, etc.).

In another non-limiting example, at 504, methods 500 can include transmitting a subset of the contract information (e.g., up to and including the contract information, or more, such as a unique contract identification number for the contract generated by the contract tracking component (e.g., Tracking Component 210, etc.) and/or other contract information stored on the OEM device 204, such as a reference to the contract tracking component, etc.) to a contract tracking component (e.g., Tracking Component 210, etc.) adapted to track performance under the contract in response to an invocation or download of the software application (or a link, or a reference thereto, etc.) or a request to access the service (or a link, or a reference thereto, etc.) (e.g., invocation, starting, requesting access, or otherwise execution of the software application or requesting access to the reference to the online service, such as App./Ref. 216 (e.g., App./Service Reference 202 as modified by including or incorporating Code or Instr's 206, etc.)).

As a further non-limiting example, methods 500 can include receiving conversion information (e.g., or a subset thereof, such as a retail price paid for a revenue sharing payment method, a number of units for a flat fee or performance based bounty payment method, an activation code, a password, a confirmation code, etc.) in response to the device (e.g., OEM device 204, etc.) being granted enhanced access to the software application or the service (or a link, or a reference thereto, etc.) (e.g., App./Ref. 216, etc.), for instance, based on a purchase of the enhanced access or other event to obtain the enhanced access at 506. In addition, at 508, methods 500 can further include sharing a payment with an operator of the contract tracking component (e.g., Tracking Component 210, etc.) based on the contract, the purchase or other event, and a predetermined payment term (e.g., payment methods, percentages, amounts, prices, contingencies, etc., such as can be negotiated with an owner or an operator of the contract tracking component, or an agent thereof, and so on, etc.) associated with the operator of the contract tracking component.

In view of the methods described supra, systems and devices that can be implemented in accordance with the disclosed subject matter will be better appreciated with reference to the functional block diagrams of FIGS. 6-12. While, for purposes of simplicity of explanation, the functional block diagrams are shown and described as various assemblages of functional component blocks, it is to be understood and appreciated that such illustrations or corresponding descriptions are not limited by such functional block diagrams, as some implementations may occur in different configurations. Moreover, not all illustrated blocks may be required to implement the systems and devices described hereinafter.

Example Systems And Devices

Figure 6:
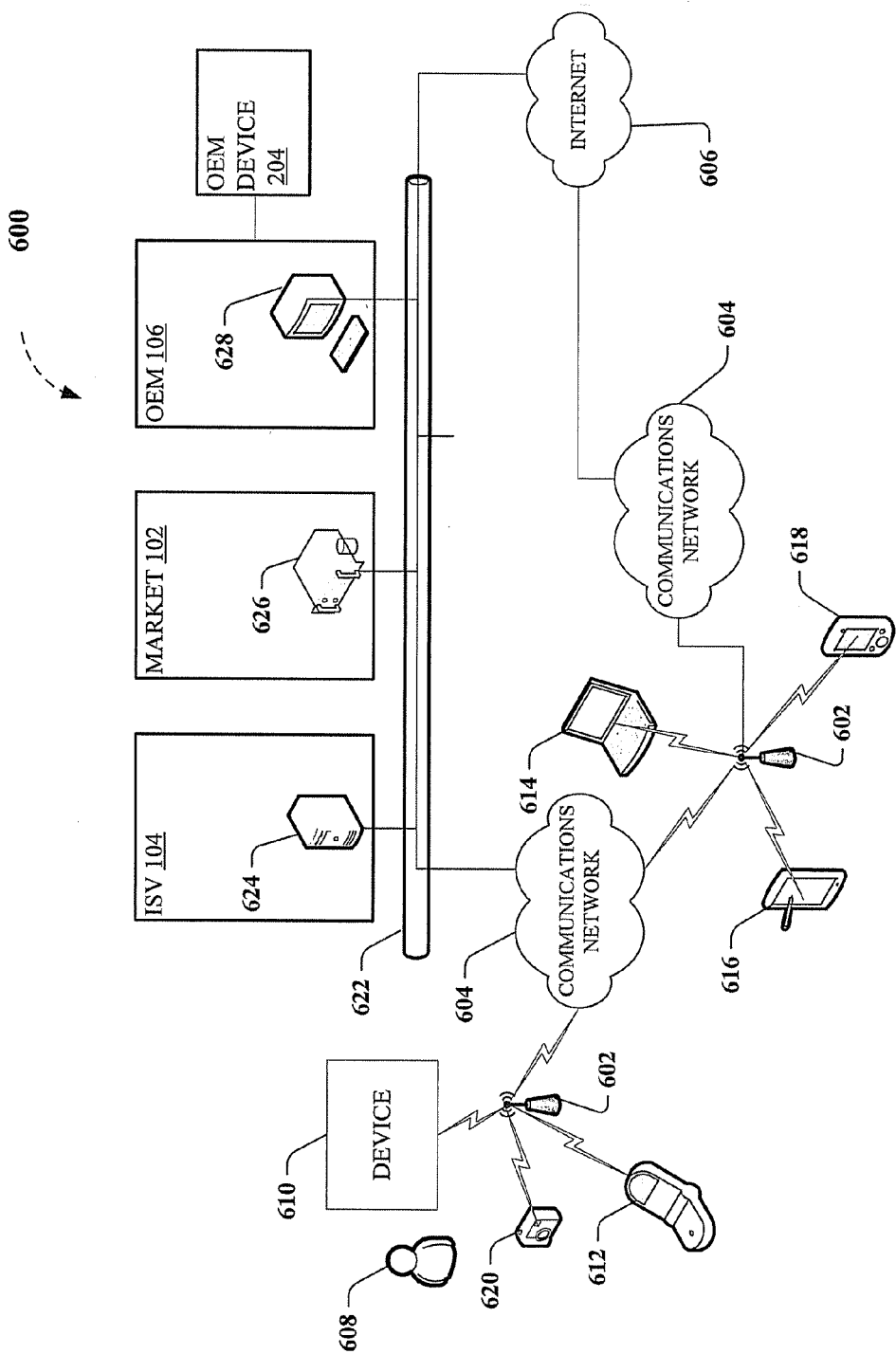
FIG. 6 illustrates an overview of an exemplary computing environment suitable for incorporation of embodiments of the disclosed subject matter.

FIG. 6 illustrates an overview of an exemplary computing environment 600 suitable for incorporation of embodiments of the disclosed subject matter. For example, computing environment 600 can comprise wired communication environments, wireless communication environments, and so on. As a further example, computing environment 600 can further comprise one or more of a wireless access component 602, communications networks 604, the internet 606, etc., with which a user 608 can employ any of a variety of devices (e.g., device 610, devices 612-620, 622-628, and so on to communicate information over a communication medium (e.g., a wired medium 622, a wireless medium, etc.) according to an agreed protocol.

Accordingly, computing environment 600 can comprise a number of components to facilitate contracting for placement or conversion of a software application or a service (or a link, or a reference thereto, etc.) on an OEM device (e.g., OEM device 204, etc.), distributing software or promoting online services, device customization, and/or pre-installing software applications or services (or links, or references thereto, etc.) on the OEM device according to various aspects of the disclosed subject matter, among other related functions. While various embodiments are described with respect to the components of computing environment 600 and the further embodiments more fully described below, one having ordinary skill in the art would recognize that various modifications could be made without departing from the spirit of the disclosed subject matter. Thus, it can be understood that the description herein is but one of many embodiments that may be possible while keeping within the scope of the claims appended hereto.

Additionally, while device 610 is shown as a generic network capable device which can include such devices as OEM device 204, device 610 is intended to refer to a class of network capable devices that can one or more of receive, transmit, store, etc. information incident to and that user 608, ISV 104, market 102, and/or OEM 106 can employ to facilitate various techniques of the disclosed subject matter. Note that OEM device 204 is depicted distinctly from that of device 610, or any of the variety of devices (e.g., device 610, devices 612-620, 622-628, etc.), and that OEM device 204 is depicted as associated with OEM 106 to distinguish OEM device 204 from device 610 on the basis that OEM device 204 has not yet been released from the OEM 106 to end user 608. Thus, OEM device 204 (as one of a plurality of OEM devices 204 associated with an OEM 106, a device redistributor 106, etc.) can be an intended target of the various non-limiting aspects of the disclosed subject matter (e.g., device customization, distributing software or promoting online services, contracting for placement or conversion of a software application or a service (or a link, or a reference thereto, etc.) and pre-installing software applications or services (or links, or references thereto, etc.) on OEM devices 204, etc.). However, the discussion of the foregoing distinction is intended for illustration and not limitation. As such, the foregoing does not preclude implementing various aspects of the disclosed subject matter on a device such as device 610 (e.g., already released by an OEM 106 to a user 608, etc.), in the process of device customization, as a non-limiting example, by an information technology (IT) service provider.

While for purposes of illustration, user 608 is described as performing certain actions, it is to be understood that device 610 and/or OEM device 204 (e.g., via an operating system, application software, device drivers, communications stacks, etc.) can perform such actions on behalf of user 608. Similarly for ISVs 104 and OEMs 106, which can be discussed or described as performing certain actions, it is to be understood that computing systems or devices associated with ISVs 104 and OEMs 106 respectively (e.g., via an operating system, application software, device drivers, communications stacks, etc.) can perform such actions on behalf of ISVs 104 and OEMs 106.

Accordingly, exemplary device 610 and/or OEM device 204 can include, without limitation, a cellular phone 612 connected to the network via access component 602 or otherwise, a laptop computer 614, a tablet personal computer (PC) device 616, and/or a personal digital assistant (PDA) 618, or other mobile device, and so on. As further examples, device 610 can include such devices as a network capable camera 620 and other such devices (not shown) as a pen computing device, portable digital music player, home entertainment devices, network capable devices, appliances, kiosks, and sensors, and so on. It is to be understood that device 610 and/or OEM device 204 can comprise more or less functionality than those exemplary devices described above as the context requires and as further described below in connection with FIGS. 7-11.

According to various embodiments of the disclosed subject matter, the device 610 and/or OEM device 204 can connect to other user devices to facilitate accomplishing various functions as further described herein. In addition, device 610 and/or OEM device 204 can connect via one or more communications network(s) 604 to a wired network 622 (e.g., directly, via the internet 606, or otherwise).

Wired network 622 (as well as communications network 604) can comprise any number of computers, servers, intermediate network devices, and the like to facilitate various functions as further described herein. As a non-limiting example, wired network 622 can include an ISV system 624 (e.g., one or more appropriately configured computing device(s) associated with, operated by, or operated on behalf of ISV 104, etc.) as described above, that facilitates providing access for a device (e.g., OEM device 204, etc.) to a software application or an online service (or a link, or a reference thereto, etc.) (e.g., App./Ref. 216, etc.), wherein the software application or the online service (or a link, or a reference thereto, etc.) refers to contract information stored in a memory of the device (e.g., OEM device 204) to facilitate providing access, and wherein the contract information can be based on information associated with a contract to place the software application or the online service (or a link, or a reference thereto, etc.) (e.g., App./Ref. 216, etc.) on the device (e.g., OEM device 204).

In further non-limiting implementations, ISV system 624 can facilitate presenting a conversion opportunity by the device (e.g., by an OEM device 204, such as to a user of the device, etc.) based in part on contract information being employed in executing or downloading the software application or accessing the online service (e.g., directly on the device or via a link, or a reference thereto, etc.) (e.g., App./Ref. 216, etc.). As an example, depending on a number of factors related to the contract formation, such as, device location specific placement or entry point preferences as described above, number of placements desired, conversion terms, other contract terms, device type, category of software or service, and so on, etc., ISV system 624 can facilitate presenting the user of the device with one or more opportunities to convert the software application (or a link, or a reference thereto, etc.) or the online service (or a link, or a reference thereto, etc.) (e.g., App./Ref. 216, etc.) into an upgraded, an activated, or otherwise converted software application, or an activated, a renewed, a subscribed or otherwise converted online service. As a further non-limiting example, ISV system 624 can facilitate presenting a conversion opportunity by providing access to a trial version of a software application (e.g., App./Ref. 216, etc.) (or a link, or a reference thereto, etc.) for placement of the trial version on a desktop of the device or other device location, for example. It can be understood that the conversion opportunity exists by for example the ability of the device (e.g., OEM device 204) so equipped to direct a request to the market 102, (e.g., to the contract tracking component such as Tracking Component 210, etc.) for conversion of the placement of the trial version, based on contract information located on the device (e.g., OEM device 204) as described above.

In still other non-limiting implementations, ISV system 624 can facilitate transmitting conversion information related to the software application or the online service (or a link, or a reference thereto, etc.) on the device (e.g., OEM device 204) in response to receiving a request to track performance of one or more term(s) of the contract (e.g., a request or query to track, such as from a contract tracking component adapted to track the contract and one or more term(s) thereof (e.g., Tracking Component 210, etc.)) as describe above regarding FIGS. 2-4. In addition ISV system 624 can further facilitate determining (e.g., such as determining with a processor associated with ISV 104 or ISV system 124 as described below, for example regarding FIGS. 13-14, etc.) a conversion payment (e.g., a payment according to an agreed payment method, for example, as a result of a conversion that was an object of the contract to place the software application or the online service (or a link, or a reference thereto, etc.) on the device) to be tendered based on the one or more term(s) of the contract and a subset of the conversion information (e.g., up to and including the conversion information, or more, such as a retail price paid for a revenue sharing payment method, a number of units for a flat fee or performance based bounty payment method, etc.), and tendering the conversion payment according to a payment term (e.g., payment methods, percentages, amounts, prices, contingencies, etc.) of the contract, such as by tendering the conversion payment to an operator of the contract tracking component (e.g., Tracking Component 210) based on an agreement for use of the contract tracking component, for example.

ISV system 624 can further include any number of intermediaries acting on behalf of one or more ISV(s) 104, to facilitate various functions as further described herein. In a further non-limiting example, an intermediary acting on behalf one or more ISV(s) 104 could store and provide access to information including conversion information as available via ISV 104 Commerce Platform 212, which as described above could be provided by any of a number of e-commerce solution providers. Moreover, ISV system 624 can be further configured to perform any number of additional functions incident to distributing software or promoting online services as described above, for example, regarding FIGS. 2 and 4.

As a further non-limiting example, wired network 622 can also include a marketplace system 626 (e.g., one or more appropriately configured computing device(s) associated with, operated by, or operated on behalf of market 102, etc.) and an OEM system 628 (e.g., one or more appropriately configured computing device(s) associated with, operated by, or operated on behalf of OEM 104, etc.) as described above. Accordingly, marketplace system 626 can facilitate contracting for placement or conversion of a software application or a service (or a link, or a reference thereto, etc.) (e.g., App./Ref. 216, etc.) on an OEM device (e.g., OEM device 204, etc.) such as by facilitating the presentation of information (e.g., first information) (e.g., via a user interface, such as a graphical user interface or otherwise, a database exposed to manual or automated queries, or combinations thereof, of one or more computing device(s), and so on, etc.) regarding one or more ISV software application(s) or service(s) (e.g., a plurality of App./Ref. 216, for disparate ISVs 104, etc.), one or more OEM device(s) (e.g., OEM devices 204 of disparate OEMs 106, etc.), or one or more market analytic(s) as described above for the one or more ISV software application(s) or service(s), or the one or more OEM devices. As a further non-limiting example, marketplace system 626 can facilitate presenting information (e.g., first information), for instance, to one or more OEM(s) 106 and/or one or more ISV(s) 104 regarding the one or more ISV software application(s) or service(s) or the one or more OEM device(s) (e.g., OEM devices 204 of disparate OEMs 106, etc.). In yet another further non-limiting example, marketplace system 626 can facilitate creating or generating contract information, in response to forming a contract between an ISV 104 and an OEM 106 for one or more of the placement or conversion of the software application or the service (or a link, or a reference thereto, etc.) on the OEM device 204. As further described above, marketplace system 626 can facilitate aggregating a plurality of code or instructions (e.g., Code or Instr's 206) available for inclusion in App./Service Reference 202 (e.g., from one or more ISVs 104, ISV systems 624, etc.), aggregating a plurality of Apps./Services References 202 (e.g., from one or more ISVs 104), and/or aggregating a plurality of code or instructions (e.g., Code or Instr's 206) associated with a plurality of Apps./Services References 202 (e.g., from one or more ISVs 104) available from disparate ISVs 104, ISV systems 624, and so on for inclusion in a device, device image, and/or software installation subroutine intended for OEM device 204. As a non-limiting example, an OEM system 628 can employ marketplace system 626 to select a plurality of software applications or services (or links, or references thereto, etc.) from one or more disparate ISVs 104, ISV systems 624, and so on for placement on OEM device 204, or marketplace system 626 can receive such selections, and in response to receiving such selections, marketplace system 626 can aggregate a plurality of code or instructions (e.g., Code or Instr's 206) associated with a plurality of Apps./Services References 202 (e.g., from one or more ISVs 104), aggregate a plurality of Apps./Services References 202 (e.g., from one or more ISVs 104), and so on, and make such code or instructions available to OEM system 628 (e.g., in the form of a pre-packaged installer, a linked list, or other data structure suitable for creating a device image for OEM device 204, or otherwise installing such code or instructions on OEM device 204, etc.).

In addition, marketplace system 626 can further facilitate tracking (e.g., tracking with a processor, etc., as described below) second information (e.g., conversion information, etc.) related to one or more of the placement or the conversion (e.g., placement or the conversion of the software application or the service (or a link, or a reference thereto, etc.)), the software application or the service (or a link, or a reference thereto, etc.), or the OEM device 204. Moreover, marketplace system 626 can be further configured to perform any number of additional functions incident to contracting for placement or conversion of a software application or a service (or a link, or a reference thereto, etc.) (e.g., App./Ref. 216, etc.) on an OEM device (e.g., OEM device 204, etc.) as described above, for example, regarding FIGS. 2-3.

Further regarding FIG. 6, in other exemplary implementations of the disclosed subject matter, OEM system 628 can facilitate storing (e.g., storing on a memory or storage component of a device such as OEM device 204, etc.) a software application or a service (or a link, or a reference thereto, etc.) (e.g., App./Ref. 216, etc.) and contract information related to a contract for placing the software application or the service (or a link, or a reference thereto, etc.) (e.g., App./Ref. 216, etc.) on the device (e.g., OEM device 204). In still other exemplary implementations, OEM system 628 can facilitate transmitting a subset of the contract information (e.g., up to and including the contract information, or more, such as a unique contract identification number for the contract generated by the contract tracking component (e.g., Tracking Component 210, etc.) and/or other contract information stored on the OEM device 204, such as a reference to the contract tracking component, etc.) to a contract tracking component (e.g., Tracking Component 210, etc.) adapted to track performance under the contract in response to an invocation or download of the software application (or a link, or a reference thereto, etc.) or a request to access the service (or a link, or a reference thereto, etc.) (e.g., invocation, starting, requesting access, or otherwise execution of the software application or requesting access to the reference to the online service, such as App./Ref. 216, etc.).

In yet other exemplary implementations, OEM system 628 can facilitate receiving conversion information (e.g., or a subset thereof, such as a retail price paid for a revenue sharing payment method, a number of units for a flat fee or performance based bounty payment method, an activation code, a password, a confirmation code, etc.) in response to the device (e.g., OEM device 204, etc.) being granted enhanced access to the software application or the service (or a link, or a reference thereto, etc.) (e.g., App./Ref. 216, etc.), for instance, based on a purchase of the enhanced access at 506. In addition, OEM system 628 can also facilitate sharing a payment with an operator of the contract tracking component (e.g., Tracking Component 210, etc.) based on the contract, the purchase or other event, and a predetermined payment term (e.g., payment methods, percentages, amounts, prices, contingencies, etc., such as can be negotiated with an owner or an operator of the contract tracking component, or an agent thereof, and so on, etc.) associated with the operator of the contract tracking component. Moreover, OEM system 626 can be further configured to perform any number of additional functions incident to device (e.g., OEM device 204) customization as described above regarding FIGS. 2 and 5, for example.

In addition, wired network 622 or systems (or components) thereof can facilitate performing ancillary functions to accomplish various techniques described herein. For example, marketplace system 626 can provide functions that facilitate authentication and authorization of one or more of ISV 104, OEM 106, OEM device 204, user 608 (e.g., employing OEM device 204, etc.), presentation of information via a graphical user interface to OEMs 104, ISVs 106, comprising OEM placement opportunities, ISV offers to purchase OEM placement opportunities, metrics, analytics, and other information associated with facilitating contracting for placement or conversion software or online services on devices such as OEM devices 204, management of contracts, payments, and other functions associated with a marketplace, such as market 102, etc. as described above. According to various non-limiting embodiments of the disclosed subject matter, computing environment 600 can further comprise additional network components (not shown). For example, devices and/or components can be relatively simplistic and/or lacking certain features to facilitate various techniques of the disclosed subject matter. Accordingly, particular aspects of the disclosed subject matter can be facilitated by additional network components (not shown) in communication with the devices and/or other components of computing environment 600.

For instance, marketplace system 626 can be capable of performing a number of functions as described above regarding ISV 104 or ISV system 624, OEM 106 or OEM system 628, and functionality described above regarding market system 626 can likewise be provided by other components or devices of wired network 622. For example, functionality associated with market 102 or marketplace system 626 for providing one or more of metrics, analytics, and insights can be provided by one or more computing system(s) (not shown) that can be considered ancillary to, but associated with, market 102 or marketplace system 626.

As a further example, data collected, transmitted, and received by contract database 214 can be stored in an associated database system (not shown). As a further example, many of the analysis and reporting functions associated with one or more of metrics, analytics, or insights can also be provided by associated systems such as customer relations management platforms, and the like. In addition, as previously described, one or more intermediaries (e.g., any of a number of e-commerce solution providers etc.) acting on behalf one or more ISV(s) 104 can provide functionality such as described above regarding ISV 104 Commerce Platform 212. In yet another example, while market 102 or marketplace system 626 can be capable performing functions as previously described, market 102 or marketplace system 626 could also be functionally limited resulting in an inability to authenticate an OEM device 204 or verify that access is authorized (e.g., verifying fulfillment of a specified requirement) in embodiments that would employ such techniques. Accordingly, computing environment 600 can comprise such further components (not shown) (e.g., authentication, authorization and accounting (AAA) servers, e-commerce servers, database servers, application servers, etc.) in communication with one or more of ISV system 624, marketplace system 626, OEM system 626, and/or user 608 to accomplish the desired functions.

Figure 7:
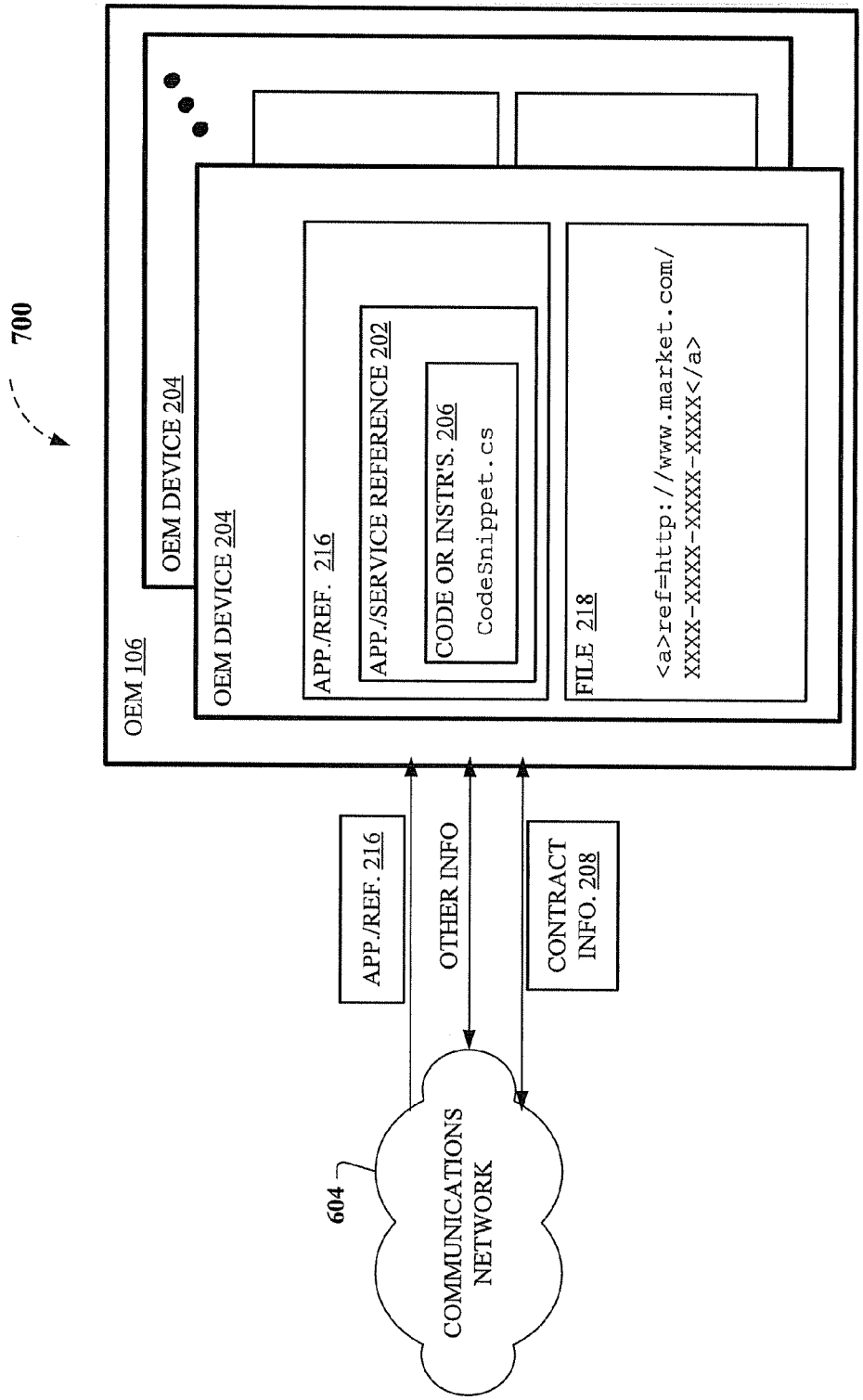
FIG. 7 illustrates an exemplary non-limiting block diagram showing illustrative aspects of embodiments of the disclosed subject matter.

FIG. 7 illustrates an exemplary non-limiting block diagram showing illustrative aspects of embodiments of the disclosed subject matter in the context of an OEM 106 having a plurality of devices (e.g., OEM devices 204, etc.) that have been contracted by the OEM 106 for the placement of the software application (or a link, or a reference thereto, etc.) or the service (or a link, or a reference thereto, etc.) (e.g., App./Service Reference 202 as modified by including or incorporating Code or Instr's 206 to result in App./Ref. 216, etc.) on the plurality of devices (e.g., OEM devices 204, etc.). As further described above, App./Ref. 216 can further comprise an aggregated plurality of code or instructions (e.g., Code or Instr's 206) associated with a plurality of Apps./Services References 202 (e.g., from one or more ISVs 104), an aggregated plurality of Apps./Services References 202 (e.g., from one or more ISVs 104), and so on. According to an aspect of the disclosed subject matter, as described above regarding FIGS. 2 and 5, for example, a subset of the contract information 208 (e.g., a unique or trackable contract identification number for the contract generated by the contract tracking component (e.g., Tracking Component 210, etc.) and/or other contract information, such as a reference to the contract tracking component, etc.) can be stored on the OEM devices 204. For instance, as further described above, the subset of the contract information 208 can be stored on OEM devices 204, for example, in a file 218. In yet another example, as previously described, the string <a>ref=http://www.market.com/XXXX-XXXX-XXXX-XXXX</a>, shown in file 218, can represent the unique contract identification number for the contract of interest involving OEM devices 204 and a reference to the contract tracking component (e.g., Tracking Component 210) associated with market 102.

FIG. 7 further depicts OEM 106 in communication with communications network 604, as previously described, over which one or more of a subset of contract info 208, App./Ref. 216 (e.g., App./Service Reference 202 as modified by including or incorporating Code or Instr's 206, etc.), or other information such as first or second information, conversion information, metrics, analytics, graphical user interface information regarding market opportunities, URL requests transmitted from OEM devices 204 (e.g., having the requisite form such as in file 218, etc.) to a contract tracking component (e.g., Tracking Component 210, etc.) can be communicated. It can be understood that once the OEM 106 has completed pre-installation of desired software applications and online services (or links, or references thereto, etc.) for OEM devices 204, the OEM devices 204 having one or more placement opportunities filled can facilitate presenting these opportunities for conversion, for example, once the OEM devices 204 are shipped to a user such as user 608.

It is noted that, although App./Ref. 216 is depicted in FIG. 7 as comprising App./Service Reference 202 and Code or Instr's 206 (e.g., comprising CodeSnippet.cs, etc.), it can be understood that App./Service Reference 202 as modified by including or incorporating Code or Instr's 206 is intended to denote that App./Ref. 216 can include the functionality of Code or Instr's 206 as applied to the App./Service Reference 202 (versus the actual file contents), where such inclusion and/or incorporation can include appropriate software development processes (e.g., compiling, linking, etc.) to impart the functionality of Code or Instr's 206 to App./Service Reference 202, in order to produce App./Ref. 216. It is further noted, that these discussions regarding such including or incorporating with regard to Code or Instr's 206 and App./Service Reference 202 are not limited to the exemplary devices of FIG. 7, and as further described above can apply to an App./Ref. 216 comprising an aggregated plurality of code or instructions (e.g., Code or Instr's 206) associated with a plurality of Apps./Services References 202 (e.g., from one or more ISVs 104), an aggregated plurality of Apps./Services References 202 (e.g., from one or more ISVs 104), and so on.

Figure 10:
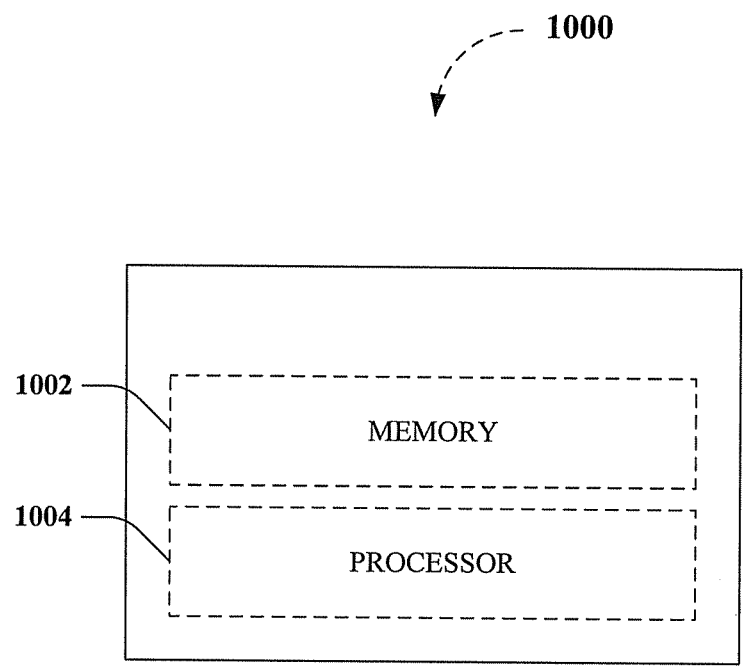
FIG. 10 illustrates an exemplary non-limiting device or system suitable for performing various aspects of the disclosed subject matter.

Accordingly, in various exemplary implementations, the disclosed subject matter provides devices, such as described regarding in FIG. 7 and as further described herein, for example, regarding FIGS. 2, 10, etc. For instance, exemplary devices (e.g., OEM devices 204, etc.) can be adapted to store a software vendor application or a service (or a link, or a reference thereto, etc.), such as, for example App./Ref. 216 etc. As described herein, App./Ref. 216 can further comprise an aggregated plurality of code or instructions (e.g., Code or Instr's 206) associated with a plurality of Apps./Services References 202 (e.g., from one or more ISVs 104), an aggregated plurality of Apps./Services References 202 (e.g., from one or more ISVs 104), and so on. Thus, the software vendor application or service (or a link, or a reference thereto, etc.) of the exemplary devices can further be configured or adapted to locate contract information stored on the devices, such as, contract information 208, a subset of which can be stored on OEM devices 204, for example, in a file 218. For instance, as described herein, the contract information can be associated with a contract between a software vendor (e.g., developer, proprietor, seller, etc. of the software vendor application or service (or a link, or a reference thereto, etc.) and a provider of the device such as the devices' manufacturer or otherwise (e.g., OEMs 106, device redistributor 106, EV 106, etc.) to place the software vendor application or service (or a link, or a reference thereto, etc.) on the devices (e.g., OEM devices 204, etc.).

Moreover, in exemplary devices as described herein, the software vendor application or service (or a link, or a reference thereto, etc.) can be further configured or adapted to refer the devices to a tracking component, such as a contract tracking component (e.g., Tracking Component 210), of a software distribution system or marketplace, as described herein regarding FIGS. 2-3, 6, 11, etc., such as market 102, marketplace 626, system 1100, and the like, when the software vendor application or service is invoked (e.g., invoking, starting, accessing, or otherwise executing the software vendor application or service (or a link, or a reference thereto, etc.) or accessing the service (or a link, or a reference thereto, etc.) (e.g., for a first instance, or any subsequent instance for which it is desired to present a conversion opportunity, etc.)).

Figure 8:
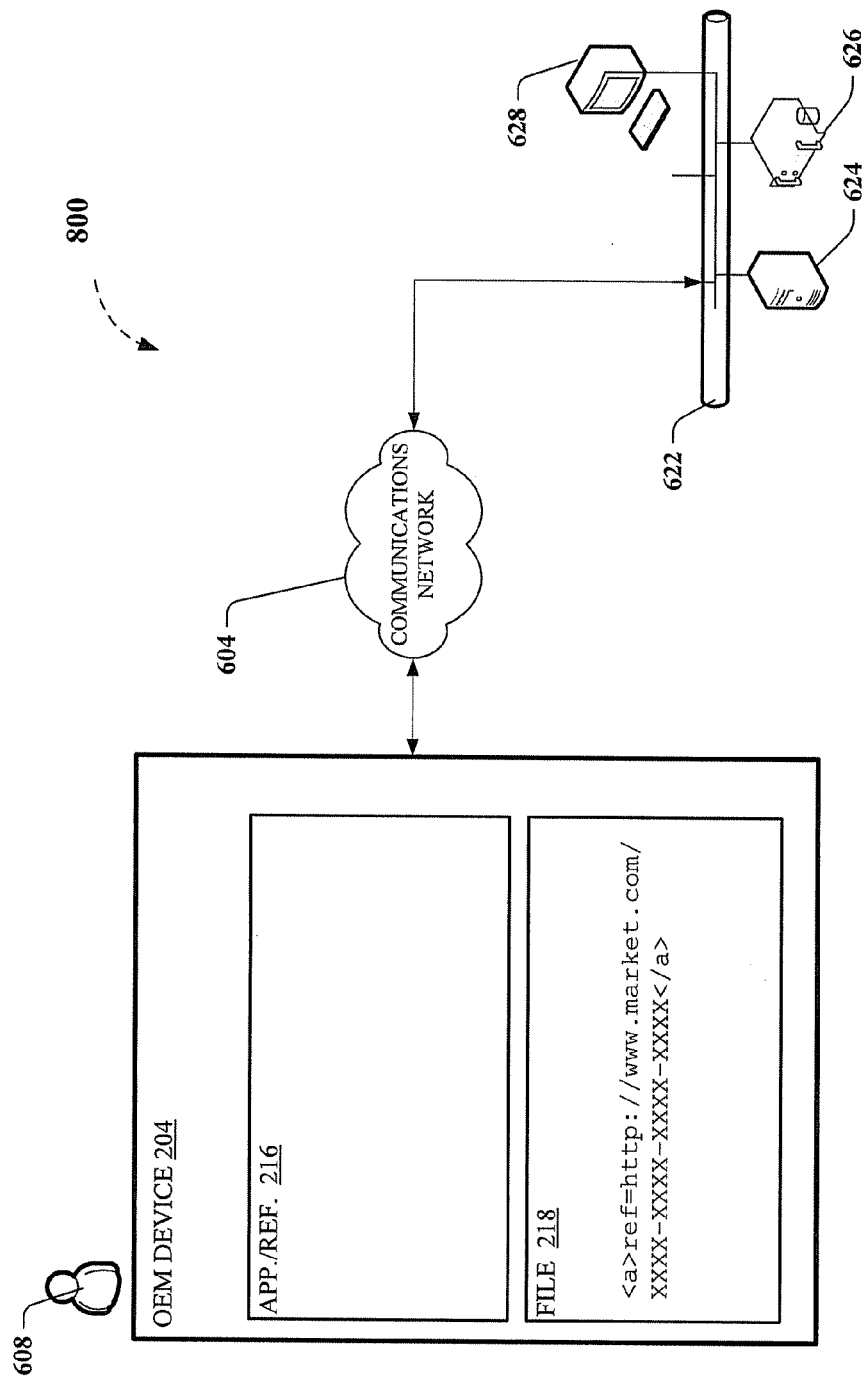
FIG. 8 illustrates an exemplary non-limiting block diagram of a system according to various embodiments of the disclosed subject matter.
Figure 9:
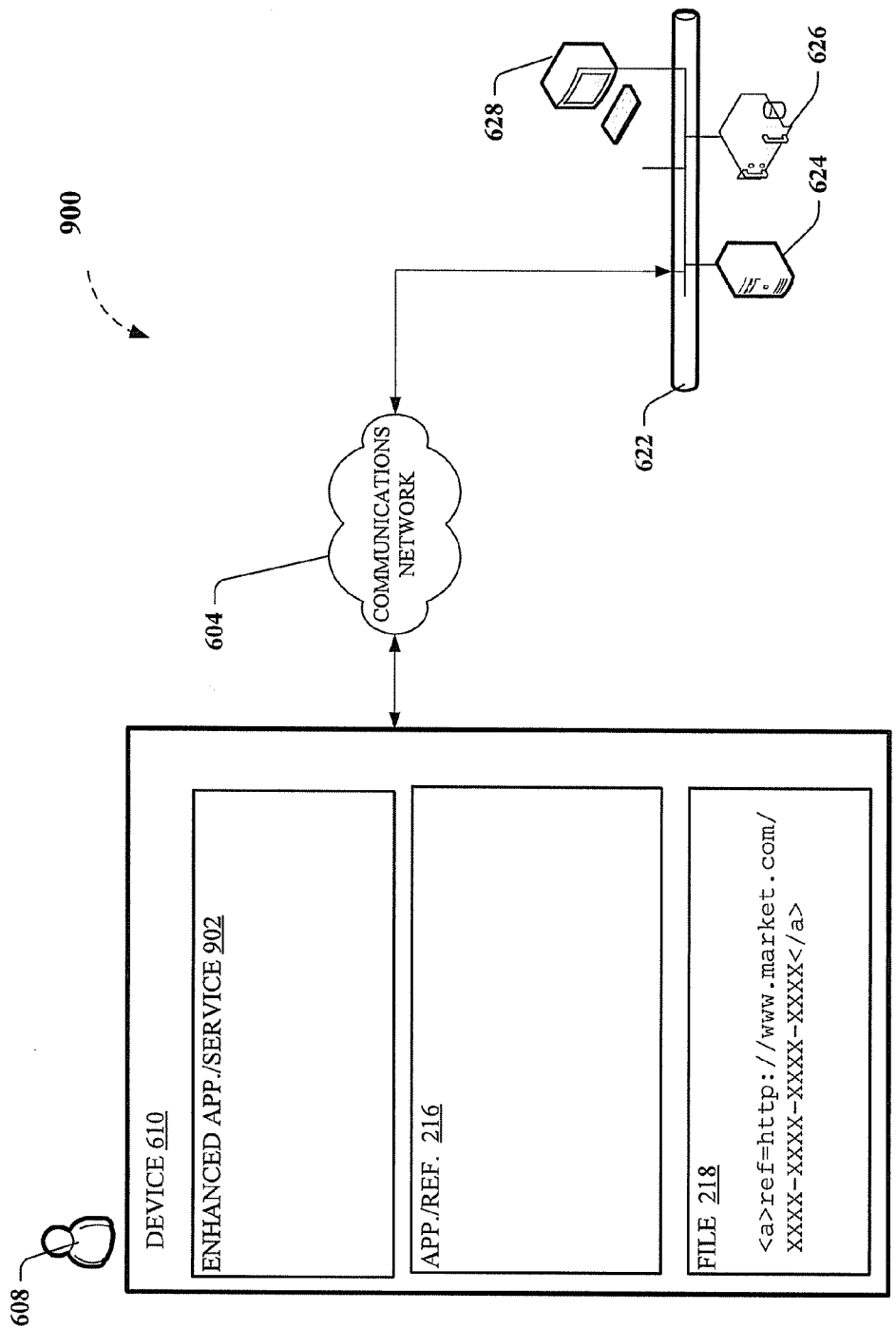
FIG. 9 depicts a further non-limiting block diagram of a system according to further aspects of the disclosed subject matter.

FIG. 8 illustrates an exemplary non-limiting block diagram of a system 800 according to various embodiments of the disclosed subject matter. FIG. 9 depicts a further non-limiting block diagram of a system 900 according to still further aspects of the disclosed subject matter. For example, systems 800 and 900 can comprise one or more of communications network 604, wired network 622, ISV system 624 (e.g., one or more appropriately configured computing device(s) associated with, operated by, or operated on behalf of ISV 104, etc.), marketplace system 626 (e.g., one or more appropriately configured computing device(s) associated with, operated by, or operated on behalf of market 102, etc.) and an OEM system 628 (e.g., one or more appropriately configured computing device(s) associated with, operated by, or operated on behalf of OEM 104, etc.) as previously described. In addition, FIG. 8 illustrates OEM device 204 after it has shipped from an OEM 106, an equipment vendor 106, or a device redistributor 106, to a user, such as user 608. Thus, as previously described regarding FIGS. 2 and 4, for example, the conversion opportunity can be presented to a user, such as user 608, of the device (e.g., OEM device 204, etc.) based in part on contract information being employed in executing the software application or accessing the online service (or a link, or a reference thereto, etc.) (e.g., App./Ref. 216, etc.).

For instance, depending on a number of factors related to contract formation, such as, for example, device location specific placement or entry point preferences (e.g., taskbar, desktop, start menu, browser favorite, general pop-up, context-specific pop-up, etc.), number of placements desired, conversion terms, other contract terms, device type, category of software or service, and so on, etc., user 608 of OEM device 204 can be presented with one or more opportunities to convert the software application or the online service (or a link, or a reference thereto, etc.) (e.g., App./Ref. 216, etc.) (e.g., conversion opportunities) into an upgraded, an activated, enhanced, or otherwise converted software application, or an activated, a renewed, a subscribed or otherwise converted online service (or a link, or a reference thereto, etc.). Similarly for an App./Ref. 216 that comprises an aggregated plurality of code or instructions (e.g., Code or Instr's 206) associated with a plurality of Apps./Services References 202 (e.g., from one or more ISVs 104), an aggregated plurality of Apps./Services References 202 (e.g., from one or more ISVs 104), and so on, user 608 of OEM device 204 can be presented a plurality of opportunities for conversion based on the aggregated plurality of code or instructions (e.g., Code or Instr's 206), the aggregated plurality of Apps./Services References 202, etc.

Thus, as illustrated in FIG. 8, presenting a conversion opportunity can include providing access to a trial version of a software application (e.g., App./Ref. 216, etc.) (or a link, or a reference thereto, etc.), where placement of the trial version is on a desktop of the device, for example, or other device location. The conversion opportunity exists by, for example, the ability of the device (e.g., OEM device 204) so equipped to, upon invoking, starting, accessing, or otherwise executing the software application (or a link, or a reference thereto, etc.) (e.g., for a first instance, or any subsequent instance for which it is desired to present a conversion opportunity, etc.), or upon accessing the online service (or a link, or a reference thereto, etc.), as the case may be, to direct a request to the market 102, (e.g., to the contract tracking component such as Tracking Component 210, etc.) for conversion of the placement of the trial version, based on contract information located on the device (e.g., in file 218 in OEM device 204) as described above.

As further illustrated in FIG. 9, opportunities to convert the software application or the online service, once a conversion is undertaken as described above regarding FIGS. 2-5, for instance, can result in the device unlocking, activating, or otherwise obtaining (e.g., downloading, decompressing, decrypting, etc.) an upgraded, an activated, an enhanced, or an otherwise converted software application, or an activated, a renewed, a subscribed or an otherwise converted online service depicted in FIG. 9 as Enhanced App./Service 902. Note further that the device is no longer designated as an OEM device 204, but is denoted as a user device 610, to distinguish the device from OEM devices 204 that have not yet been shipped or personalized by an end user. In addition, note that App./Ref. 216 and file 218 can remain on device 610 or can be removed (e.g., manually or automatically). However, as noted above, the discussion of the foregoing distinction is intended for illustration and not limitation. As such, the foregoing does not preclude implementing various aspects of the disclosed subject matter on a device such as device 610 (e.g., already released by an OEM 106 to a user 608, etc.), in the process of device customization, as a non-limiting example, by an IT service provider.

In a further non-limiting implementation of the disclosed subject matter that provides the ability to contract for a payment method that takes into account the prospect for successive user conversions, upgrades, and so on of the same App./Ref. 216 or for one or more related software application(s) or online service(s) (e.g., in an example of bundling, etc.), the disclosed subject matter can be adapted to retain one or more of the App./Ref. 216 or the file 218 following a user conversion to facilitate payment to an OEM 106 (or other party) for successful conversion of bundled placements on an OEM device 204. Thus, as used herein, a bundled placement can be a combination of one or more software application(s) and/or online service(s), successive conversions for software applications or online services, or any combination thereof. As a result, the disclosed subject matter further can further incentivize finding an optimal match for placement opportunities on a device with regard to a potential user's anticipated demands (e.g., rather than merely employing a shotgun approach of filling as many placement opportunities as are available, while cluttering the device, annoying the end user, etc.).

This further highlights another advantage of the disclosed subject matter. For instance, the typical case of an OEM 106 contracting with an ISV 104 for placement of software or online services on an OEM device 204, of necessity, requires making certain assumptions about software or services and end user preferences. This can ultimately result in compromises that tend toward filling placement opportunities with the applications or online services that are expected to be most popular. However the market efficiencies, lowered barriers to entry, lower transaction costs, market transparency, and other benefits (such as the ability to automate many of the contract negotiation, consummation, and performance tracking features) afforded by the various aspects of the disclosed subject matter can facilitate involving the end user in the OEMs 106 or device redistributors' 106 decisions as to what will be placed on an OEM device 204.

For instance, whereas conventionally, an ISV 104 would have to provide a unique build of an application according to each specific contract for placement on a device or class of devices, according to aspects of the disclosed subject matter, the ISV need only provide one build for a device or class of devices no matter how many deals are later consummated, and no matter what contract terms vary across deals (e.g., a taskbar location preference, versus a desktop location preference, versus a pop-up location preference, payment methods, etc.). Thus, given these lowered transaction costs for ISVs 104, it is conceivable that some niche application ISV or lower-level popularity ISV (but having a dedicated following) might be willing to pay more for placement, or OEM's might be able to fill placement opportunities at lower volumes up to and including device placement customization at the point of sale (e.g., filling singular device placement opportunities by a retail device reseller, cellular service provider retail storefront, internet device sales customization, etc.).

As yet another advantage of the various embodiments of the disclosed subject matter, it is apparent that OEMs 106, EVs 106, and device redistributors 106 (e.g., retail device resellers, cellular service providers' retail storefronts, internet device sellers, etc.), by aggressively pursuing optimized fulfillment of their available placement opportunities for a given device or class of devices, can increase their margins, increase their market share by lowering prices, and generally develop and exploit a competitive advantage over their cohorts based on taking advantage of these heretofore unavailable market opportunities. Accordingly, in further exemplary implementations, the disclosed subject matter provides the ability to economically take into account an individual end user's software application and/or online service preferences for a device to be shipped or transferred to the end user in the contracting for placement or conversion of a software application or a service (or a link, or a reference thereto, etc.) on an OEM device 204, the distributing software or promoting online services, OEM device 204 customization, the pre-installation of software applications or services (or links, or references thereto, etc.) on OEM device 204, and so on.

FIG. 10 illustrates an exemplary non-limiting device or system 1000 suitable for performing various aspects of the disclosed subject matter. The device or system 1000 can be a stand-alone device or a portion thereof or a specially programmed computing device or a portion thereof (e.g., a memory retaining instructions for performing the techniques as described herein coupled to a processor). As an example, exemplary non-limiting device or system 1000 can comprise exemplary devices of FIG. 7 as described above, or portions thereof. Furthermore, device or system 1000 can include a memory 1002 that retains various instructions with respect to facilitating contracting for placement or conversion of a software application or a service (or a link, or a reference thereto, etc.) on an OEM device 204, the distributing software or promoting online services, OEM device 204 customization, the pre-installation of software applications or services (or links, or references thereto, etc.) on OEM device 204, and so on (e.g., storing a software vendor application or a service (or a link, or a reference thereto, etc.), locating contract information stored on the device, wherein the contract information is associated with a contract between a software vendor of the software vendor application or service (or a link, or a reference thereto, etc.) and a provider of the device, such as the devices' manufacturer or otherwise (e.g., OEMs 106, device redistributor 106, EV 106, etc.) to place the software vendor application or service (or a link, or a reference thereto, etc.) on the device, referring the device to a tracking component of a software distribution system when the software vendor application or service (or a link, or a reference thereto, etc.) is invoked or accessed, transmitting a subset of the contract information to the tracking component to facilitate tracking the contract, providing a trackable attribute of the contract to the tracking component as part of the subset of the contract information), encryption and/or decryption and communications routines such as networking and peer-to-peer communications routines, and/or the like.

For instance, device or system 1000 can include a memory 1002 that retains instructions for locating contract information stored on the device (e.g., where the contract information is associated with a contract between a software vendor of the software vendor application or service (or a link, or a reference thereto, etc.) and a provider of the device to place the software vendor application or service (or a link, or a reference thereto, etc.) on the device). Additionally, memory 1002 can retain instructions for referring the device to a tracking component of a software distribution system when the software vendor application or service (or a link, or a reference thereto, etc.) is invoked or accessed. In a further exemplary embodiment of device or system 1000, memory 1002 can retain instructions for transmitting a subset of the contract information (e.g., up to and including the contract information, or more, etc.) to the tracking component to facilitate tracking the contract.

In a further example, memory 1002 can retain instructions for providing a trackable attribute of the contract (e.g., device location specific placement or entry point references such as a taskbar reference, a desktop reference, a browser favorite reference, a start menu reference, a general pop-up reference, or a context-specific pop-up reference, and wherein each of the device location specific placement or entry point references is associated with a unique or trackable location or entry point identification number in the subset of the contract information) of the contract to the tracking component as part of the subset of the contract information) to the tracking component as part of the subset of the contract information. The above example instructions and other suitable instructions as described herein for example, regarding FIGS. 2-5, etc., can be retained within memory 1002, and a processor 1004 can be utilized in connection with executing the instructions. Various aspects of non-limiting embodiments of device or system 1000 can be further understood by reference to FIGS. 11-14, for example.

Figure 11:
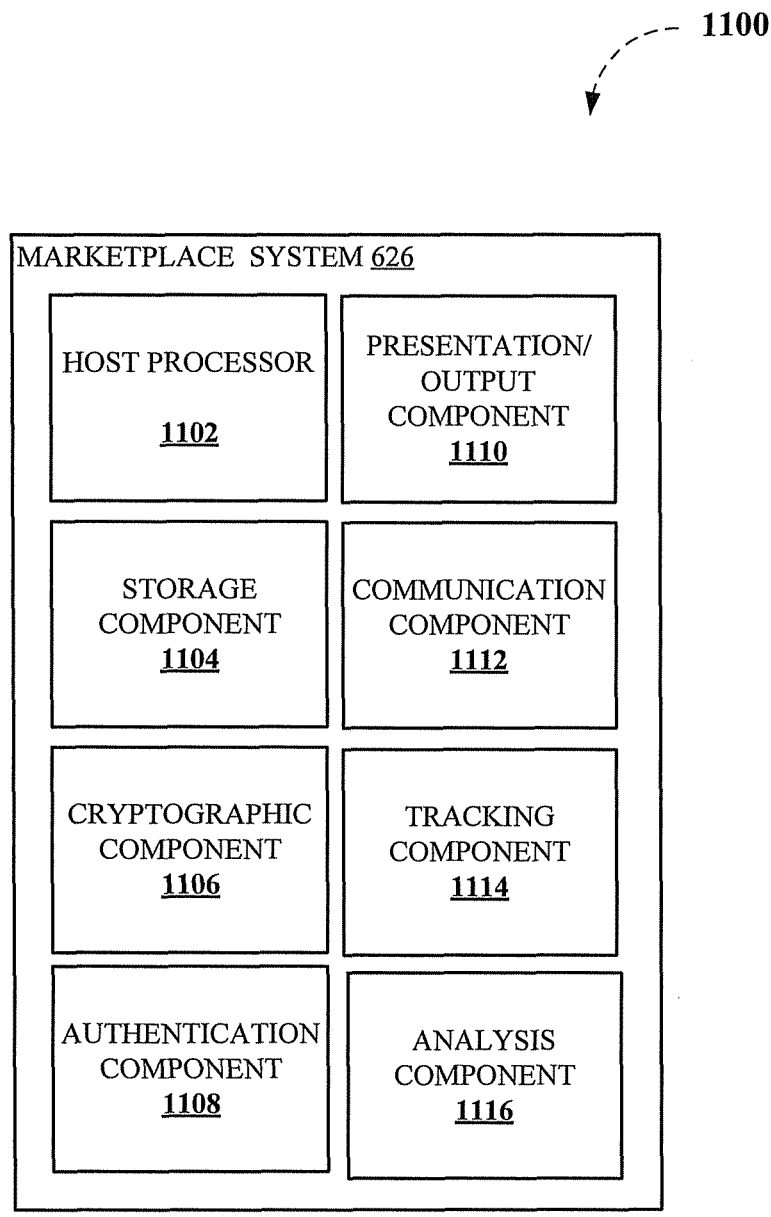
FIG. 11 illustrates an exemplary non-limiting device or system suitable for performing various aspects of the disclosed subject matter.

FIG. 11 illustrates an exemplary non-limiting device or system 1100 suitable for performing various aspects of the disclosed subject matter. As briefly described above with reference to FIG. 6, for example, various non-limiting embodiments of the disclosed subject matter can comprise more or less functionality than those exemplary devices therein, depending on the context. In addition, a device or system 1100 as described can be any of the devices as the context requires and as further described above in connection with FIGS. 6-9. It can be understood that while the functionality of device or system 1100 is described in a general sense, more or less of the described functionality may be implemented, combined, and/or distributed (e.g., among network components, servers, databases, and the like), according to context, system design considerations, and/or marketing factors, and the like. For the purposes of illustration and not limitation, exemplary non-limiting device or system 1000 can comprise exemplary devices of FIG. 6, such as marketplace system 626 (or market 102, etc.) as described above, for example, or portions thereof.

Thus, as described above, device or system 1100 can include host processor 1102 (e.g., processor 1004, etc.) that can be associated with a storage component 1104 to facilitate storage of data or information (e.g., information such as market analytics regarding aggregate market behavior for a plurality of ISV software applications or services references and a plurality of OEM/EV devices, ISV and/or OEM/EV account or profile information, contract or performance metrics, code or instructions (e.g., Code or Instr's 206), contract information, conversion information, additional tracking information, queries, requests, etc.), and/or instructions for performing functions associated with and/or incident to the disclosed subject matter as described herein, for example, regarding FIGS. 2-3, 6, etc. In addition, in exemplary non-limiting implementations, storage component 1104 of device or system 1100 can be configured to store instructions adapted to direct an OEM/EV device to employ a subset of the contract information upon accessing the ISV software application or the service (or a link, or a reference thereto, etc.).

In addition, the host processor 1102 can be associated with a cryptographic component 1106. In accordance with an aspect of the disclosed subject matter, cryptographic component 1106 can provide symmetric cryptographic tools and accelerators (e.g., Twofish, Blowfish, AES, TDES, IDEA, CASTS, RC4, etc.) to facilitate encrypting and/or decrypting data. Thus, cryptographic component 1106 can facilitate securing data being written to, stored in, and/or read from the storage component 1104 (e.g., ISV and/or OEM/EV account or profile information, contract or performance metrics, contract information or portions thereof, conversion information, additional tracking information, queries, requests, etc.), transmitted to or received from a connected network (e.g., such as for transmitting user or device associated information to a trusted intermediary, etc.), and/or creating a secure communication channel as part of a secure association of device or system 1100 with a user or systems facilitating various aspects of the disclosed subject matter to ensure that protected data can only be accessed by those entities authorized and/or authenticated to do so. To the same ends, cryptographic component 1106 can also provide asymmetric cryptographic accelerators and tools (e.g., RSA, Digital Signature Standard (DSS), and the like) in addition to accelerators and tools (e.g., Secure Hash Algorithm (SHA) and its variants such as, for example, SHA-0, SHA-1, SHA-224, SHA-256, SHA-384, SHA-512, and so on).

Device or system 1100 can further include an authentication component 1108 that can solicit authentication data from a user (e.g., ISV 104, OEM 106, EV 106, OEM/EV device 204, user 608, etc.) or other device (e.g., an operating system and/or application software) on behalf of the user, and, upon receiving the proper authentication data so solicited, can be employed, individually and/or in conjunction with information acquired and ascertained as a result of biometric modalities employed, to facilitate associating a network device with a user (e.g., ISV 104, OEM 106, EV 106, OEM/EV device 204, user 608, etc.). The authentication data can be in the form of a password (e.g., a sequence of humanly cognizable characters), a pass phrase (e.g., a sequence of alphanumeric characters that can be similar to a typical password but is conventionally of greater length and contains non-humanly cognizable characters in addition to humanly cognizable characters), a pass code (e.g., Personal Identification Number (PIN)), and the like, for example.

Additionally and/or alternatively, public key infrastructure (PKI) data can also be employed by authentication component 1108. PKI arrangements can provide for trusted third parties to vet, and affirm, entity identity through the use of public keys that typically can be certificates issued by trusted third parties. Such arrangements can enable entities to be authenticated to each other, and to use information in certificates (e.g., public keys) and private keys, session keys, Traffic Encryption Keys (TEKs), cryptographic-system-specific keys, and/or other keys, to encrypt and decrypt messages communicated between entities.

Accordingly, authentication component 1108 can implement one or more machine-implemented techniques to identify a user (e.g., ISV 104, OEM 106, EV 106, OEM/EV device 204, user 608, etc.) or other device (e.g., an operating system and/or application software) on behalf of the user, by the user's unique physical and behavioral characteristics and attributes. Biometric modalities that can be employed can include, for example, face recognition wherein measurements of key points on an entity's face can provide a unique pattern that can be associated with the entity, iris recognition that measures from the outer edge towards the pupil the patterns associated with the colored part of the eye—the iris—to detect unique features associated with an entity's iris, and finger print identification that scans the corrugated ridges of skin that are non-continuous and form a pattern that can provide distinguishing features to identify an entity.

Referring again to FIG. 11, device or system 1100 can also include a presentation/output component 1110, which can be associated with the host processor 1102, and which can facilitate various aspects of the disclosed subject matter. For instance, the presentation/output component 1110 can provide various types of user interfaces to facilitate interaction between a user (e.g., ISV 104, OEM 106, EV 106, OEM/EV device 204, user 608, etc.) and any component coupled to the host processor 1102, such as described with reference to FIGS. 15-30, for example. In addition to being configured or adapted to be accessed by one or more OEM/EV(s) 106 and/or one or more ISV(s) 104, the presentation component, such as presentation/output component 1110, can be further configured to display one or more ISV software application(s) or service(s) (or links, or references thereto, etc.), one or more OEM/EV device(s) 204 (e.g., OEM/EV devices 204 having available placement opportunities, etc.), one or more market analytic(s) regarding ISV software applications or services, or one or more OEM/EV device(s) 204, and so on, as described above, presentation/output component 1110 can provide one or more graphical user interface(s) (GUIs), command line interfaces, machine accessible interfaces (e.g., application programming interfaces (APIs) such as an e-commerce back-end interface), structured and/or customized menus, and the like. In yet another exemplary implementation, presentation/output component 1110 can facilitate forming a contract for placement or conversion of an ISV software application or service (or links, or references thereto, etc.) on an OEM/EV device, where the contract is tracked based on contract information including a unique contract identification number created by the tracking component 1114 for the contract, as described below.

For example, a GUI can be rendered that provides a user with a region or means to load, import, read, etc., data, and can include a region to present such results. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the presentation such as vertical and/or horizontal scroll bars for navigation and toolbar buttons to determine whether a region will be viewable can be employed. For example, the user can interact with one or more of the components coupled to and/or incorporated into the host processor 1102.

The user can also interact with the regions to select and provide information via various devices such as a mouse, a roller ball, a keypad, a keyboard, touchpad, touch screen, a pen and/or voice activation, for example. Typically, a mechanism such as a push button or the enter key on the keyboard can be employed to facilitate entering information in device 1100. However, it is to be understood that the claimed subject matter is not so limited. For example, merely highlighting a check box can initiate information conveyance.

In another example, a command line interface can be employed. For example, the command line interface can prompt (e.g., via a text message on a display and an audio tone) the user for information via providing a text message. The user can then provide suitable information, such as alpha-numeric input corresponding to an option provided in the interface prompt or an answer to a question posed in the prompt. It is to be understood that a command line interface can be employed in connection with a GUI and/or API. In addition, the command line interface can be employed in connection with hardware (e.g., video cards of a computer) and/or displays (e.g., black and white, EGA, or other video display unit of a standalone device such as an LCD display on a network printer) with limited graphic support, and/or low bandwidth communication channels. As a further example, device or system 1100 can include one or more motion sensor(s) and associated software components and/or voice activation components that can be used by a user to facilitate entering information in device or system 1100.

Referring again to FIG. 11, device or system 1100 can further comprise a communication or communications component 1112, which can be associated with the host processor 1102, and which can facilitate various aspects of the disclosed subject matter. For instance, the communication or communications component 1112 can facilitate transmitting or receiving data that can be written to, stored in, and/or read from the storage component 1104 (e.g., information such as market analytics regarding aggregate market behavior for a plurality of ISV software applications or services references and a plurality of OEM/EV devices, ISV and/or OEM/EV account or profile information, contract or performance metrics, code or instructions (e.g., Code or Instr's 206), contract information, conversion information, additional tracking information, queries, requests, etc.), and the like. As a further example, the communication or communications component 1112 can facilitate transmitting instructions to be placed into the ISV software application or software (or a link, or a reference thereto, etc.), querying the ISV (e.g., transmitting a request or a query, etc.) for conversion information by reference to a subset of the contract information, receiving the conversion information related to contract information, an ISV software application or a service (or a link, or a reference thereto, etc.), or an OEM/EV device in response to a query of the ISV for the contract, transmitting or receiving information incident to accepting a payment for facilitating the formation of the contract, and the like, as further as described herein, for example, regarding FIGS. 2-3, 6, etc.

In addition, device or system 1100 can comprise a tracking component 1114, which can be associated with the host processor 1102, and which can facilitate various aspects of the disclosed subject matter. For instance, the tracking component 1114, such as a contract tracking component (e.g., Tracking Component 210), for example, as described herein, for example, regarding FIGS. 2-3, 6, etc., can be configured or adapted to track a contract for placement or conversion of an ISV software application or service (or a link, or a reference thereto, etc.) on an OEM/EV device formed via the presentation component (e.g., formed based on market analytics, such as recommendations, and so on, formed via presentation/output component 1110, etc.), such as by tracking performance of one or more term(s) of the contract based on contract information including a contract identification number (e.g., a trackable contract identification number, a unique contract identification number, etc. for the contract) created by the tracking component 1114 for the contract. In a further example, the tracking component 1114 can be further configured or adapted to receive, for the contract, conversion information related to the contract information, the ISV software application (or a link, or a reference thereto, etc.) or the service (or a link, or a reference thereto, etc.), or the OEM/EV device, for instance, in response to a request to or a query of the ISV for the contract.

In still other exemplary implementations of device or system 1100, tracking component 1114 can be further configured or adapted to track the contract based on contract information including a reference to the contract tracking component (e.g., Tracking Component 210), a trackable attribute of the contract, a specific contract term of the contract, or a network reference to a resource such as an ISV resource, e.g., an ISV reference (e.g., ISV reference to ISV 104 Commerce Platform 212, etc.), configured or adapted to provide enhanced access to the ISV software application or the service (or a link, or a reference thereto, etc.), for example, as described above regarding FIGS. 2-3, 6, etc. For instance, as further described herein, a trackable attribute of the contract can include, without limitation, one or more OEM/EV device location specific placement or entry point references comprising a taskbar reference, a desktop reference, a browser favorite reference, a start menu reference, a general pop-up reference, or a context-specific pop-up reference, and the like. It is further noted that, in various implementations, an OEM/EV device location specific placement or entry point reference can also be associated with a unique or trackable location or entry point identification number in the contract information, for instance, as previously described.

In yet another example, device or system 1100 can comprise an analysis component 1116, which can be associated with the host processor 1102, and which can facilitate various aspects of the disclosed subject matter. For example, the analysis component 1116 can be configured or adapted to, among other things, aggregate and/or analyze data and information sources, perform one or more analyses, determine results of the analyses and/or generate reports, results, or recommendations, compose and/or respond to requests or queries, and so on, etc. For instance, in further non-limiting implementations, analysis component 1116 can be further configured to provide market analytics that can provide market participants such as OEMs/EVs, ISVs, etc. for example, with up-to-date information regarding global software and/or online service usage to facilitate optimizing pre-installs to the needs of an intended audience. For instance, as further described herein, regarding FIGS. 15, 30, etc., for example, analysis component 1116 can be adapted to provide one or more market analytic(s) to facilitate contracting for placement or conversion of a software application or a service (or a link, or a reference thereto, etc.) (e.g., App./Ref. 216, etc.) on an OEM device (e.g., OEM device 204, etc.). In an example, analysis component 1116 can be adapted to provide one or more market analytic(s) that can be employed to facilitate decision making (e.g., decision making via a manual, semi-automated, or fully automated process, according to a decision tree, a decision matrix, heuristics, inference, artificial intelligence, or other decision tool, or any combination, etc.). In a further non-limiting example, market analytics can comprise information regarding aggregate market behavior (e.g., information regarding placement and/or conversion as compared to a factor of interest to market participants, etc.) for a plurality of ISV software applications or services references and/or a plurality of OEM/EV devices. As yet another non-limiting example described below regarding FIGS. 21, 23, etc., for example, market analytics can comprise information relating to system requirements such as device type (e.g., desktop, tablet, smartphone, etc.), operating system specification (e.g., brand or type and version, such as Windows® 7, Android™ 3.0, etc.), device hardware or software specification (e.g., RAM, hard disk, Internet browser, etc.), user or demographic target such as an industry segment (e.g., consumer, small and medium business (SMB), enterprise, healthcare, government, financial, legal, etc.), a geographical region of the demographic, device location specific placement or entry point preference (e.g., taskbar, desktop, start menu, etc.), and the like, etc. Accordingly, one or more market analytic(s) provided by analysis component 1116 can be employed (e.g., directly by revealing the one or more market analytic(s) to OEMs 106, ISVs 104, and so on, derivatively, for example, by making recommendations for contracting for placement or conversion, and/or any combination of these or other suitable uses of one or more market analytic(s), etc.) to facilitate decision making. As can be understood, such market analytics as provided by analysis component 1116 can be employed by ISVs 104 and/or OEMs in creating, modifying, revoking, and/or accepting, repudiating, and so on of offers for placement and/or conversion. Accordingly, analysis component 1116 can be adapted to be accessed by EVs/OEMs (e.g., OEMs 106) and/or ISVs 104 and be further adapted to create market analytics as described herein, (e.g., comprising information regarding aggregate market behavior for ISV software applications or service references, EV/OEM devices, and so on, etc.).

In yet another example, the analysis component 1116 can, in various embodiments, be further configured or adapted to provide metrics (e.g., data regarding specific placements, performance measurements, traffic quality regarding visitor, usage, and conversion information, and so on, etc.), such as contract metrics, performance metrics, and the like to marketplace participants (e.g., ISVs 104, OEMs 106, EVs 106, device redistributors 106, etc.) that can give the marketplace participants the ability to track specific placements and measure performance and quality of traffic by analyzing visitor, usage, conversion information, and so on, etc. Thus, in particular—limiting implementations of device or system 1100, analysis component 1116 can be configured or adapted to provide performance metrics regarding the one or more contract(s) to one or more OEM/EV(s) 106 or ISVs 104, for instance, by reference to the at least a subset of the contract information. In still another example, the analysis component 1116 can, in various embodiments, be adapted or configured to generate insights from analysis of customer usage trends (e.g., market share, visits, page views, demographics, etc.) and aggregated transaction data (e.g., price, conversions, placement location or entry point, device type, etc.) to help marketplace participants (e.g., ISVs 104, OEMs 106, EVs 106, device redistributors 106, etc.) better target placements, optimize revenue, and create more productive user experiences. Accordingly, in particular non-limiting implementations of device or system 1100, analysis component 1116 can be configured or adapted to provide access to one or more OEM/EV(s) or ISVs and to create the one or more market analytic(s) including information regarding aggregate market behavior for one or more ISV software application(s) or service(s) (or links, or references thereto, etc.) or one or more OEM/EV device(s).

In still other exemplary implementations of device or system 1100, the disclosed subject matter can provide a software distribution system, such as a marketplace 626, market 102, etc., as described above regarding FIGS. 2-3, 6, etc., for example, configured or adapted to provide access to one or more OEM/EV(s) 106 and/or one or more ISV(s) 104, and can be configured or adapted to display one or more ISV software application(s) or service(s) (or links, or references thereto, etc.), one or more OEM/EV device(s), one or more market analytic(s) regarding the one or more ISV software application(s) or service(s) (or links, or references thereto, etc.), or the one or more OEM/EV device(s). The software distribution system can be further configured or adapted to track one or more contract(s), formed via the software distribution system, for placement or conversion of an ISV software application (or a link, or a reference thereto, etc.) or a service (or a link, or a reference thereto, etc.) on an OEM/EV device, based on contract information, such as a unique contract identification number created by the software distribution system for the one or more contract(s), and contract information further comprising a reference to a contract tracking component, a trackable attribute of the one or more contract(s), a specific contract term of the one or more contract(s), or a network reference to a resource, as described above, configured or adapted to provide enhanced access to the ISV software application or the service. Moreover, exemplary implementations of device or system 1100, the disclosed subject matter can further configure or adapt the software distribution system to facilitate placing instructions into the one or more ISV software application(s) or service(s) (or link(s), or reference(s) thereto, etc.), wherein the instructions can be configured or adapted to direct the OEM/EV device to employ a subset of the contract information upon the accessing the ISV software application (or a link, or a reference thereto, etc.) or the service (or a link, or a reference thereto, etc.), as described above.

In further non-limiting implementations of device or system 1100, the disclosed subject matter can further configure or adapt the software distribution system to receive, for the one or more contract(s), conversion information related to the contract information, the one or more ISV software application(s) or the service(s) (or link(s), or reference(s) thereto, etc.), or the OEM/EV device in response to a request to or query of the ISV for the one or more contract(s), to send a request to or query the ISV for the conversion information by reference to the subset of the contract information, and to accept a payment for facilitating the formation of the one or more contract(s) based on the placement or the conversion of the one or more ISV software application(s) or service(s) (or link(s), or reference(s) thereto, etc.) or an invocation of the one or more ISV software application(s) or service(s) (or link(s), or reference(s) thereto, etc.) on the OEM/EV device. In yet other exemplary implementations of device or system 1100, the software distribution system, or a portion thereof, can be configured or adapted to create one or more market analytic(s) including information regarding aggregate market behavior for the one or more ISV software application(s) or service(s) (or links, or references thereto, etc.) or the one or more OEM/EV device(s), and to provide performance metrics regarding the one or more contract(s) to the OEM/EV or the ISV by reference to the subset of the contract information. In still other exemplary implementations, device or system 1100, or portions thereof (e.g., such as a payment component, etc.) of the disclosed subject matter can be further configured or adapted to receive a payment for facilitating formation of the one or more contract(s) based on the placement or the conversion of the one or more of the ISV software application(s) or service(s) (or links, or references thereto, etc.) or based on an invocation of the one or more ISV software application(s) or service(s) (or links, or references thereto, etc.) on the one or more OEM/EV device(s) 204, for instance, as described further in reference to FIGS. 1-3, 6, 11-12, 15, etc.

As depicted, device or system 1100 is described as a monolithic device or system. However, it is to be understood that the various components and/or the functionality provided thereby can be incorporated into the host processor 1102 or provided by other connected devices. Accordingly, it is to be understood that more or less of the described functionality may be implemented, combined, and/or distributed (e.g., among network devices, servers, databases, and the like), according to context, system design considerations, and/or marketing factors.

Figure 12:
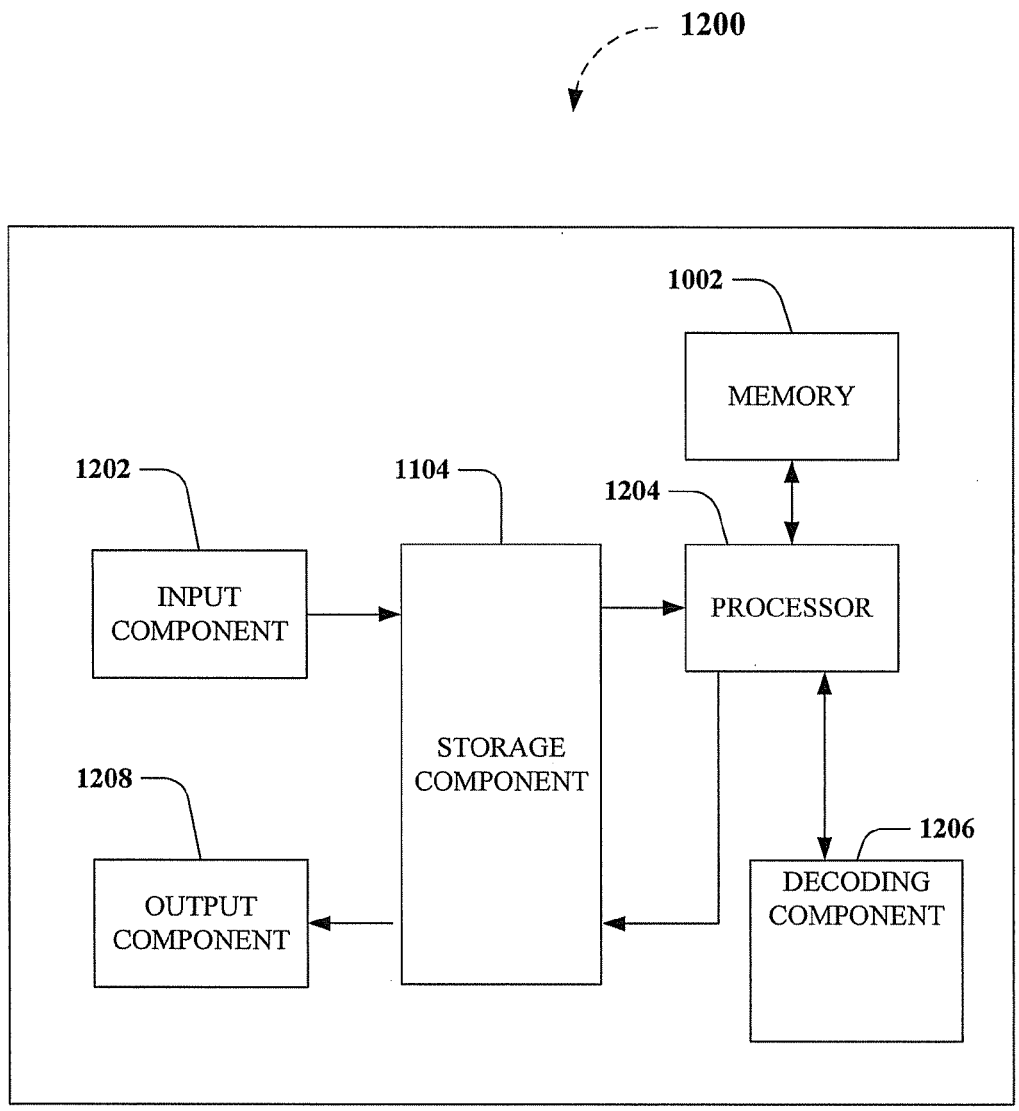
FIG. 12 illustrates an exemplary non-limiting device or system suitable for performing various aspects of the disclosed subject matter.

FIG. 12 illustrates an exemplary non-limiting system or device 1200 suitable for performing various aspects of the disclosed subject matter. As an illustrative example, exemplary non-limiting device or system 1200 can comprise exemplary devices of FIG. 7 or exemplary device or system 1100, as described above, or portions thereof. System or device 1200 can comprise an input component 1202 that can receive data or signals, and performs typical actions thereon (e.g., transmits to storage component 1104) the received data or signal. A storage component 1104 can store the received data or signal, as described above, for subsequent processing or can provide it to a decoding component 1206, or a processor (e.g., processor 1004, 1102, 1204, etc.), via a memory (e.g., memory 1002, etc.) over a suitable communications bus or otherwise, or to the output component 1208.

Processor 1204 can be a processor dedicated to analyzing and performing functions on information received by input component 1202 and/or generating information for transmission by an output component 1208. Processor 1204 can be a processor that controls one or more portion(s) of system or device 1200, and/or a processor that analyzes information received by input component 1202, generates information for transmission by output component 1208, and performs various decoding algorithms of decoding component 1206. Decoding component 1206 can include various algorithms and routines to facilitate communication according specified network protocols and coding algorithms.

While decoding component 1206 is shown external to the processor 1204 and memory 1002, it is to be understood that decoding component 1206 can include decoding code stored in storage component 1104 and subsequently retained in memory 1002 for execution by processor 1204. It can be understood that various routines performed by system or device 1200 can utilize artificial intelligence based methods in connection with performing inference and/or probabilistic determinations and/or statistical-based determinations in connection with various aspects of the disclosed subject matter.

System or device 1200 can additionally comprise memory 1002 (e.g., memory 1004, etc.) that is operatively coupled to processor 1204 and that stores information such as described above, parameters, information, and the like, wherein such information can be employed in connection with implementing various aspects as described herein. Memory 1002 can additionally store received data or information (e.g., information such as market analytics regarding aggregate market behavior for a plurality of ISV software applications or services references and a plurality of OEM devices, ISV and/or OEM account or profile information, contract or performance metrics, code or instructions (e.g., Code or Instr's 206), contract information, conversion information, additional tracking information, queries, requests, etc.), as well as software routines and instructions as described above in reference to FIGS. 2-6, 7, 10-11, etc., for example.

As an illustration of a non-limiting implementation of the disclosed subject matter, an exemplary device 1200 can be configured or adapted to store (e.g., in storage component 1104, in memory 1002, etc.) a software vendor application or a service (or a link, or a reference thereto, etc.), wherein the software vendor application (or a link, or a reference thereto, etc.) or service (or a link, or a reference thereto, etc.) can be configured or adapted to locate contract information stored on the device 1200. For instance, as described above, contract information can be associated with a contract between a software vendor providing the software vendor application or service (or a link, or a reference thereto, etc.) and the device 1200 provider (e.g., such as manufacturer, an OEM, an EV, a redistributor, and so on, etc.) to place the software vendor application or service (or a link, or a reference thereto, etc.) on the device 1200. Thus, exemplary device 1200 can configured or adapted to store (e.g., in storage component 1104, in memory 1002, etc.) the software vendor application or service (or a link, or a reference thereto, etc.) that refers the device 1200 to a tracking component (e.g., a contract tracking component such as Tracking Component 210, etc.) of a software distribution system, such as system 1100, marketplace 626, market 102, etc., (e.g., as described above regarding FIGS. 2-3, 6, 11, etc.) when the software vendor application or service (or a link, or a reference thereto, etc.) is invoked, as described previously. Moreover, exemplary device 1200 can configured or adapted to transmit (e.g., via output component 1208, etc.) a subset of the contract information to the tracking component to facilitate tracking the contract. In other non-limiting embodiments, exemplary device 1200 can configured or adapted to provide a trackable attribute of the contract to the tracking component as part of the subset of the contract information, as further described herein, for example, regarding FIGS. 2-3, 6, 11, etc.

It will be understood that storage component 1104 and memory 1002 and/or any combination thereof as described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 1002 is intended to comprise, without being limited to, these and any other suitable types of memory, including processor registers and the like. In addition, by way of illustration and not limitation, storage component 1104 can include conventional storage media as in known in the art (e.g., hard disk drive).

It can be understood that various techniques described herein may be implemented in connection with hardware or software or, where appropriate, with a combination of both. As used herein, the terms "device," "component," "system" and the like are likewise intended to refer to a computer-related entity, either hardware, a combination of hardware and software, software, or software in execution. For example, a "device," "component," subcomponent, "system" portions thereof, and so on, may be, but is not limited to being, a process running on a processor, a processor, an object, an executable, a thread of execution, a program, and/or a computer. By way of illustration, both an application running on computer and the computer can be a component. One or more component(s) may reside within a process and/or thread of execution and a component may be localized on one computer and/or distributed between two or more computer(s).

It can be further understood that while a brief overview of exemplary systems, methods, scenarios, and/or devices has been provided, the disclosed subject matter is not so limited. Thus, it can be further understood that various modifications, alterations, addition, and/or deletions can be made without departing from the scope of the embodiments as described herein. Accordingly, similar non-limiting implementations can be used or modifications and additions can be made to the described embodiments for performing the same or equivalent function of the corresponding embodiments without deviating therefrom.

Example Networked and Distributed Environments

One of ordinary skill in the art can appreciate that the various embodiments of disclosed and related systems, devices, and/or methods described herein can be implemented in connection with any computer or other client or server device, which can be deployed as part of a computer network or in a distributed computing environment, and can be connected to any kind of data store. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may utilize disclosed and related systems, devices, and/or methods as described for various embodiments of the subject disclosure.

Figure 13:
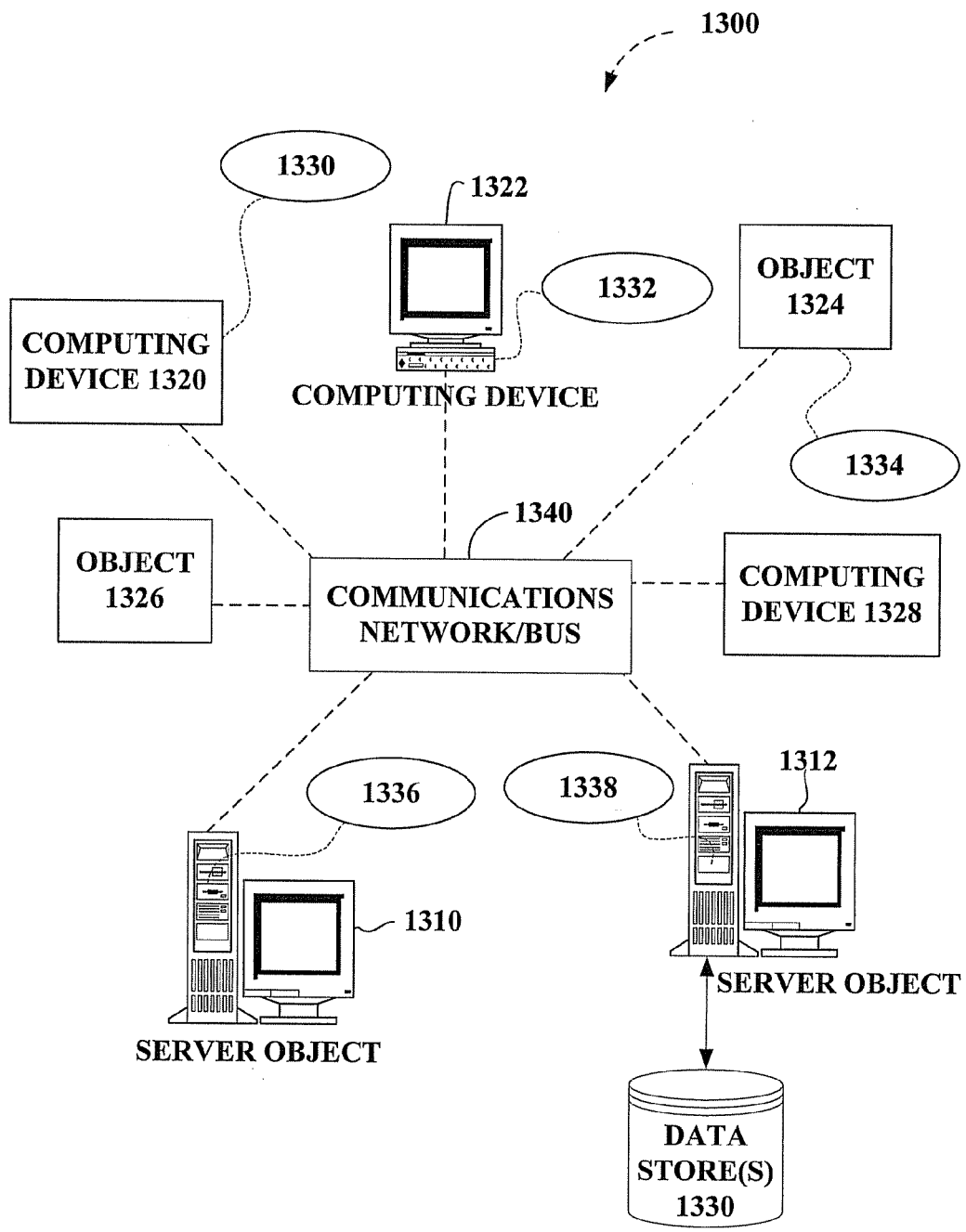
FIG. 13 is a block diagram representing exemplary non-limiting networked environments in which various embodiments described herein can be implemented.

FIG. 13 provides a schematic diagram of an exemplary networked or distributed computing environment. The distributed computing environment comprises computing objects 1310, 1312, etc. and computing objects or devices 1320, 1322, 1324, 1326, 1328, etc., which may include programs, methods, data stores, programmable logic, etc., as represented by applications 1330, 1332, 1334, 1336, 1338. It can be understood that objects 1310, 1312, etc. and computing objects or devices 1320, 1322, 1324, 1326, 1328, etc. may comprise different devices, such as PDAs, audio/video devices, mobile phones, MP3 players, personal computers, laptops, etc.

Each object 1310, 1312, etc. and computing objects or devices 1320, 1322, 1324, 1326, 1328, etc. can communicate with one or more other object(s) 1310, 1312, etc. and computing object(s) or device(s) 1320, 1322, 1324, 1326, 1328, etc. by way of the communications network 1340, either directly or indirectly. Even though illustrated as a single element in FIG. 13, network 1340 may comprise other computing objects and computing devices that provide services to the system of FIG. 13, and/or may represent multiple interconnected networks, which are not shown. Each object 1310, 1312, etc. or 1320, 1322, 1324, 1326, 1328, etc. can also contain an application, such as applications 1330, 1332, 1334, 1336, 1338, that might make use of an API, or other object, software, firmware and/or hardware, suitable for communication with or implementation of disclosed and related systems, devices, methods, and/or functionality provided in accordance with various embodiments of the subject disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to employing disclosed and related systems, devices, and/or methods as described in various embodiments.

Thus, a host of network topologies and network infrastructures, such as client/server, peer-to-peer, or hybrid architectures, can be utilized. The "client" is a member of a class or group that uses the services of another class or group to which it is not related. A client can be a process, e.g., roughly a set of instructions or tasks, that requests a service provided by another program or process. The client process utilizes the requested service without having to "know" any working details about the other program or the service itself.

In a client/server architecture, particularly a networked system, a client is usually a computer that accesses shared network resources provided by another computer, e.g., a server. In the illustration of FIG. 13, as a non-limiting example, computers 1320, 1322, 1324, 1326, 1328, etc. can be thought of as clients and computers 1310, 1312, etc. can be thought of as servers where servers 1310, 1312, etc. provide data services, such as receiving data from client computers 1320, 1322, 1324, 1326, 1328, etc., storing of data, processing of data, transmitting data to client computers 1320, 1322, 1324, 1326, 1328, etc., although any computer can be considered a client, a server, or both, depending on the circumstances. Any of these computing devices may be processing data, forming metadata, synchronizing data or requesting services or tasks that may implicate disclosed and related systems, devices, and/or methods as described herein for one or more embodiment(s).

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to disclosed and related systems, devices, and/or methods can be provided standalone, or distributed across multiple computing devices or objects.

In a network environment in which the communications network/bus 1340 is the Internet, for example, the servers 1310, 1312, etc. can be Web servers with which the clients 1320, 1322, 1324, 1326, 1328, etc. communicate via any of a number of known protocols, such as the hypertext transfer protocol (HTTP). Servers 1310, 1312, etc. may also serve as clients 1320, 1322, 1324, 1326, 1328, etc., as may be characteristic of a distributed computing environment.

Example Device

Figure 14:
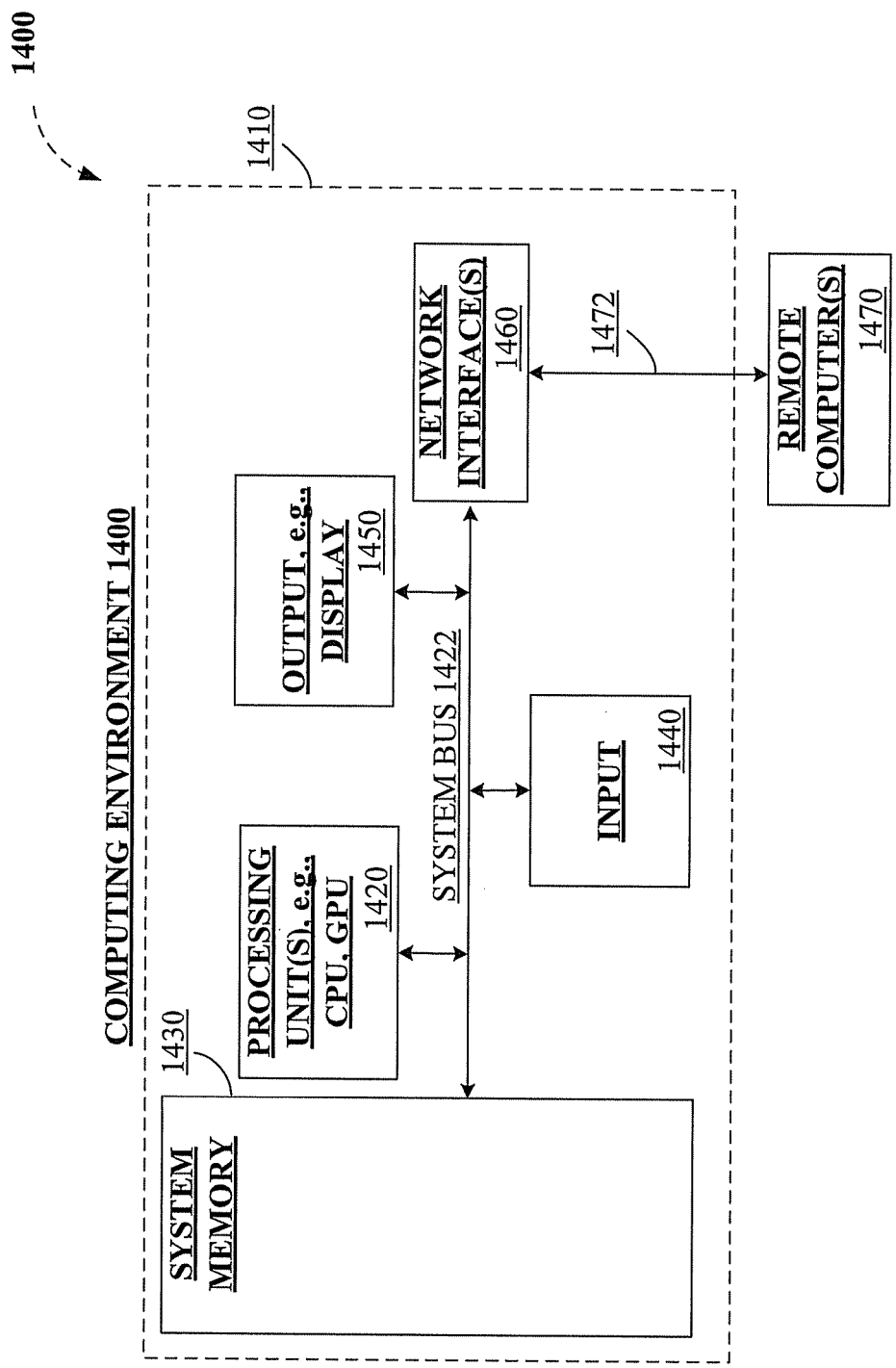
FIG. 14 is a block diagram representing an exemplary non-limiting computing system or operating environment in which one or more aspects of various embodiments described herein can be implemented.

As mentioned, advantageously, the techniques described herein can be applied to devices or systems where it is desirable to employ disclosed and related systems, devices, and/or methods. It should be understood, therefore, that handheld, portable and other computing devices and computing objects of all kinds are contemplated for use in connection with the various embodiments, e.g., anywhere that a device can provide a placement opportunity for an application, such as a software application from an ISV, or a service, such as an online service, (or links, or references thereto, etc.). Accordingly, the below general purpose remote computer described below in FIG. 14 is but one example of a computing device. Additionally, disclosed and related systems, devices, and/or methods can include one or more aspect(s) of the below general purpose computer, such as display, storage, analysis, control, etc.

Although not required, embodiments can partly be implemented via an operating system, for use by a developer of services for a device or object, and/or included within application software that operates to perform one or more functional aspect(s) of the various embodiments described herein. Software may be described in the general context of computer executable instructions, such as program modules, being executed by one or more computer(s), such as client workstation(s), server(s) or other device(s). Those skilled in the art will appreciate that computer systems have a variety of configurations and protocols that can be used to communicate data, and thus, no particular configuration or protocol should be considered limiting.

FIG. 14 thus illustrates an example of a suitable computing system environment 1400 in which one or aspects of the embodiments described herein can be implemented, although as made clear above, the computing system environment 1400 is only one example of a suitable computing environment and is not intended to suggest any limitation as to scope of use or functionality. Neither should the computing environment 1400 be interpreted as having any dependency or requirement relating to any one or combination of components illustrated in the exemplary operating environment 1400.

With reference to FIG. 14, an exemplary remote device for implementing one or more embodiment(s) includes a general purpose computing device in the form of a computer 1410. Components of computer 1410 may include, but are not limited to, a processing unit 1420, a system memory 1430, and a system bus 1422 that couples various system components including the system memory to the processing unit 1420.

Computer 1410 typically includes a variety of computer readable media and can be any available media that can be accessed by computer 1410. The system memory 1430 may include computer storage media in the form of volatile and/or nonvolatile memory such as read only memory (ROM) and/or random access memory (RAM). By way of example, and not limitation, memory 1430 may also include an operating system, application programs, other program modules, and program data.

A user can enter commands and information into the computer 1410 through input devices 1440. A monitor or other type of display device is also connected to the system bus 1422 via an interface, such as output interface 1450. In addition to a monitor, computers can also include other peripheral output devices such as speakers and a printer, which may be connected through output interface 1450.

The computer 1410 may operate in a networked or distributed environment using logical connections to one or more other remote computer(s), such as remote computer 1470. The remote computer 1470 may be a personal computer, a server, a router, a network PC, a peer device or other common network node, or any other remote media consumption or transmission device, and may include any or all of the elements described above relative to the computer 1410. The logical connections depicted in FIG. 14 include a network 1472, such local area network (LAN) or a wide area network (WAN), but may also include other networks/buses. Such networking environments are commonplace in homes, offices, enterprise-wide computer networks, intranets and the Internet.

As mentioned above, while exemplary embodiments have been described in connection with various computing devices and network architectures, the underlying concepts may be applied to any network system and any computing device or system in which it is desirable to employ disclosed and related systems, devices, and/or methods.

Also, there are multiple ways to implement the same or similar functionality, e.g., an appropriate API, tool kit, driver code, operating system, control, standalone or downloadable software object, etc. which enables applications and services to use disclosed and related systems, devices, methods, and/or functionality. Thus, embodiments herein are contemplated from the standpoint of an API (or other software object), as well as from a software or hardware object that implements one or more aspect(s) of disclosed and related systems, devices, and/or methods as described herein. Thus, various embodiments described herein can have aspects that are wholly in hardware, partly in hardware and partly in software, as well as in software.

In addition, the words "exemplary" and "non-limiting" are used herein to mean serving as an example, instance, or illustration. For the avoidance of doubt, the subject matter disclosed herein is not limited by such examples. Moreover, any aspect or design described herein as "exemplary" and/or "non-limiting" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

As mentioned, the various techniques described herein may be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. In addition, one or more component(s) may reside within a process and/or thread of execution and a component may be localized on one computer and/or distributed between two or more computer(s).

Systems described herein can be described with respect to interaction between several components. It can be understood that such systems and components can include those components or specified sub-components, some of the specified components or sub-components, and/or additional components, and various permutations and combinations of the foregoing. Sub-components can also be implemented as components communicatively coupled to other components rather than included within parent components (hierarchical). Additionally, it should be noted that one or more component(s) may be combined into a single component providing aggregate functionality or divided into several separate sub-components, and that any one or more middle component layer(s), such as a management layer, can be provided to communicatively couple to such sub-components in order to provide integrated functionality. Any components described herein may also interact with one or more other component(s) not specifically described herein but generally known by those of skill in the art.

In view of the exemplary systems described herein, methods that can be implemented in accordance with the described subject matter can be better appreciated with reference to the flowcharts of the various figures and vice versa. While for purposes of simplicity of explanation, the methods may be shown and described as a series of blocks, it is to be understood and appreciated that the claimed subject matter is not limited by the order of the blocks, as some blocks may occur in different orders and/or concurrently with other blocks from what is depicted and described herein. Where non-sequential, or branched, flow is illustrated via flowchart, it can be understood that various other branches, flow paths, and orders of the blocks, may be implemented which achieve the same or a similar result. Moreover, not all illustrated blocks may be required to implement the methods described hereinafter.

In addition to the various embodiments described herein, it is to be understood that other similar embodiments can be used or modifications and additions can be made to the described embodiment(s) for performing the same or equivalent function of the corresponding embodiment(s) without deviating therefrom. Still further, multiple processing chips or multiple devices can share the performance of one or more function(s) described herein, and similarly, storage can be effected across a plurality of devices. Accordingly, the invention should not be limited to any single embodiment, but rather should be construed in breadth, spirit and scope in accordance with the appended claims.

Example Graphical User Interface

As described above, regarding FIGS. 2, 11, etc., for example, in exemplary implementations of the disclosed subject matter, a GUI can be provided, for example to facilitate contracting for placement or conversion of a software application or a service (or a link, or a reference thereto, etc.) on an OEM device (e.g., OEM device 204, etc.), distributing software or promoting online services, device customization, and/or pre-installing software applications or services (or links, or references thereto, etc.) on the OEM device according to various aspects of the disclosed subject matter, among other related functions. In addition, additional embodiments of the disclosed subject matter can provide computer executable components that can be stored on a computer readable storage medium (e.g., storage component 1104, etc.) 1500, and that, in response to execution by a computing device (e.g., host processor 1102, processor 1104, etc.), can cause the computing device to display information (e.g., on the computing device, on a remote computing device over a network, etc), for example, such as via a GUI.

Figure 15:
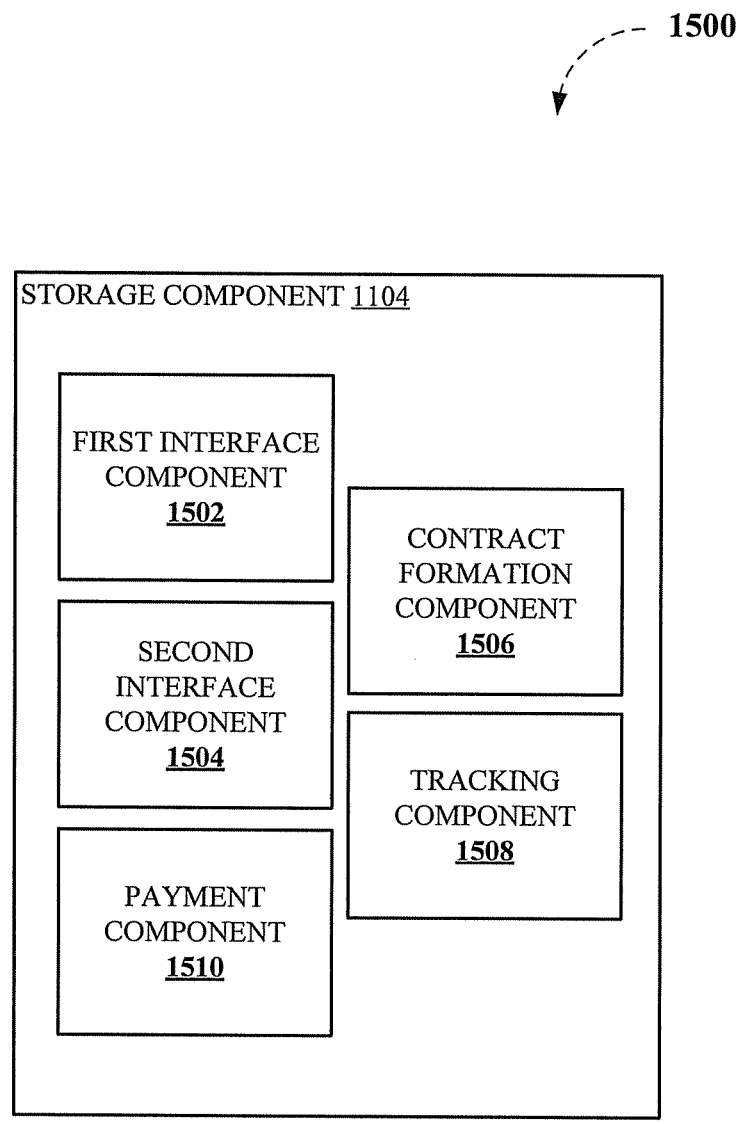
FIGS. 15-30 depict various non-limiting examples of a graphical user interface (GUI) suitable for use with exemplary aspects of the disclosed subject matter.

For example, FIG. 15 depicts an exemplary non-limiting block diagram of a computer readable storage medium (e.g., storage component 1104, etc.) 1500 that can comprise computer executable components that, in response to execution by a computing device (e.g., host processor 1102, processor 1104, etc.), can cause the computing device to display information (e.g., on the computing device, on a remote computing device over a network, etc). As a non-limiting example, the computer executable components of the computer readable storage medium 1500 can comprise a first interface component 1502 that can be configured to display a first set of contract terms and to receive first input from one or more ISV(s) 104 after authentication of the one or more ISV(s) 104. For instance, the first input can relate to or be associated with one or more OEM device(s) (e.g., OEM device 204, etc.) of one or more OEM(s) 106. As a further example, the first set of contract terms can be related to or associated with an offer to place one or more ISV software application(s) or service(s) (or links, or references thereto, etc.) (e.g., App./Ref. 216) on the OEM device.

In addition, the computer executable components of the computer readable storage medium 1500 can comprise a second interface component 1504 that can be configured to display a second set of contract terms and to receive second input from one or more OEM(s) 106 after authentication of the one or more OEM(s) 106. For example, the second input can relate to or be associated with one or more ISV(s) 104. As a further example, the second set of contract terms can be related to or associated with an offer to compensate for the placement of the one or more ISV software application(s) or service(s) (or links, or references thereto, etc.) (e.g., App./Ref. 216) on the OEM device.

The computer executable components of the computer readable storage medium 1500 can further comprise a contract formation component 1506 that, in various embodiments, can be configured to create or generate contract information (e.g., such as a trackable or a unique contract identification number, Contract Info. 208, etc.) relating to a contract. For instance, a contract can be formed with the contract formation component 1506, for example, via the first 1502 and/or the second interface component 1504, based in part on acceptance of the first or second contract terms, such as can be indicated by the first or second input by the one or more ISV(s) 104 and/or the one or more OEM (s) 106, respectively.

In other exemplary implementations, computer readable storage medium 1500 can also comprise a contract tracking component 1508 (e.g., a contract tracking component such as Tracking Component 210, etc.) that can be configured to track performance under the contract of one or more term(s) of the first or second set of contract terms as further described herein, for example, based in part on a subset of the contract information. For instance, in addition to various non-limiting examples of contract information as described herein, the subset of the contract information can include one or more of a trackable contract identification number, a reference to the contract tracking component (e.g., Tracking Component 210), a trackable attribute of the contract a trackable attribute of the contract formed (e.g., as further described herein, etc.), a specific contract term for the contract (e.g., payment method, payment amount, etc.), or an ISV reference that facilitates providing enhanced access to the at least one of the software application or the service as further described herein. In yet another non-limiting implementation, the trackable attribute of the contract can include, among other things, one or more OEM device entry point references. As further described herein, OEM device entry point references can include, for instance, a taskbar reference, a desktop reference, a browser favorite reference, a start menu reference, a general pop-up reference, a context-specific pop-up reference, and so on etc. Thus, in various non-limiting example, the trackable attribute of the contract can include one or more OEM device entry point references that are trackable such as by associating each of the one or more OEM device entry point references with a trackable entry point identification number in the contract information.

In still other exemplary implementations, computer readable storage medium 1500 can further comprise a payment component 1510 configured to receive a payment. As a non-limiting example, as described above regarding FIGS. 1-3, 6, 11-12, etc., a payment can be determined (e.g., determined by one or more of market 102, ISV 104, OEM 106, or automated systems acting on behalf of ISV 104 of OEM 106, or portions thereof, etc.) based on the placement, the conversion, the invoking, or the accessing, and/or otherwise as described herein, for facilitating formation of the contract. Thus, in exemplary non-limiting implementations, the payment can be received at least, among other things, based on one or more of the placement or the conversion of the one or more ISV software application(s) or service(s) (or links, or references thereto, etc.) (e.g., App./Ref. 216) on the OEM device. In yet other non-limiting implementations, computer readable storage medium 1500 can comprise a storage component 1104 further including a computer executable component (not shown) providing similar functionality as described above, for instance, regarding FIG. 11. For example, storage component 1104 can further comprise a computer executable component providing functionality as described in reference to analysis component 1116. Thus, as can be seen in FIG. 15, the computer executable components can cause a computing device to display information (e.g., on the computing device, on a remote computing device over a network, etc), for example, such as via the exemplary non-limiting GUI as described below.

Figure 16:
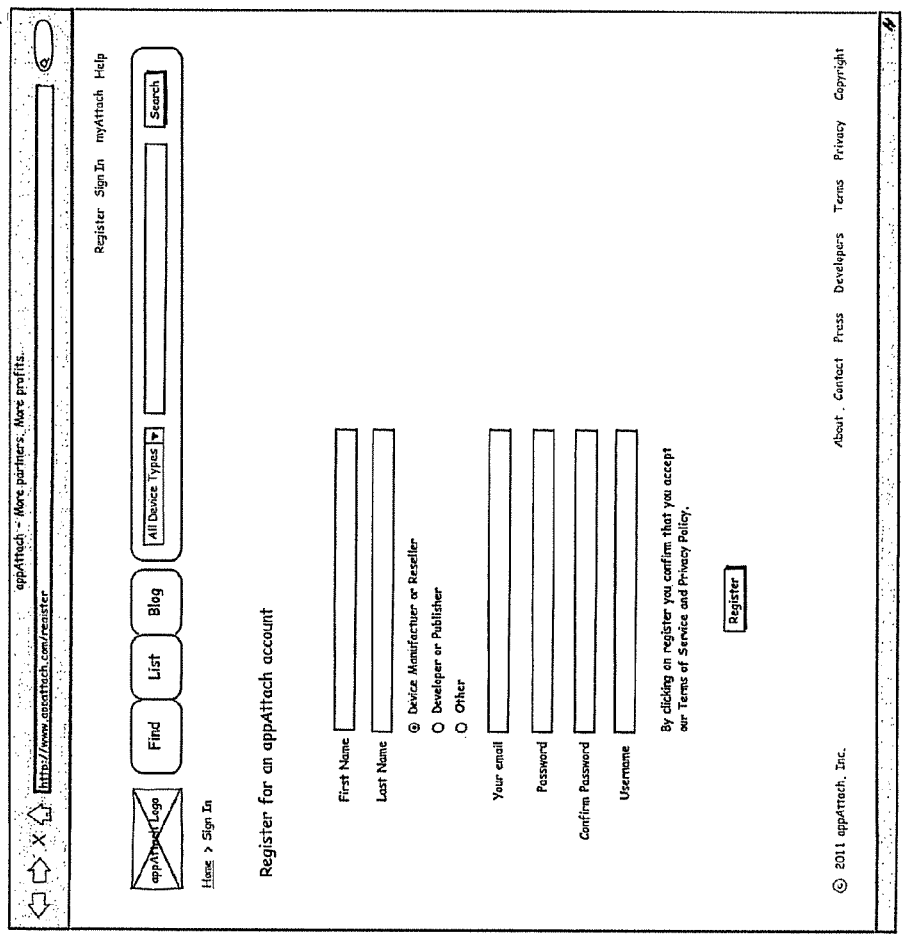
Figure 17:
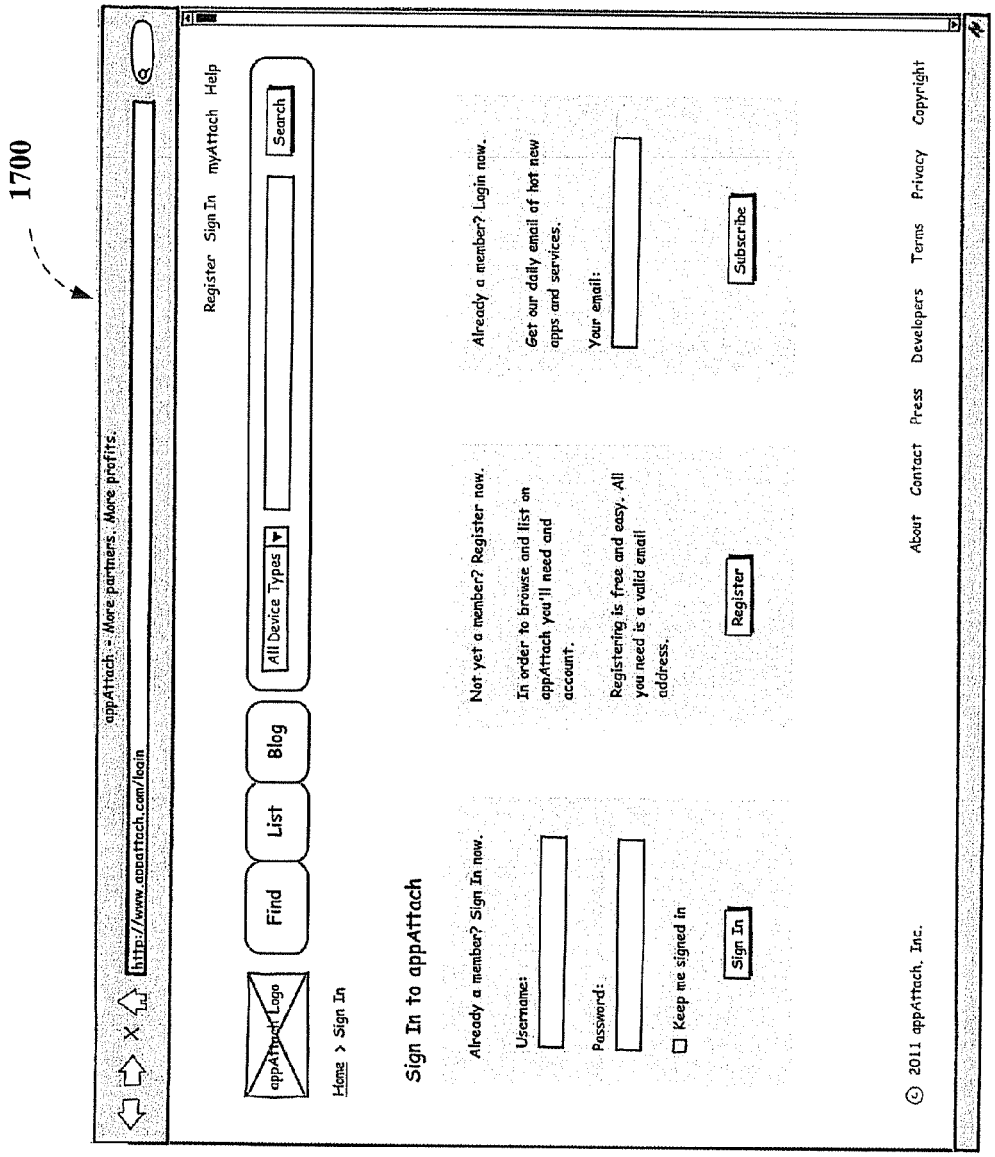

Accordingly, FIGS. 16-30 depict various non-limiting examples of a GUI suitable for use with exemplary aspects of the disclosed subject matter. For instance, FIG. 16 depicts a non-limiting example of a GUI Registration Page 1600 that can facilitate account creation in a software distribution system or marketplace, as described herein regarding FIGS. 2-3, 6, 11, etc., such as market 102, marketplace 626, system 1100, and the like, for one or more OEM(s) 106 and one or more ISV(s) 104. FIG. 17 depicts an exemplary GUI Login Page 1700 that can facilitate providing access, for the one or more OEM(s) 106 and one or more ISV(s) 104 to the software distribution system or marketplace, to enable pre-installing software applications or services (or links, or references thereto, etc.) on a device (e.g., OEM device 204, etc.), to facilitate contracting for placement or conversion of a software application or a service (or a link, or a reference thereto, etc.) on the device (e.g., OEM device 204, etc.).

Figure 18:
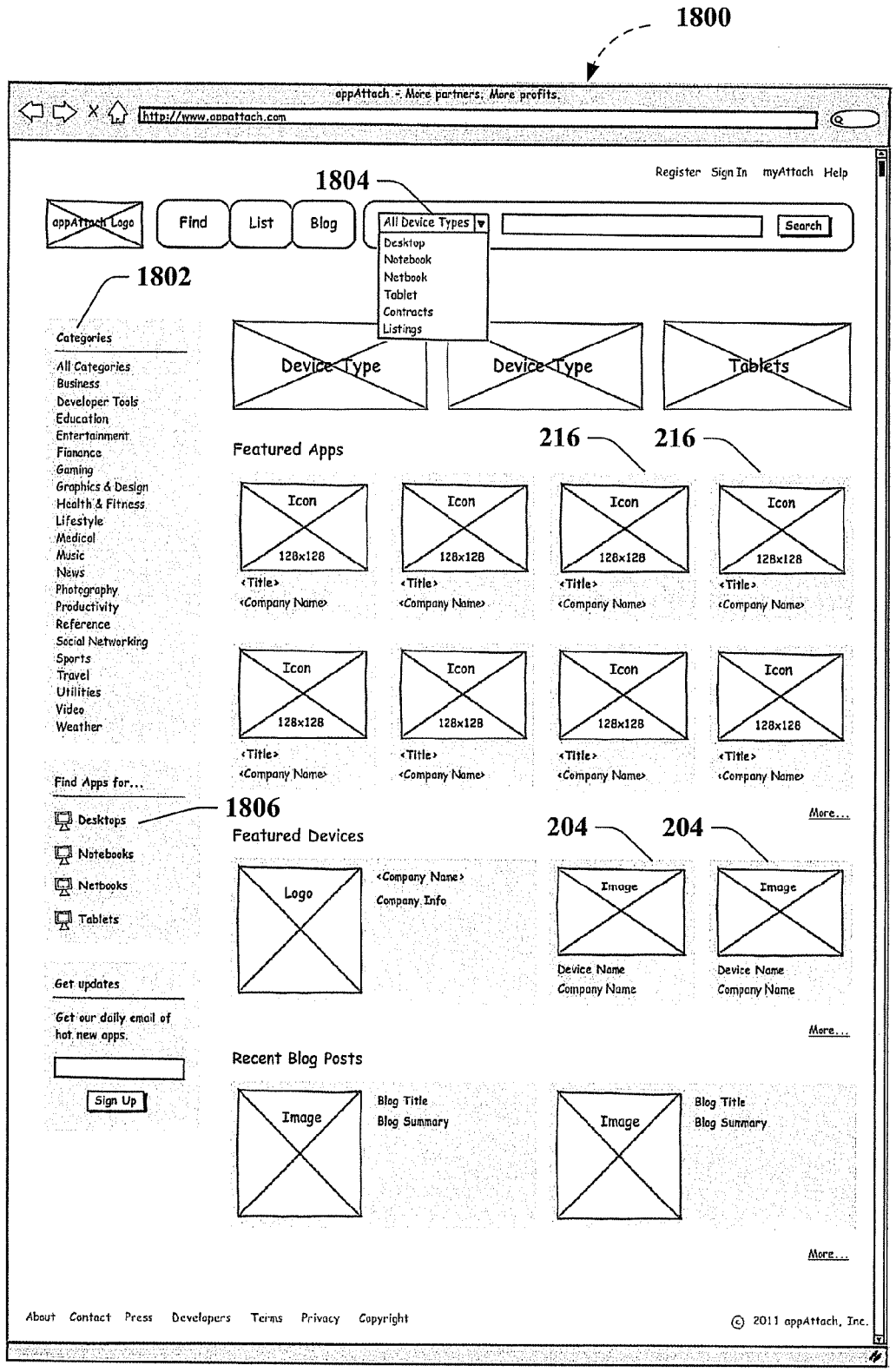
Figure 19:
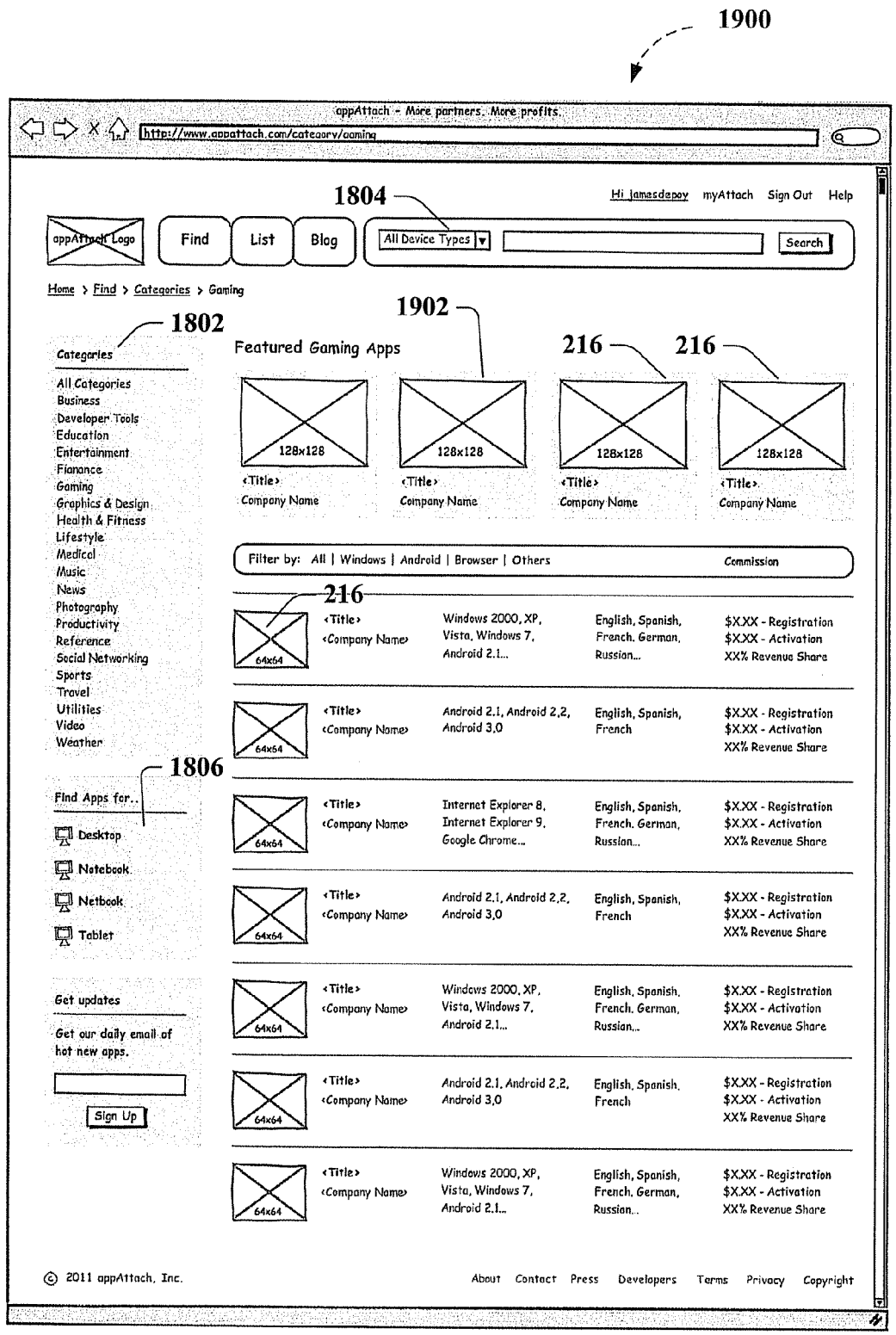
Figure 20:
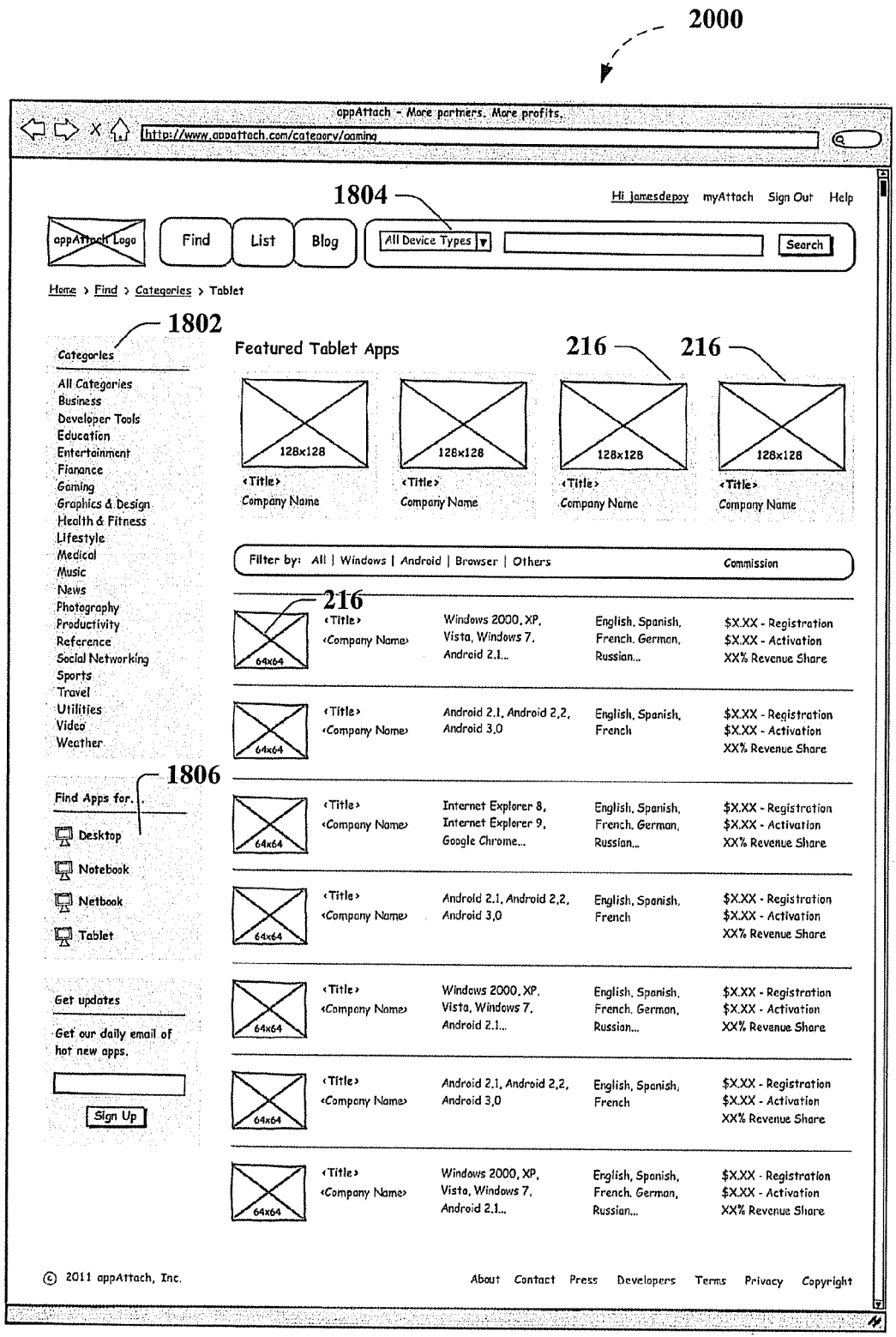

FIGS. 18-20 depict further non-limiting examples of a GUI Home Page 1800 and GUI Software Category Pages 1900 and 2000 (e.g., for the gaming software category 1802 and for the tablet software category 1802 of applications) that facilitate, for example, presenting information via the GUI to one or more OEM(s) 106 and one or more ISV(s) 104 regarding one or more ISV software application(s) or service(s) (or links, or references thereto, etc.) (e.g., App./Ref. 216), one or more OEM device(s) 204, or one or more market analytic(s) (not shown) regarding the one or more ISV software application(s) or service(s) and the one or more OEM device(s), and/or that facilitates displaying one or more ISV software application(s) or service(s) (or a link, or a reference thereto, etc.) (e.g., App./Ref. 216), one or more OEM device(s) 204, or one or more market analytic(s) (not shown) regarding the one or more ISV software application(s) or service(s) (or a link, or a reference thereto, etc.) and the one or more OEM device(s) 204. As further described herein, App./Ref. 216 can comprise App./Service Reference 202 as modified by including or incorporating Code or Instr's 206.

As can be seen in FIGS. 18-20 the GUI Pages can further facilitate searching for applications or services (or links, or references thereto, etc.) (e.g., App./Ref. 216) for placement on OEM devices 204 via, for example, a search bar 1804 and a category 1802 based search at 1806. For instance, by selecting one of the listings, such as listing 1902, for example, in the gaming software category 1802, the OEM 106 or other user (e.g., ISV 104, device redistributor 106, etc.), can be presented with a listing page for listing 1902.

Figure 21:
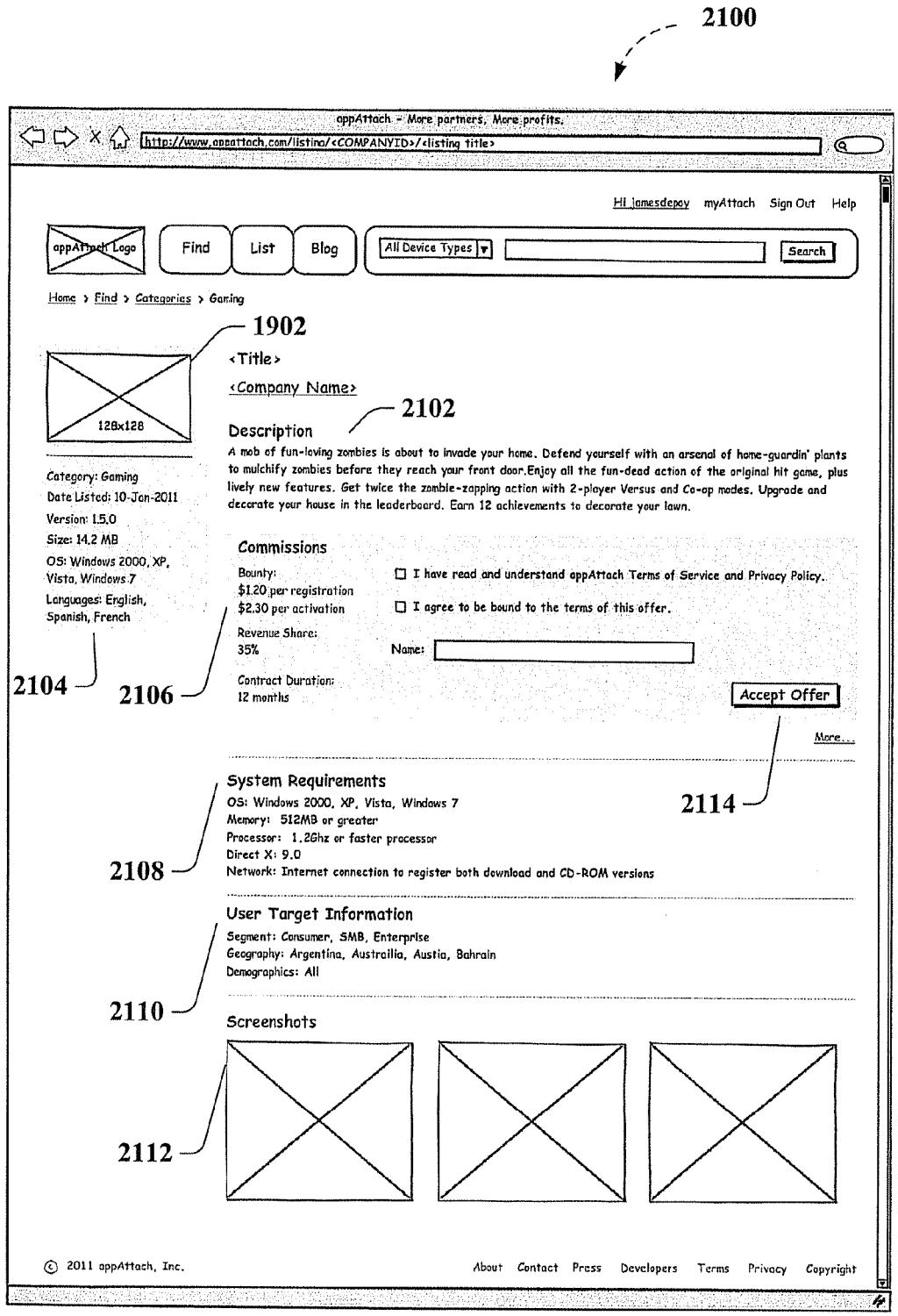

For example, FIG. 21 illustrates a non-limiting example of a GUI Listing Page 2100 that facilitates presenting and/or displaying one of the one or more ISV software application(s) or service(s) (or links, or references thereto, etc.) to one or more OEM(s) 106 and one or more ISV(s) 104. For instance, exemplary GUI Listing Page 2100 facilitates presenting and/or displaying the ISV software applications or services (or links, or references thereto, etc.) associated with the listing 1902 in the gaming software category 1802 to one or more OEM(s) 106 and one or more ISV(s) 104. As a result, the one or more OEM(s) 106 or the one or more ISV(s) 104 can, as non-limiting examples, browse the listing 1902 description 2102 and listing data 2104, contract terms 2106 (e.g., one or more payment method(s), such as bounty, revenue share, and the like, and one or more associated indication(s) of conversion, such as activation, registration, and so on, etc.), listing 1902 system requirements 2108, user target information 2110, one or more application or service placement icon or logo, or other relevant screenshot(s) 2112 for listing 1902, and one or more control(s) 2114 (e.g., checkboxes, textboxes, buttons, etc.) that can provide to an OEM 106, for example, the ability to indicate consent to be bound by the terms of the offer (and/or any other marketplace terms or agreements) represented by listing 1902, the ability to accept the offer, and so on.

Accordingly, exemplary GUI Listing Page 2100 can seen to further facilitate, for example, facilitate contracting for placement or conversion of a software application or a service (or a link, or a reference thereto, etc.) on an OEM device (e.g., OEM device 204, etc.), distributing software or promoting online services, device customization, and/or pre-installing software applications or services (or links, or references thereto, etc.) on the OEM device according to various aspects of the disclosed subject matter, among other related functions. It is noted that upon acceptance of the offer for listing 1902, for example, software distribution system or marketplace, as described herein regarding FIGS. 2-3, 6, 11, etc., such as market 102, marketplace 626, system 1100, and the like, can facilitate creating contract information (e.g., such as the unique contract identification number, Contract Info. 208, etc.) in response to the contract formed by the acceptance of the offer, between the OEM 106 and the ISV 104, as described herein.

Figure 22:
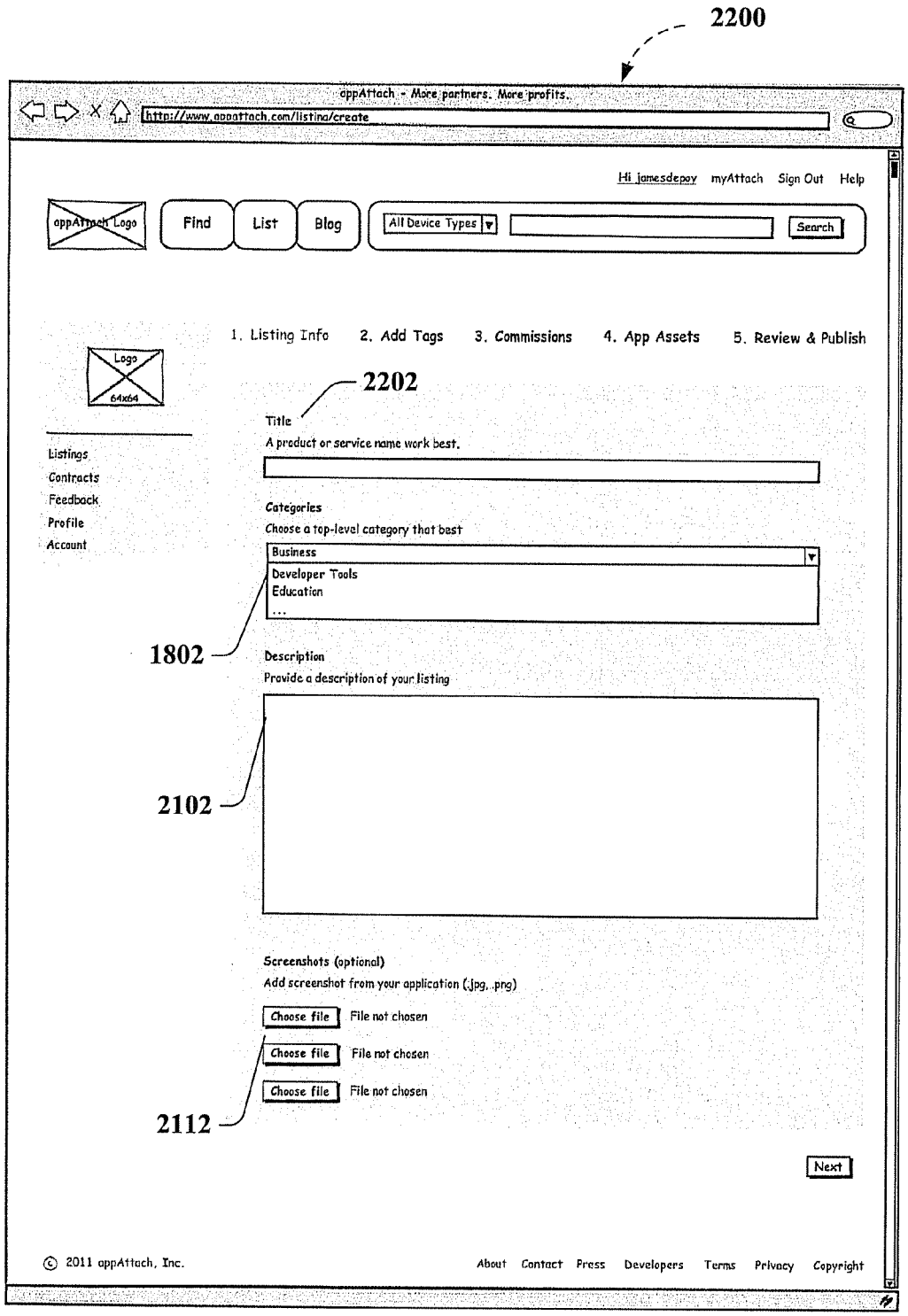

In yet other non-limiting implementations, FIGS. 22-26 demonstrate an exemplary software distribution system or marketplace that can facilitate creation of a listing, such as listing 1902, for example, in the gaming software category 1802 (e.g., for an application, or for a service, such as an online service, etc.). For example, FIG. 22 depicts a non-limiting example of a GUI Listing Info Page 2300 that facilitates creation of the listing, such as by ISV 104, for example. Thus, ISV 104 can provide, and the exemplary software distribution system or marketplace can receive, contract information about the listing for the application or services (or links, or references thereto, etc.) (e.g., App./Ref. 216) for placement on OEM devices 204. As a further non-limiting example, such contract information can comprise a title 2202, and category 1802, description 2102, and screenshot 2112, as described above.

Figure 23:
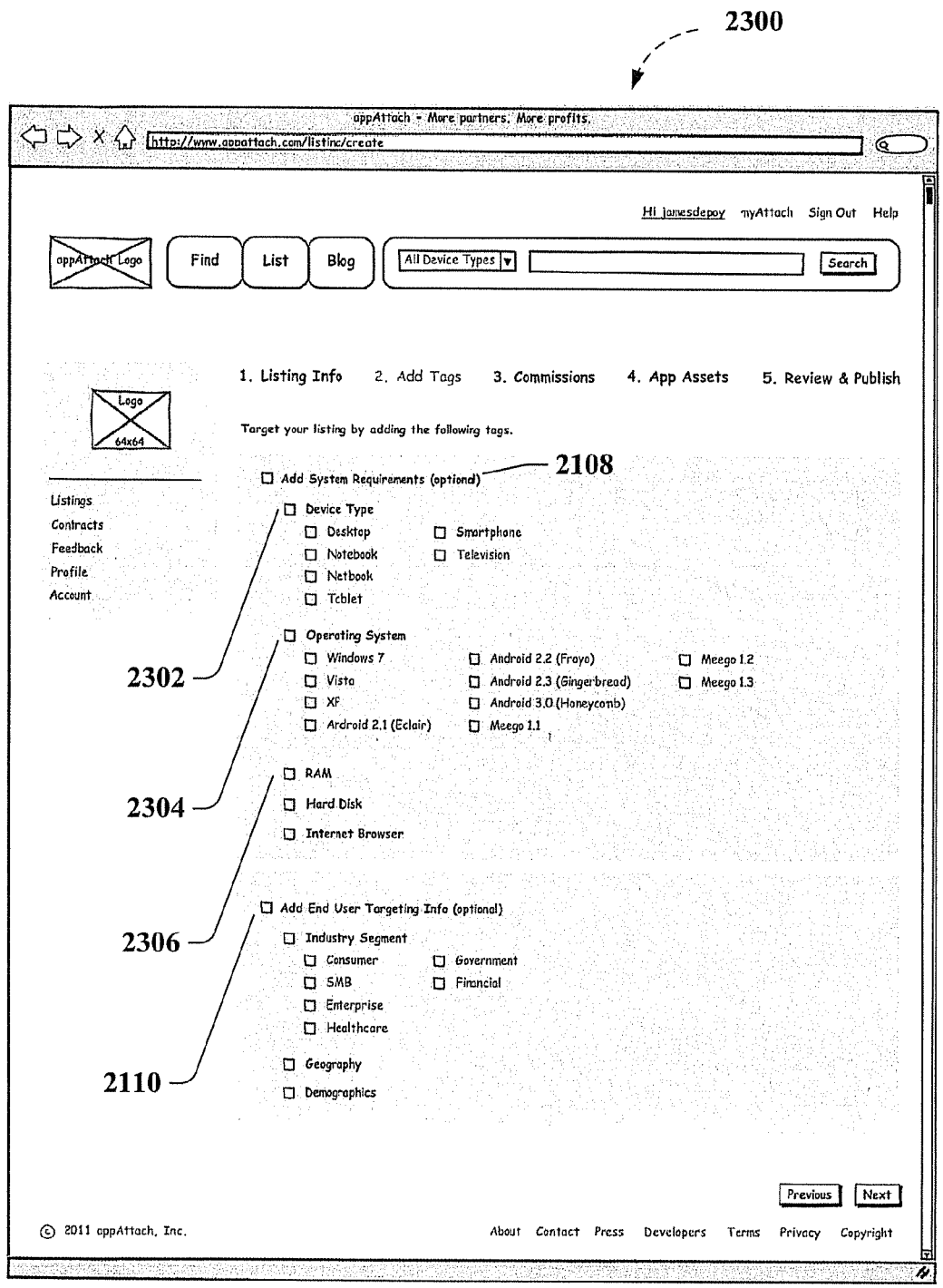

In a further non-limiting aspect, FIG. 23 demonstrates a non-limiting example of a GUI Add Tags Page 2300 that facilitates adding further contract information to the listing, such as by ISV 104, for example. For instance ISV 104 can provide, and the exemplary software distribution system or marketplace can receive, contract information, such as system requirements 2108 and user target information 2110, as previously described. For example, contract information about system requirements 2108 can comprise one or more of a device type 2302 that the listing is intended for (e.g., desktop, tablet, smartphone, etc.), operating system specification 2304 that the listing is intended for (e.g., brand or type and version, such as Windows® 7, Android™ 3.0, etc.), a device hardware or software specification 2306 that the listing is intended for (e.g., RAM, hard disk, Internet browser, etc.), and the like, etc.

In another example, contract information about user target information 2110 can comprise one or more of an industry segment the listing is intended for (e.g., consumer, SMB, enterprise, healthcare, government, financial, legal, etc.), a geographical region the listing is intended for, a demographic the listing is intended for, and the like, etc. In yet another example, contract information about listing can comprise a device location specific placement or entry point preference (not shown) (e.g., taskbar, desktop, start menu, etc.) as further described herein.

Figure 24:
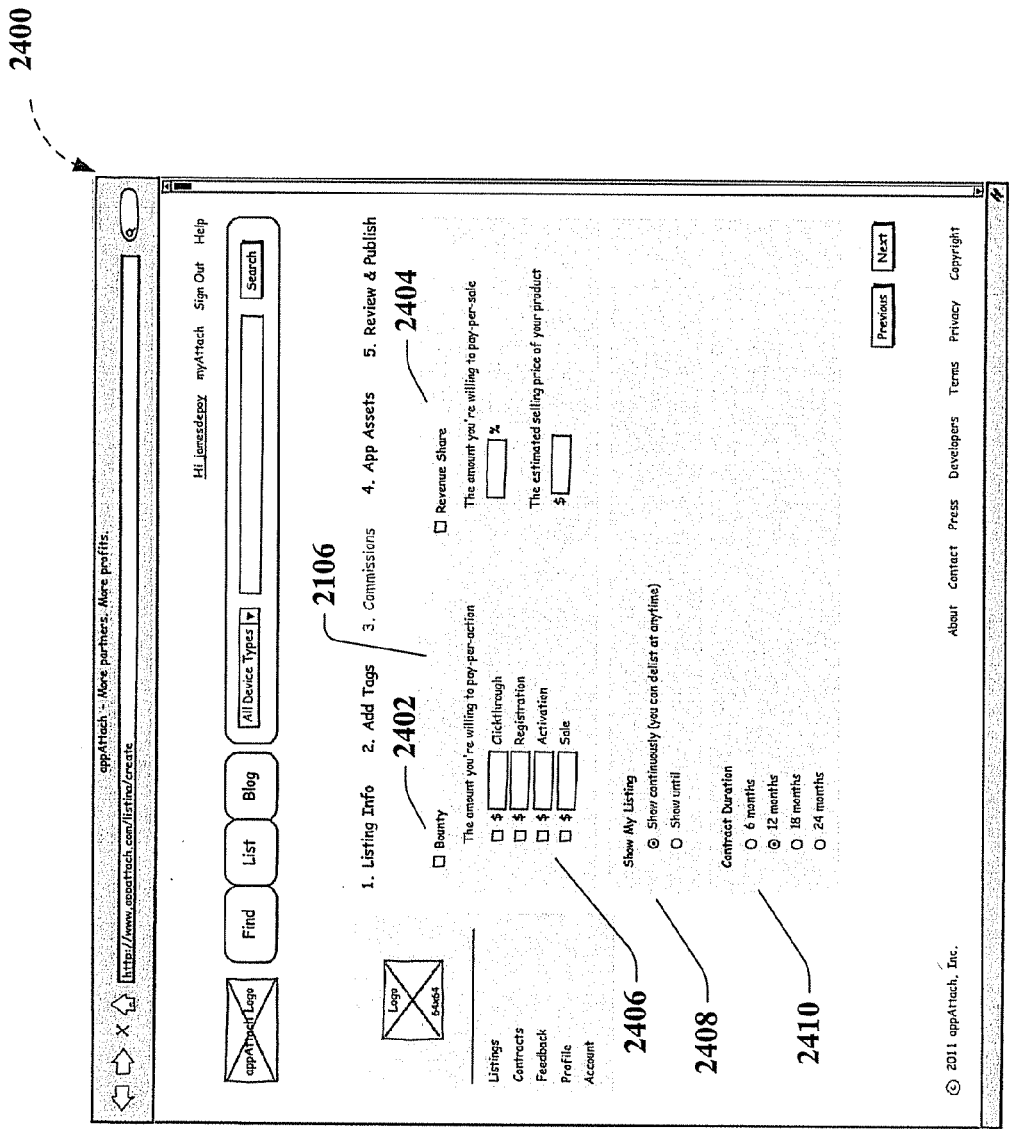

In a yet another non-limiting aspect, FIG. 24 illustrates another non-limiting example of a GUI Commission Page 2400 that facilitates adding still further contract information to the listing, such as by ISV 104, for example. For instance, ISV 104 can provide, and the exemplary software distribution system or marketplace can receive, contract information, such as one or more contract term(s) 2106 (e.g., one or more payment method(s), such as bounty 2402, revenue share 2404, and the like, and one or more associated indication(s) of conversion 2406, such as activation, registration, and so on, etc.). In a further example, contract information that can be provided about a listing can also comprise one or more of a market display preference 2408 for the listing (e.g., display continuously, display for a limited time, etc.), a contract duration 2410, etc.

Figure 25:
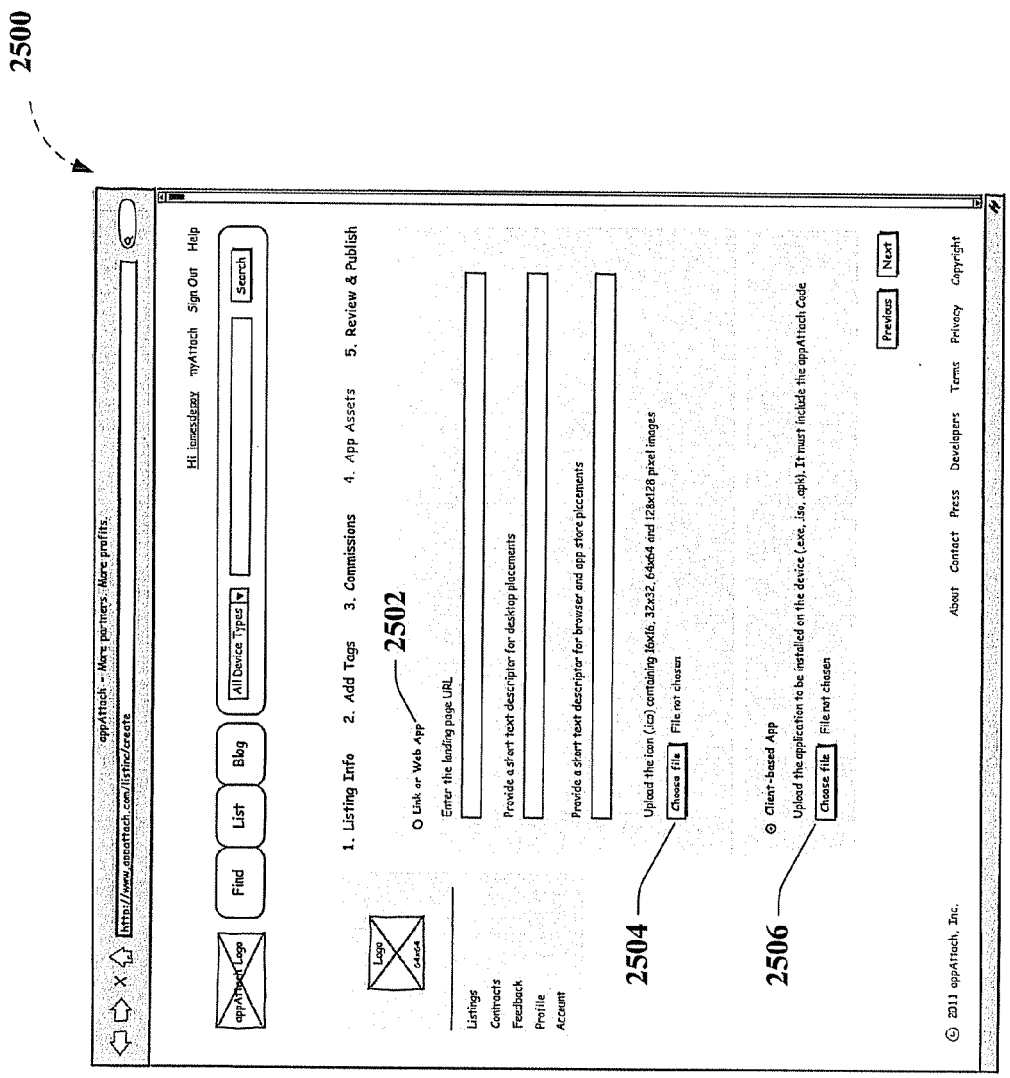

In a still another non-limiting aspect, FIG. 25 illustrates an exemplary GUI Listing Assets Page 2500 that facilitates adding still further contract information to the listing, such as by ISV 104, for example. For instance, ISV 104 can provide, and the exemplary software distribution system or marketplace can receive, contract information comprising one or more of link or Web App 2502, an application or service placement icon or logo 2504 file, and a Client-based App 2506. As an example, for a listing of a service such as an online service, a web-based application (e.g., software as a service, etc.) (or a link, or a reference thereto, etc.), GUI Listing Assets Page 2500 facilitates entering a landing page URL (e.g., ISV reference to ISV 104 Commerce Platform 212, etc.) as well as one or more text descriptor(s) for particular placements. As a further described above, the landing page URL (e.g., the ISV reference) can comprise a URL to an ISV webpage or other online resource operated by or on behalf of the ISV that allows a conversion (e.g. software application to be purchased, upgraded, activated, or a service to be subscribed, renewed, etc.) that facilitates providing enhanced access (e.g., greater functionality after conversion) to the software application or the service (or a link, or a reference thereto, etc.). In yet another example, for a listing of an application, such as a software application, a trial version, etc., GUI Listing Assets Page 2500 facilitates providing the software distribution system or marketplace with Client-based App 2506 comprising a version of the application for loading on the one or more OEM device(s). For instance, as described herein, Client-based App 2506 can comprise an application such as App./Ref. 216 that can be uploaded to the software distribution system or marketplace via the GUI Listing Assets Page 2500. As further described herein App./Ref. 216, and thus Client-based App 2506, can comprise App./Service Reference 202 as modified by including or incorporating Code or Instr's 206.

Figure 26:
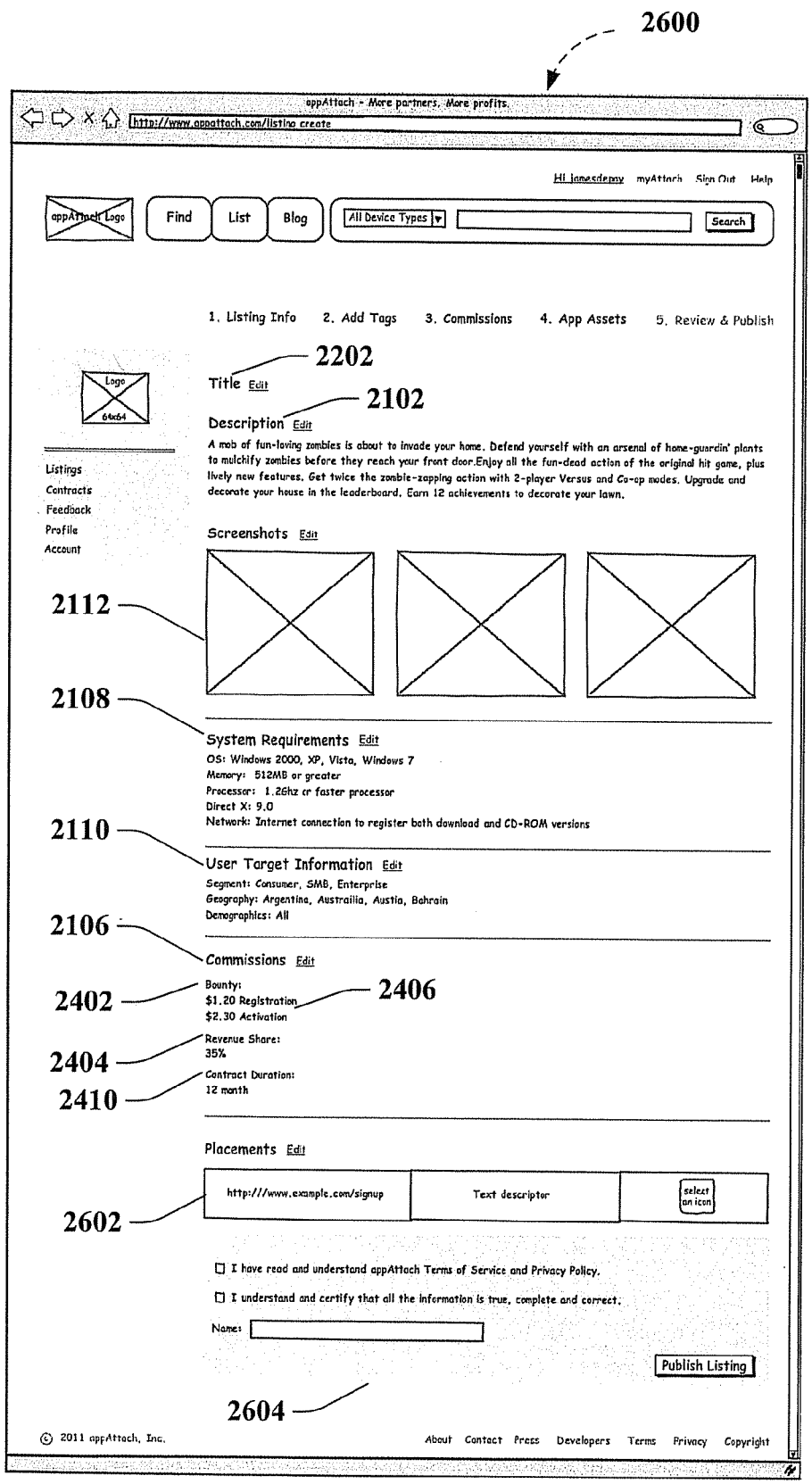

In a further non-limiting aspect, FIG. 26 demonstrates an exemplary GUI Review and Publish Page 2600 that facilitates reviewing and publishing the listing. To that end, GUI Review and Publish Page 2600 allows an ISV 104 to review, for the listing, the title 2202, the one or more screenshot(s) 2112, the description 2102, the system requirements 2108, the user target information 2110, the one or more contract term(s) 2106 (e.g., one or more payment method(s), such as bounty 2402, revenue share 2404, and the like, and one or more associated indication(s) of conversion 2406, such as activation, registration, a contract duration 2410, and so on, etc.), and the like, as described above. In addition, GUI Review and Publish Page 2600 can further comprise preview 2602 of the listing and one or more control(s) 2604 (e.g., checkboxes, textboxes, buttons, etc.) that can provide to an ISV 104, for example, the ability to indicate that the listing information is correct (and/or consent to be bound by the terms of the listing, and/or any other marketplace terms or agreements, etc.), the ability to publishing the listing, etc.

Figure 27:
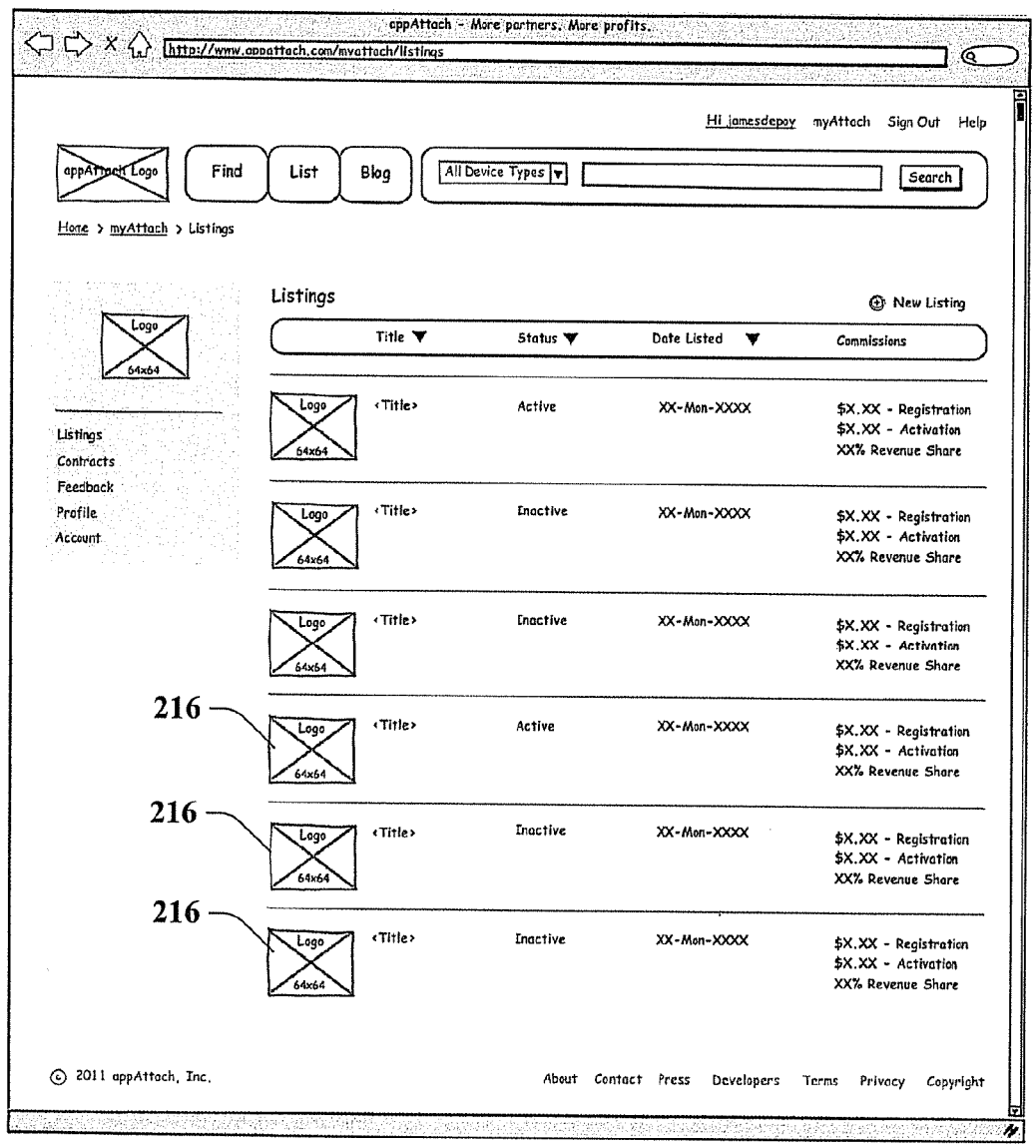
Figure 28:
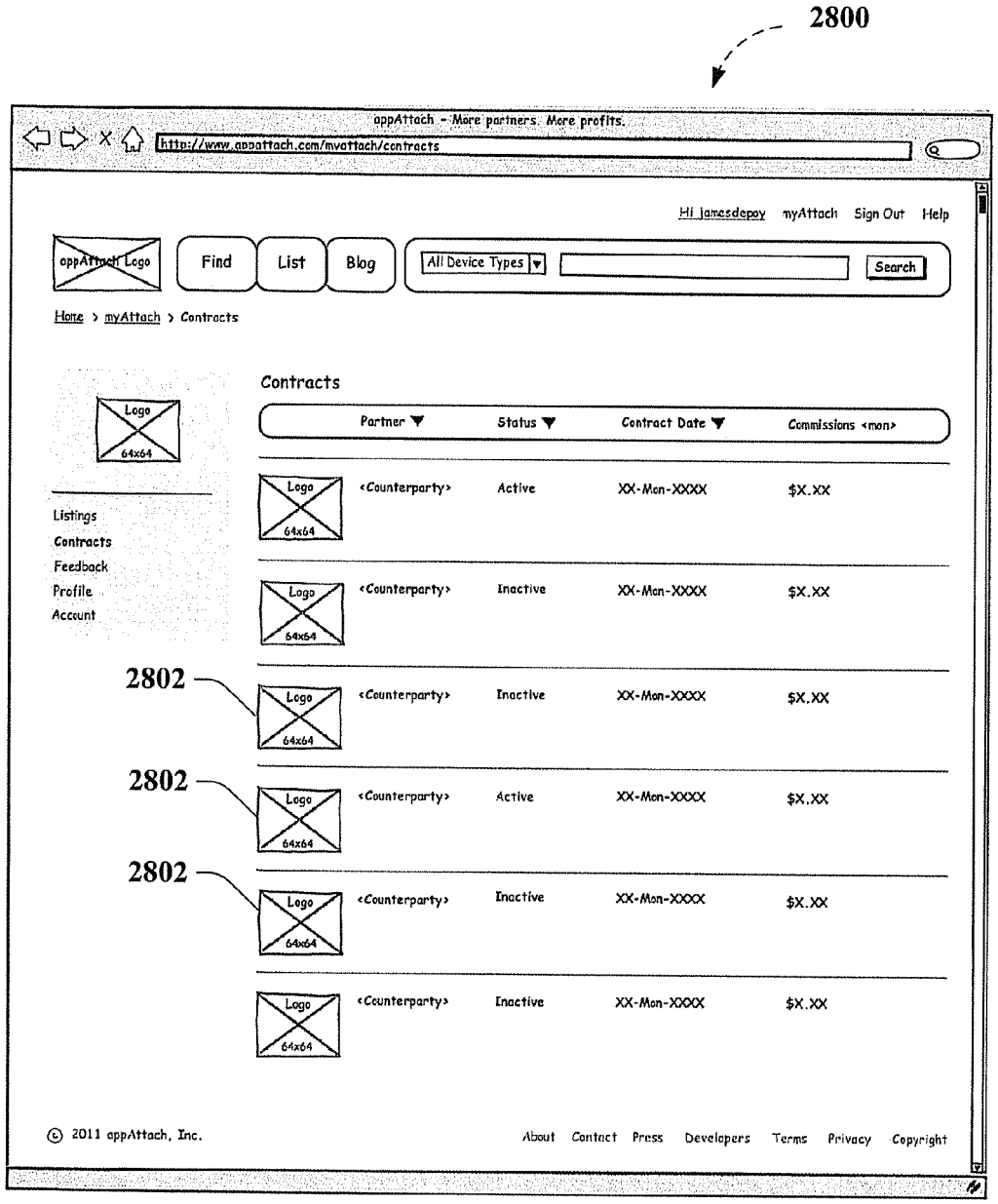

In a exemplary non-limiting implementations, FIG. 27 depicts a further non-limiting example of a GUI Manage Listings Page 2700 that can facilitate, for an ISV 104 having an account, management of listings for placement of applications or services in a software distribution system or marketplace, as described herein regarding FIGS. 2-3, 6, 11, etc., such as market 102, marketplace 626, system 1100, and the like. For instance, GUI Manage Listings Page 2700 allows an ISV 104 to review, list, sort, manage, and so on, one or more listing(s) for placement of applications or services (or links, or references thereto, etc.) (e.g., App./Ref. 216, etc.). Likewise, in a further non-limiting implementations, FIG. 28 demonstrates a further non-limiting example of a GUI Contract Listings Page 2800 that can facilitate, for an ISV 104 (or an OEM 106) having an account, management of contracts for placement of applications or services (or links, or references thereto, etc.) (e.g., App./Ref. 216, etc.) on one or more OEM device(s) 204 in the software distribution system or marketplace. For instance, GUI Manage Listings Page 2800 allows an ISV 104 or an (or an OEM 106) to review, list, sort, manage, and so on, one or more contract(s) formed 2802 for the placement of applications or services (or links, or references thereto, etc.) (e.g., App./Ref. 216, etc.) on one or more OEM device(s) 204.

Figure 29:
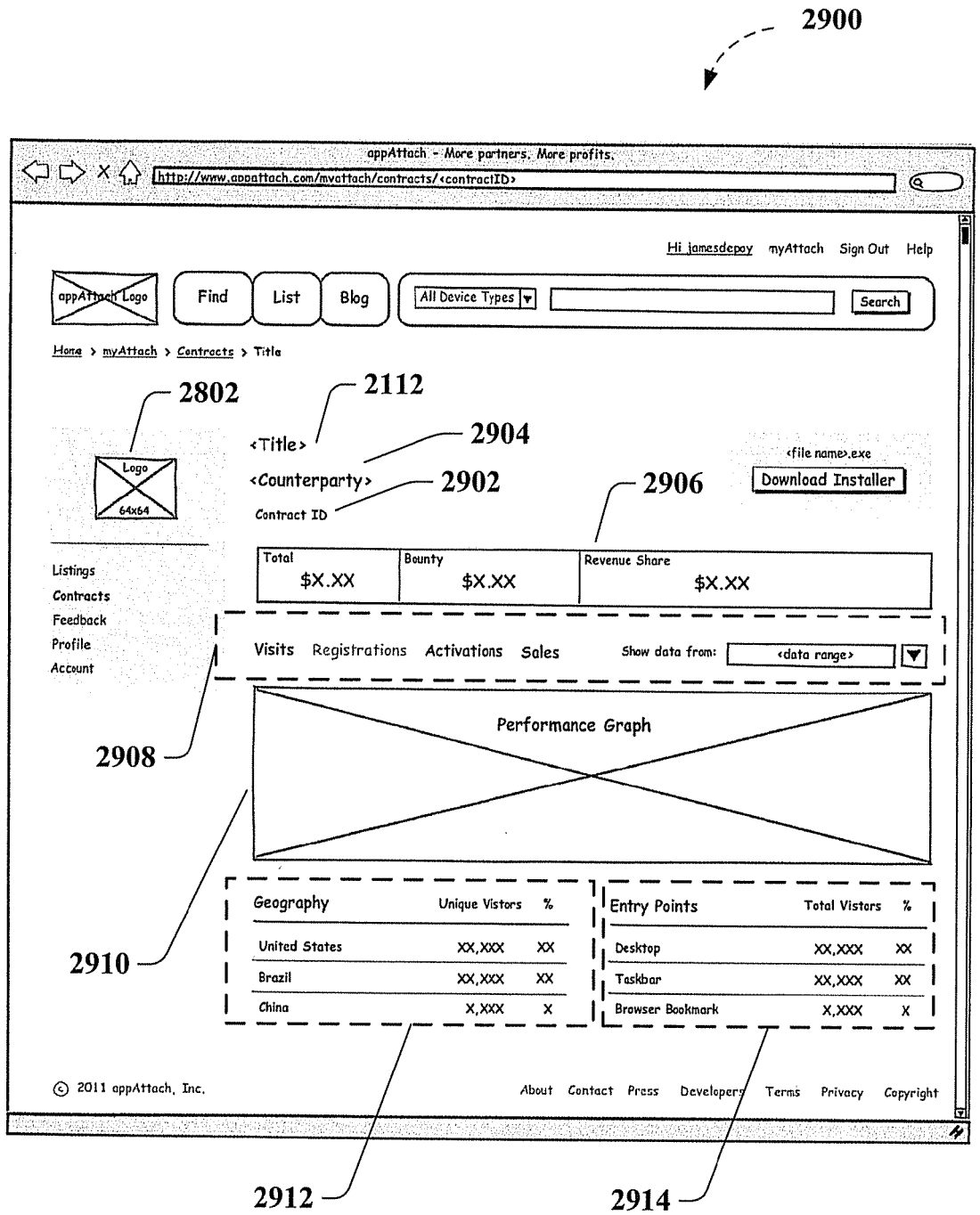

FIG. 29 depicts yet another non-limiting example of a GUI Performance Metrics Page 2900 that facilitates providing performance metrics regarding one or more contract(s) for placement formed via the software distribution system or marketplace. For instance, as described herein, various exemplary implementations the disclosed subject matter can provide metrics (e.g., data regarding specific placements, performance measurements, traffic quality regarding visitor, usage, and conversion information, and so on, etc.) or performance metrics regarding one or more contract(s) formed 2802 for placement to marketplace participants (e.g., ISVs 104, OEMs 106, device redistributors 106, etc.). To that end, GUI Performance Metrics Page 2900 can facilitate the presentation or display of various aspects of contract information and/or conversion information that are tracked by the software distribution system or marketplace (e.g., via a contract tracking component, such as Tracking Component 210, etc., based on contract information such as the unique contract identification number 2902 for the contract formed 2802) as well as one or metric(s) derived for the contract formed 2802 (e.g., such as by an analysis component 1116 of device or system 1100, marketplace 626, market 102, etc.).

Accordingly, exemplary GUI Performance Metrics Page 2900 of the software distribution system or marketplace can facilitate providing performance metrics regarding the one or more contract(s) formed 2802 by reference to a subset of the contract information (e.g., such as the unique contract identification number 2902, etc.) to one or more of the OEM 104 or the ISV 106 who are counterparties 2904 to the one or more contract(s) formed 2802. As non-limiting examples, exemplary GUI Performance Metrics Page 2900 can facilitate providing an overview table 2906 (e.g., showing applicable amounts such as bounty 2402, revenue share 2404, total, and the like, etc.) based on a selection of aspects 2908 of conversion information associated with the contract formed 2802 (e.g., a select on aspects including, without limitation, visits, registrations, activations, sales, date range of interest, and other items of conversion information as described herein, etc.), one or more performance graph(s) 2910, summary tables (e.g., summary table 2912 based on user target information 2110 such as geographical regions, table 2914 based on device location specific placement or entry point preference (e.g., taskbar, desktop, start menu, browser bookmark, etc.), and the like, etc.).

Figure 30:
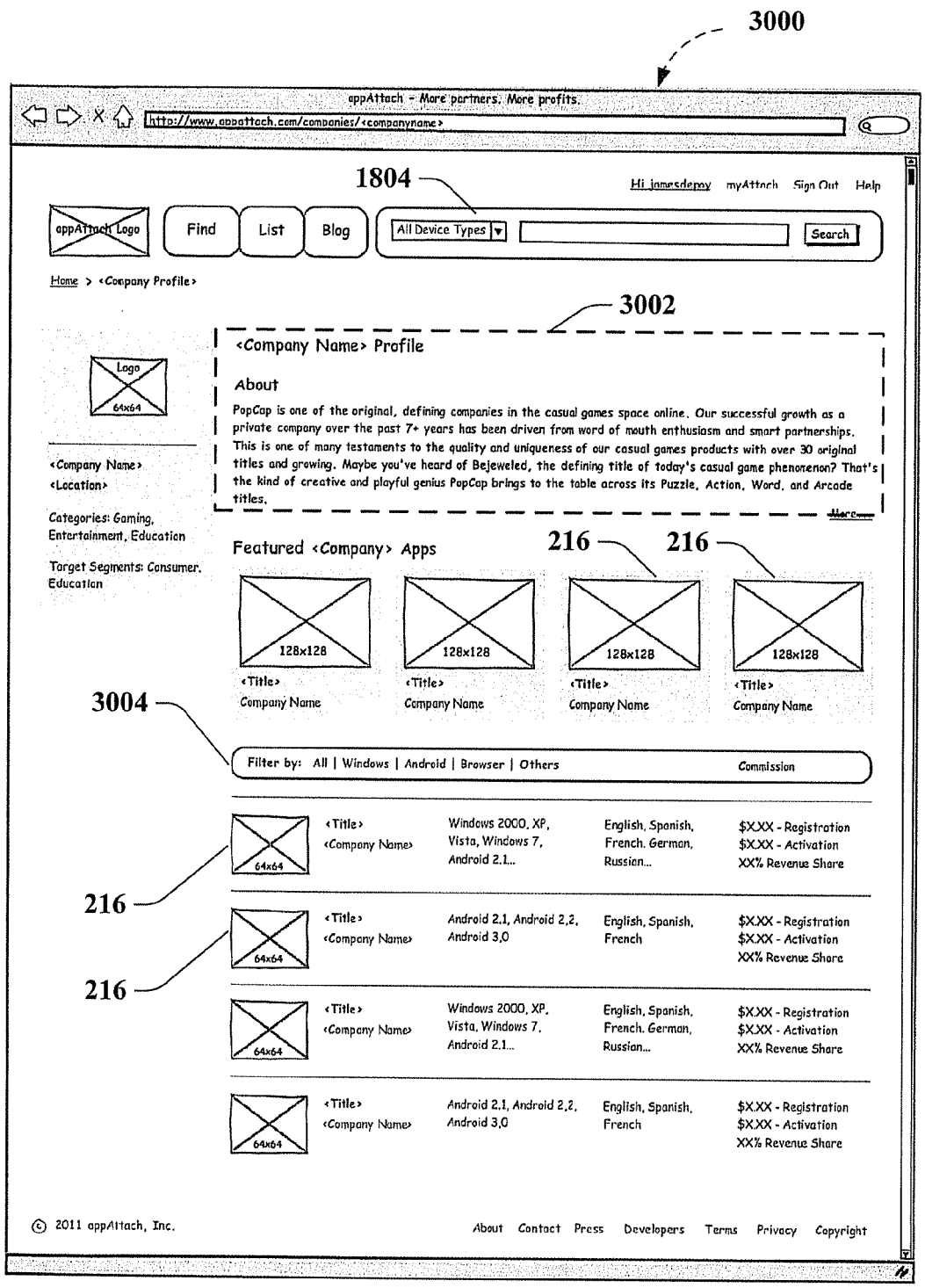

FIG. 30 demonstrates a non-limiting example of a GUI Company Profile Page 3000 (e.g., for a company category of applications) that facilitates, for example, presenting information via the GUI to one or more OEM(s) 106 and one or more ISV(s) 104 regarding one or more ISV software application(s) or service(s) (or links, or references thereto, etc.) (e.g., App./Ref. 216), one or more OEM device(s) 204, or one or more market analytic(s) (not shown) regarding the one or more ISV software application(s) or service(s) and the one or more OEM device(s), and/or that facilitates displaying one or more ISV software application(s) or service(s) (or a link, or a reference thereto, etc.) (e.g., App./Ref. 216), one or more OEM device(s) 204, or one or more market analytic(s) (not shown) regarding the one or more ISV software application(s) or service(s) (or link(s), or reference(s) thereto, etc.) and the one or more OEM device(s) 204. As can be seen in FIG. 30, the GUI Company Profile Page 3000 can further facilitate searching for applications or services (or links, or references thereto, etc.) (e.g., App./Ref. 216) for placement on OEM devices 204 via, for example, company profile information 3002, a controls 3002 that facilitate filtering search results comprising a list of the one or more ISV software application(s) or service(s) (or a link, or a reference thereto, etc.) (e.g., App./Ref. 216).

While the disclosed subject matter has been described in connection with the disclosed embodiments and the various figures, it is to be understood that other similar embodiments may be used or modifications and additions may be made to the described embodiments for performing the same function of the disclosed subject matter without deviating therefrom. In other instances, variations of process parameters (e.g., configuration, number of components, aggregation of components, process step timing and order, addition and/or deletion of process steps, addition of preprocessing and/or post-processing steps, etc.) can be made to further optimize the provided structures, devices and methods, as shown and described herein. In any event, the structures and devices, as well as the associated methods described herein have many applications in customer relations management, order processing, and so on. Therefore, the disclosed subject matter should not be limited to any single embodiment described herein.

What is claimed is:

1. A method, comprising:
    creating, by a system comprising a processor, contract information representing a contract between a software vendor (SV) entity represented by an SV identity(ID) of a plurality of SV IDs and an equipment vendor (EV) entity represented by an EV ID of plurality of EV IDs for at least one of placement or conversion of a software application or a service of a plurality of SV software applications or services associated with the plurality of SV IDs via at least one of a plurality of EV devices associated with the plurality of EV IDs,
    wherein the creating comprises creating the contract information based at least in part on first information received form an SV device associated with the SV ID of the plurality of SV IDs or associated with the EV ID of the plurality of EV IDs; and
    based on the created contract information, tracking, by the first system, second information related to at least one of the placement or the conversion of the software application or the service of the plurality of SV software applications, wherein the conversion of the software application or the service of the plurality of SV software applications occurs between an EV device of the plurality of EV devices and a second system that is associated with the SV ID representing the SV entity.

2. The method of claim 1, wherein the tracking the second information related to at least one of the placement or the conversion of the software application or the service of the plurality of SV software applications comprises:
    storing a first indication of the SV ID of the plurality of SV IDs that corresponds to at least one of the placement or the conversion of the software application or the service of the plurality of SV software applications,
    storing a second indication of the EV ID of the plurality of EV IDs that corresponds to at least one of the placement or the conversion of the software application or the service of the plurality of SV software applications, or storing a third indication of the created contract information that corresponds to at least one of the placement or the conversion of the software application or the service of the plurality of SV software applications.

3. The method of claim 1, wherein the tracking the second information related to at least one of the placement or the conversion of the software application or the service of the plurality of SV software applications comprises:
receiving an indication of at least one of the placement or the conversion of the software application or the service of the plurality of SV software applications from the EV device of the plurality of EV devices; and
sending the indication of at least one of the placement or the conversion of the software application or the service of the plurality of SV software applications to the second system.

4. The method of claim 1, wherein the tracking the second information related to at least one of the placement or the conversion of the software application or the service of the plurality of SV software applications comprises:
tracking the second information in response to at least one of the placement or the conversion of the software application or the service of the plurality of SV software applications being determined to have been initiated.

5. The method of claim 1, wherein the tracking the second information related to at least one of the placement or the conversion of the software application or the service of the plurality of SV software applications comprises:
periodically tracking the second information in a batch processing procedure that batches at least the second information and third information, wherein the third information is related to at least one of another placement or another conversion of the software application, the service of the plurality of SV software applications, another software application, or another service of the plurality of SV software applications.

6. The method of claim 5, further comprising:
querying, by the first system, the second system according to the batch processing procedure to request the second information and the third information.

7. The method of claim 1, further comprising:
receiving, by the first system, payment associated with the tracking of the second information related to at least one of the placement or the conversion of the software application or the service of the plurality of SV software applications.

8. The method of claim 1, wherein the SV device comprises the second system, and wherein the method further comprises:
receiving, by the first system, a subset of the second information from the SV device.

9. The method of claim 1, further comprising:
sending, by the first system, a subset of the second information to the EV device of the plurality of EV devices.

10. The method of claim 1, further comprising:
determining, by the first system, an amount of payment related to at least one of the placement or the conversion of the software application or the service of the plurality of SV software applications based on the created contract information.

11. A first system, comprising:
a memory that stores executable components; and
a processor, communicatively coupled to the memory, that executes or facilitates execution of the executable components, the executable components comprising:
a contract creation component configured to create contract information representing a contract between a software vendor (SV) entity represented by a SV identity (ID) of a plurality of SV IDs and an equipment vendor (EV) entity represented by an EV ID of a plurality of EV IDs for at least one of placement or conversion of a software application or a service of a plurality of SV software applications or services associated with the plurality of SV IDs via at least one of a plurality of EV devices associated with the plurality of EV IDs,
wherein the creating comprises creating the contract information based at least in part on first information received from an SV device associated with the SV ID of the plurality of SV IDs or associated with the EV ID of the plurality of EV IDs; and
a contract tracking component configured to, based on the created contract information, track second information related to at least one of the placement or the conversion of the software application or the service of the plurality of SV software applications, wherein the conversion of the software application or the service of the plurality of SV software applications occurs between an EV device of the plurality of EV devices and a second system that is associated with the SV ID representing the SV entity.

12. The first system of claim 11, wherein the placement of the software application or the service of the plurality of SV software applications comprises an installation of the software application or the service of the plurality of SV software applications on the EV device of the plurality of EV devices, or an inclusion of a link or a reference to the software application or the service of the plurality of SV software applications on the EV device of the plurality of EV devices.

13. The first system of claim 11, wherein the conversion of the software application or the service of the plurality of SV software applications comprises a purchase of the software application or the service of the plurality of SV software applications, an upgrade of the software application or the service of the plurality of SV software applications, a paid subscription of the software application or the service of the plurality of SV software applications, a renewed subscription of the software application or the service of the plurality of SV software applications, or an access of another software application or another service of the plurality of SV software applications that is related to the software application or the service of the plurality of SV software applications.

14. The first system of claim 11, wherein the conversion of the software application or the service of the plurality of SV software applications comprises an event in connection with which compensation or payment is contracted regarding user input received at the EV device of the plurality of EV devices and relating to the software application or the service of the plurality of SV software applications.

15. The first system of claim 11, wherein the contract tracking component is further configured to store a first indication of an SV ID of the plurality of SV IDs that corresponds to at least one of the placement or the conversion of the software application or the service of the plurality of SV software applications, store a second indication of an EV ID of the plurality of EV IDs that corresponds to at least one of the placement or the conversion of the software application or the service of the plurality of SV software applications, or store a third indication of the created contract information that corresponds to at least one of the placement or the conversion of the software application or the service of the plurality of SV software applications.

16. A non-transitory computer-readable storage medium storing executable components that, in response to execution, cause a first system to execute or facilitate execution of operations, the operations comprising:
   creating, by the first system, contract information representing a contract between a software vendor (SV) entity represented by a SV identity (ID) of a plurality of SV IDs and an equipment vendor (EV) entity represented by an EV ID of a plurality of EV IDs for at least one of placement or conversion of a software application or a service of a plurality of SV software applications or services associated with the plurality of SV IDs via at least one of a plurality of EV devices associated with the plurality of EV IDs,
   wherein the creating comprises creating the contract information based at least in part on first information received from an SV device associated with the SV ID of the plurality of SV IDs or associated with the EV ID of the plurality of EV IDs; and
   based on the created contract information, tracking, by the first system, second information related to at least one of the placement or the conversion of the software application or the service of the plurality of SV software applications, wherein the conversion of the software application or the service of the plurality of SV software applications occurs between an EV device of the plurality of EV devices and a second system that is associated with the SV ID representing the SV entity.

17. The non-transitory computer-readable storage medium of claim 16, wherein the tracking comprises receiving an indication of at least one of the placement or the conversion of the software application or the service of the plurality of SV software applications from the EV of the plurality of EV devices, and sending the indication of at least one of the placement or the conversion of the software application or the service of the plurality of SV software applications to the first system.

18. The non-transitory computer-readable storage medium of claim 16, wherein the tracking comprises tracking the second information in response to at least one of the placement or the conversion of the software application or the service of the plurality of SV software applications being determined to have been initiated.

19. The non-transitory computer-readable storage medium of claim 16, wherein the tracking comprises periodically tracking the second information according to a batch processing applicable to the second information and at least to third information related to at least one of the placement, the conversion, another placement, or another conversion.

20. The non-transitory computer-readable storage medium of claim 19, wherein the tracking comprises querying the first system according to the batch processing.

* * * * *